(12) United States Patent
Shimazu et al.

(10) Patent No.: US 7,081,982 B2
(45) Date of Patent: Jul. 25, 2006

(54) MOVABLE MIRROR DEVICE AND DISPERSION COMPENSATOR

(75) Inventors: Takayuki Shimazu, Yokohama (JP); Michiko Takushima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/937,753

(22) Filed: Sep. 10, 2004

(65) Prior Publication Data

US 2005/0063076 A1 Mar. 24, 2005

(30) Foreign Application Priority Data

| Sep. 10, 2003 | (JP) | ............................ P2003-318888 |
| Sep. 29, 2003 | (JP) | ............................ P2003-338361 |
| Apr. 19, 2004 | (JP) | ............................ P2004-123388 |

(51) Int. Cl.
  *G02B 26/08* (2006.01)
  *G02B 5/08* (2006.01)

(52) U.S. Cl. .................. 359/298; 359/224; 359/846
(58) Field of Classification Search ................ 359/298, 359/846, 847, 291, 224
See application file for complete search history.

(56) References Cited

U.S. PATENT DOCUMENTS

| 5,365,379 | A  | * | 11/1994 | Sawicki ....................... 359/846 |
| 6,384,952 | B1 | * | 5/2002 | Clark et al. .................. 359/224 |
| 2003/0002772 | A1 | * | 1/2003 | Katayama et al. ............ 385/15 |
| 2005/0025415 | A1 | * | 2/2005 | Takushima et al. ........... 385/27 |

FOREIGN PATENT DOCUMENTS

JP  2002-303805  10/2002

* cited by examiner

*Primary Examiner*—Mark A. Robinson
*Assistant Examiner*—Mark Consilvio
(74) *Attorney, Agent, or Firm*—McDermott Will & Emery LLP

(57) ABSTRACT

A movable mirror device comprises a deformable mirror; and a drive section for deforming the mirror into a concave shape and into a convex shape.

38 Claims, 38 Drawing Sheets (a)                                      (b)

(a)  (b)

MOVABLE MIRROR DEVICE AND DISPERSION COMPENSATOR

BACKGROUND OF THE INVENTION

1. Field of the Invention

The present invention relates to a movable mirror device and a dispersion compensator.

2. Related Background of the Invention

An example of the conventional movable mirror device is the one described in Patent Document 1: Japanese Patent Application Laid-Open No. 2002-303805. The movable mirror device described in this Patent Document 1 is installed in a tunable dispersion compensator, and is configured, for example, to deform a curved surface shape of a reflecting surface of a movable reflecting mirror so that a light reflection position of the movable reflecting mirror comes to a desired position.

SUMMARY OF THE INVENTION

In order to provide a large dispersion compensation amount in the tunable dispersion compensator as in the above conventional technology, it is necessary to secure a large movable range of the reflecting mirror.

An object of the present invention is to provide a movable mirror device and a dispersion compensator capable of securing a large movable range of a mirror.

(1) A movable mirror device of the present invention comprises: a deformable mirror; and a drive section for deforming the mirror into a concave shape and into a convex shape.

With provision of the drive section of this type, the mirror can be deformed in two ways toward the concave shape and toward the convex shape even if the mirror is of a flat shape without flexure in an initial state. This expands the movable range of the mirror and it becomes feasible to give different optical path differences according to positions of incident light to the mirror, by means of one mirror. Accordingly, where the movable mirror device of the present invention is applied, for example, to a dispersion compensator, it becomes feasible to effect compensation for both positive dispersion and negative dispersion. In this configuration wherein the mirror is deformed from the flat state in the two ways, the stress in the mirror can be made smaller and the mirror can be readily fabricated.

Preferably, the drive section comprises a movable electrode terminal coupled to the mirror, and a stationary electrode terminal arranged to face the movable electrode terminal, and an electrostatic force is generated between the movable electrode terminal and the stationary electrode terminal to move the movable electrode terminal, thereby deforming the mirror. When the mirror is deformed by use of the electrostatic force in this manner, the amount of the electric current is very low, and it is thus feasible to achieve power saving.

In the movable mirror device of the present invention, the mirror comprises a reflecting surface for reflecting light, and the drive section deforms the reflecting surface into a convex surface and into a concave surface. Namely, the mirror has the reflecting surface which is substantially a flat surface in the initial state, and the drive section deforms the reflecting surface into a convex surface and into a concave surface. This configuration increases the movable range of the mirror. In the configuration wherein the reflecting surface of the mirror is deformed from the flat surface into both of the convex surface and the concave surface, the stress in the mirror can be made smaller and the mirror can be readily fabricated.

In the movable mirror device of the present invention, preferably, the drive section further comprises another movable electrode terminal, the two movable electrode terminals are coupled to two side portions of the mirror, and the stationary electrode terminal comprises a first stationary electrode terminal disposed between the movable electrode terminals, and at least two second stationary electrode terminals facing the first stationary electrode terminal with each movable electrode terminal in between. In this configuration, when a voltage is applied between each of the movable electrode terminals and the first stationary electrode terminal, the movable electrode terminals are attracted toward the first stationary electrode terminal by electrostatic force, whereby the mirror is deformed into the convex shape. When a voltage is applied between each pair of the movable electrode terminal and the second stationary electrode terminal, the movable electrode terminals are attracted toward the second stationary electrode terminals by electrostatic force, whereby the mirror is deformed into the concave shape.

In the movable mirror device of the present invention, preferably, the drive section further comprises another movable electrode terminal the movable electrode terminals are disposed in a region behind the reflecting surface out of two regions defined by the mirror in a first direction intersecting with the reflecting surface, one of the two movable electrode terminals is coupled to one of two side portions of the mirror in a second direction intersecting with the first direction, and extends in the first direction, the other of the two movable electrode terminals is coupled to the other of the two side portions of the mirror and extends in the first direction, the stationary electrode terminal comprises a first stationary electrode terminal and two second stationary electrode terminals, the first stationary electrode terminal is disposed between the two movable electrode terminals, and the two movable electrode terminals are disposed between the two second stationary electrode terminals.

In this configuration, when a voltage is applied between the movable electrode terminals and the first stationary electrode terminal, the movable electrode terminals are attracted toward the first stationary electrode terminal by electrostatic force. This causes the two side portions of the mirror to which the two movable electrode terminals are connected, to move toward the center in the second direction in the region on the back side (the region behind the reflecting surface), so as to deform the reflecting surface into the convex surface. When a voltage is applied between the movable electrode terminals and the second stationary electrode terminals, the movable electrode terminals are attracted toward the second stationary electrode terminals by electrostatic force. This causes the two side portions of the mirror to which the two movable electrode terminals are connected, to move toward the center in the second direction in the region on the front side of the reflecting surface, so as to deform the reflecting surface into the concave surface.

The movable mirror device of the present invention may also have a configuration wherein the drive section further comprises another movable electrode terminal, the two movable electrode terminals are coupled to two side portions of the mirror and vertically arranged, and the stationary electrode terminal comprises at least two first stationary electrode terminals facing each other with one of the two movable electrode terminals in between, and at least two second stationary electrode terminals facing each other with the other of the two movable electrode terminals in between. In this configuration, when a voltage is applied between one movable electrode terminal and one first stationary electrode terminal and when a voltage is applied between the other movable electrode terminal and one second stationary electrode terminal, the movable electrode terminals each are attracted to the first stationary electrode terminal and to the second stationary electrode terminal, respectively, by electrostatic force, whereby the mirror is deformed into the convex shape. When a voltage is applied between one movable electrode terminal and the other first stationary electrode terminal and when a voltage is applied between the other movable electrode terminal and the other second stationary electrode terminal, the movable electrode terminals each are attracted to the first stationary electrode terminal and to the second stationary electrode terminal, respectively, by electrostatic force, whereby the mirror is deformed into the concave shape.

The movable mirror device of the present invention may also have a configuration wherein the drive section further comprises another movable electrode terminal, the two movable electrode terminals being disposed in a region behind the reflecting surface out of two regions defined by the mirror in a first direction intersecting with the reflecting surface, one of the two movable electrode terminals is coupled to one of two side portions of the mirror in a second direction intersecting with the first direction, and extends in the first direction, and the other of the two movable electrode terminals is coupled to the other of the two side portions of the mirror and extends in the first direction, the stationary electrode terminal comprises two first stationary electrode terminals facing the one of the movable electrode terminals, and two second stationary electrode terminals facing the other of the movable electrode terminals, the one of the movable electrode terminals is disposed between the first stationary electrode terminals, the other of the movable electrode terminals is disposed between the second stationary electrode terminals, the one of the movable electrode terminals and the two first stationary electrode terminals are disposed in one of a first region and a second region located in order in a direction intersecting with the first direction and with the second direction in the region behind the reflecting surface, and the other of the movable electrode terminals and the two second stationary electrode terminals are disposed in the other of the first region and the second region.

In this configuration, when a voltage is applied between each of the movable electrode terminals and, the corresponding first stationary electrode terminal and second stationary electrode terminal located in a direction in which, with respect to one side portion coupled to the movable electrode out of the two side portions of the mirror, the other side portion exists, the movable electrode terminals corresponding to the first stationary electrode terminal and the second stationary electrode terminal are attracted thereto by electrostatic force. This causes the two side portions of the mirror to which the two movable electrode terminals are connected, to move toward the center in the second direction in the region on the back side (the region behind the reflecting surface), so as to deform the reflecting surface into the convex surface. When a voltage is applied between each of the movable electrode terminals and, the corresponding first stationary electrode terminal and second stationary electrode terminal located in the opposite direction to the above, the movable electrode terminals corresponding to the first stationary electrode terminal and the second stationary electrode terminal are attracted thereto by electrostatic force. This causes the two side portions of the mirror to which the two movable electrode terminals are connected, to move toward the center in the second direction in the region on the front side of the reflecting surface, so as to deform the reflecting surface into the concave surface.

In the movable mirror device of the present invention, preferably, a rigidity of joint parts between the mirror and the movable electrode terminals is larger than a rigidity of a central part of the mirror. Namely, the rigidity in the two side portions of the mirror is preferably larger than that in the other portion of the mirror in the second direction. This facilitates the deformation of the mirror into the concave shape and into the convex shape with movement of the movable electrode terminals toward the stationary electrode terminals.

In the movable mirror device of the present invention, preferably, the movable electrode terminal is folded toward a center side of the mirror. Namely, in the movable mirror device of the present invention, preferably, the movable electrode terminal has a portion extending in the second direction from the joint part to the mirror toward a plane intersecting with the center of the mirror in the second direction, and extends in the first direction from an end of the portion. In this case, the width of the drive section can be made smaller. Therefore, in a case where a movable mirror device array is formed in an array structure consisting of an array of mirrors, the mirrors can be readily arranged at a narrow pitch.

In the movable mirror device of the present invention, the movable electrode terminal may extend obliquely relative to the mirror toward a center side of the mirror. Namely, in the movable mirror device of the present invention, the movable electrode terminal may extend obliquely from the joint part to the mirror toward the plane intersecting with the center of the mirror in the second direction. In this case, the width of the drive section can also be made smaller. Therefore, in a case where a movable mirror device array is formed in an array structure consisting of an array of mirrors, the mirrors can be readily arranged at a narrow pitch.

Furthermore, in the movable mirror device of the present invention, preferably, the stationary electrode terminal is fixed to a substrate, and the mirror is supported only at a central part thereof on the substrate. Namely, preferably, the movable mirror device of the present invention further comprises a substrate, the stationary electrode terminal is fixed to the substrate, and the mirror is fixed at a portion along a center axis of the mirror extending in a third direction intersecting with the first direction and with the second direction. In this configuration, when the movable electrode terminals are moved relative to the stationary electrode terminal, the mirror is deformed into the concave shape and into the convex shape around a fulcrum at the central part of the mirror.

The movable mirror device of the present invention may also have a configuration wherein the stationary electrode terminal is fixed to a substrate, and two supporting means for supporting the two movable electrode terminals movably relative to the stationary electrode terminal are provided on the substrate. Namely, preferably, the movable mirror device of the present invention further comprises the substrate to which the stationary electrode terminal is fixed, and the two supporting means for supporting the two movable electrode terminals movably relative to the stationary electrode terminal are provided on the substrate. This permits the movable electrode terminals to move relative to the stationary electrode terminal so that the mirror can be deformed into the concave shape and into the convex shape around a fulcrum at the central part of the mirror, without need for supporting the central part of the mirror on the substrate. This configuration is effective, for example, in cases where it is difficult to form a structure in which only the central part of the mirror is supported on the substrate.

Here, preferably, each of the supporting means comprises a fixed portion fixed to the substrate, and an elastic member connecting the movable electrode terminal and the fixed portion. Namely, each supporting means preferably has the fixed portion fixed to the substrate, and the elastic member connecting the fixed portion to the movable electrode terminal, and the elastic member has an elastic modulus smaller than that of the movable electrode terminal. This can prevent the motion of the movable electrode terminals from being restricted when the movable electrode terminals are moved relative to the stationary electrode terminal.

(2) Another movable mirror device of the present invention comprises a deformable mirror; and a drive section for deforming the mirror from one state of a concave shape and a convex shape into the other state. Namely, in the movable mirror device of the present invention, the mirror has a reflecting surface for reflecting light, the reflecting surface is one of the convex surface and the concave surface in an initial state, and the drive section deforms the reflecting surface into the other of the convex surface and the concave surface.

With provision of the drive section as described, where the mirror is bent in the concave shape in the initial state, the mirror can be deformed into the convex shape; where the mirror is bent in the convex shape in the initial state, the mirror can be deformed into the concave shape. This expands the movable range of the mirror. Therefore, where the movable mirror device of the present invention is applied, for example, to a dispersion compensator, it becomes feasible to effect compensation for both positive dispersion and negative dispersion. In the configuration wherein the preliminarily bent mirror is deformed as described above, the deformation can be implemented by simply deforming the mirror in only one direction, which can simplify the structure of the drive section and the control in the deformation of the mirror.

Preferably, the drive section comprises a movable electrode terminal coupled to the mirror, and a stationary electrode terminal arranged to face the movable electrode terminal, and an electrostatic force is generated between the movable electrode terminal and the stationary electrode terminal to move the movable electrode terminal, thereby deforming the mirror. When the mirror is deformed by use of the electrostatic force in this manner, the amount of the electric current can be very small, and it is thus feasible to achieve power saving.

In this case, preferably, the mirror is preliminarily formed in a concave shape, the drive section further comprises another movable electrode terminal, the two movable electrode terminals are coupled to two side portions of the mirror, and the stationary electrode terminal is disposed between the movable electrode terminals. Namely, the reflecting surface of the mirror is preliminarily formed as a concave surface, the drive section has two movable electrode terminals, the two movable electrode terminals are provided in the region behind the reflecting surface out of two regions defined by the mirror in a first direction intersecting with the reflecting surface, one of the two movable electrode terminals is coupled to one of the two side portions of the mirror in a second direction intersecting with the first direction and extends in the first direction, the other of the two movable electrode terminals is coupled to the other of the two side portions of the mirror and extends in the first direction, and the stationary electrode terminal is provided between the two movable electrode terminals to face the two movable electrode terminals.

In this configuration, when a voltage is applied between each of the movable electrode terminals and the stationary electrode terminal, the movable electrode terminals are attracted to the stationary electrode terminal by electrostatic force, whereby the mirror is deformed from the concave shape into the convex shape. Namely, when the voltage is applied between the two movable electrode terminals and the stationary electrode terminal, the two movable electrode terminals are attracted to the stationary electrode terminal provided between them by the electrostatic force. This causes the two side portions of the mirror to which the two movable electrode terminals are connected, to move toward the center in the second direction in the region on the back side (the region behind the reflecting surface). As a result, the reflecting surface is deformed from the concave surface into the convex surface.

The movable mirror device may also have a configuration wherein the mirror is preliminarily formed in a convex shape, wherein the drive section further comprises another movable electrode terminal, the two movable electrode terminals being coupled to two side portions of the mirror, and wherein the drive section comprises at least two stationary electrode terminals, the two stationary electrode terminals facing each other with the two movable electrode terminals in between. Namely, the movable mirror device of the present invention may be constructed in the configuration wherein the reflecting surface of the mirror is preliminarily formed as a convex surface, the drive section has two movable electrode terminals and two stationary electrode terminals, the movable electrode terminals and stationary electrode terminals are provided in the region behind the reflecting surface out of the two regions defined by the mirror in the first direction intersecting with the reflecting surface, the two stationary electrode terminals extend in the first direction, the two movable electrode terminals extend in the first direction between the two stationary electrode terminals, one of the two movable electrode terminals is coupled to one of the two side portions of the mirror in the second direction intersecting with the first direction, and the other of the two movable electrode terminals is coupled to the other of the two side portions of the mirror.

In this configuration, when a voltage is applied between each pair of the movable electrode terminal and stationary electrode terminal, the movable electrode terminals are attracted to the respective stationary electrode terminals by electrostatic force, whereby the mirror is deformed from the convex shape into the concave shape. Namely, when the voltage is applied between the movable electrode terminals and the corresponding stationary electrode terminals, the movable electrode terminals are attracted to the corresponding stationary electrode terminals provided outside in the second direction, by the electrostatic force. This causes the two side portions of the mirror to which the two movable electrode terminals are connected, to move toward the center in the second direction in the region on the front side of the reflecting surface. As a result, the reflecting surface is deformed from the convex surface into the concave surface.

In the movable mirror device of the present invention, preferably, a rigidity of joint parts between the mirror and the movable electrode terminals is larger than a rigidity of a central part of the mirror. Namely, the rigidity in the two side portions of the mirror is preferably larger than that in the other portion of the mirror in the second direction. This facilitates the deformation of the mirror into the concave shape or into the convex shape with movement of the movable electrode terminals toward the stationary electrode terminals.

In the movable mirror device of the present invention, preferably, the stationary electrode terminal is fixed to a substrate, and the mirror is supported only at a central part thereof on the substrate. Namely, preferably, the movable mirror device of the present invention further comprises a substrate, the stationary electrode terminal is fixed to the substrate, and the mirror is fixed at a portion along a center axis of the mirror extending in a third direction intersecting with the first direction and with the second direction. In this configuration, when the movable electrode terminals are moved relative to the stationary electrode terminal, the mirror is deformed into the concave shape or into the convex shape around a fulcrum at the central part of the mirror.

The movable mirror device of the present invention may also have a configuration wherein the stationary electrode terminal is fixed to a substrate, and wherein two supporting means for supporting the two movable electrode terminals movably relative to the stationary electrode terminal are provided on the substrate. Namely, preferably, the movable mirror device of the present invention further comprises a substrate to which the stationary electrode terminal is fixed, and two supporting means for supporting the two movable electrode terminals movably relative to the stationary electrode terminal are provided on the substrate. In this configuration, the mirror can be deformed into the concave shape or into the convex shape around a fulcrum at the central part of the mirror by moving the movable electrode terminals relative to the stationary electrode terminal, without need for supporting the central part of the mirror on the substrate. This configuration is effective, for example, in cases where it is difficult to form a structure wherein the mirror is supported at the central part only on the substrate.

Here, preferably, each of the supporting means comprises a fixed portion fixed to the substrate, and an elastic member connecting the movable electrode terminal and the fixed portion. Namely, preferably, each supporting means comprises the fixed portion fixed to the substrate, and the elastic member connecting the movable electrode terminal and the fixed portion, and the elastic member has an elastic modulus smaller than that of the movable electrode terminal. This can prevent the motion of the movable electrode terminals from being restricted when the movable electrode terminals are moved relative to the stationary electrode terminal.

Furthermore, the movable mirror device may also have a configuration wherein the mirror is preliminarily formed in a concave shape, wherein the movable electrode terminal is coupled to two side portions of the mirror, and wherein the stationary electrode terminal faces the mirror with the movable electrode terminal in between. Namely, the reflecting surface is preliminarily formed as the concave surface, the drive section is provided in a region behind the reflecting surface out of two regions defined by the mirror in a first direction intersecting with the reflecting surface, the stationary electrode terminal extends in a second direction intersecting with the first direction, the movable electrode terminal is coupled to two side portions of the mirror in the second direction and extends in the second direction between the mirror and the stationary electrode terminal, and the mirror is fixed at a portion along a center axis of the mirror intersecting with the first direction and with the second direction.

In this configuration, when a voltage is applied between the movable electrode terminal and the stationary electrode terminal, the movable electrode terminal is attracted toward the stationary electrode terminal by electrostatic force, whereby the mirror is deformed from the concave shape into the convex shape. Namely, when the voltage is applied between the movable electrode terminal and the stationary electrode terminal, the movable electrode terminal coupled to the two side portions of the mirror is attracted toward the stationary electrode terminal by the electrostatic force. This causes the two side portions of the mirror to move in the first direction toward the stationary electrode terminal, with the center axis of the mirror being a fixed axis. As a result, the reflecting surface is deformed from the concave surface into the convex surface.

The movable mirror device may also have a configuration wherein the mirror is preliminarily formed in a convex shape, wherein the movable electrode terminal is coupled to a central part of the mirror, and wherein the stationary electrode terminal faces the mirror with the movable electrode terminal in between. Namely, the reflecting surface is preliminarily formed as a convex surface, the drive section is provided in the region behind the reflecting surface out of the two regions defined by the mirror in the first direction intersecting with the reflecting surface, the stationary electrode terminal extends in the second direction intersecting with the first direction, the movable electrode terminal is coupled to the central part of the mirror in the second direction and extends in the second direction between the mirror and the stationary electrode terminal, and the mirror is fixed at two side portions in the second direction.

In this configuration, when a voltage is applied between the movable electrode terminal and the stationary electrode terminal, the movable electrode terminal is attracted toward the stationary electrode terminal by electrostatic force, whereby the mirror is deformed from the convex shape into the concave shape. Namely, when the voltage is applied between the movable electrode terminal and the stationary electrode terminal, the movable electrode terminal coupled to the central part of the mirror is attracted toward the stationary electrode terminal by the electrostatic force. This causes the central part of the mirror to move in the first direction toward the stationary electrode terminal, with the two side portions of the mirror being fixed axes. As a result, the reflecting surface is deformed from the convex surface into the concave surface.

(3) Still another movable mirror device of the present invention comprises a deformable mirror; a first movable electrode terminal coupled to a front surface of the mirror; a second movable electrode terminal coupled to a back surface of the mirror; a first stationary electrode terminal arranged to face the first movable electrode terminal; a second stationary electrode terminal arranged to face the second movable electrode terminal; first driving means for generating an electrostatic force between the first movable electrode terminal and the first stationary electrode terminal to move the first movable electrode terminal; and second driving means for generating an electrostatic force between the second movable electrode terminal and the second stationary electrode terminal to move the second movable electrode terminal.

In the movable mirror device of this configuration, for example, a flat mirror without flexure can be deformed into a curved shape by actuating at least one of the first driving means and the second driving means. Since in this configuration the first movable electrode terminal and the second movable electrode terminal for deformation of the mirror are provided on the front surface side and on the back surface side of the mirror, respectively, there is no need for a so large space in the width direction of the mirror even in the case where a desired clearance is secured between the first movable electrode terminal and the first stationary electrode terminal and where a desired clearance is secured between the second movable electrode terminal and the second stationary electrode terminal. This makes it feasible to decrease the width of the movable mirror device. When the desired clearances are secured between the first movable electrode terminal and the first stationary electrode terminal and between the second movable electrode terminal and the second stationary electrode terminal, the movable range of the first movable electrode terminal and the second movable electrode terminal can be made larger, so that the movable range of the mirror can be increased.

Preferably, the first movable electrode terminal is coupled to one side portion in a width direction of the mirror in the front surface of the mirror and extends forward from the mirror, and the second movable electrode terminal is coupled to another side portion in the width direction of the mirror in the back surface of the mirror and extends backward from the mirror. In this case, by actuating the both first driving means and second driving means, it is feasible, for example, to readily and securely deform the flat mirror without flexure into a curved shape.

In this case, the movable mirror device of the present invention preferably further comprises at another first stationary electrode terminal and another second stationary electrode terminal, and is preferably configured so that the two first stationary electrode terminals are disposed on both sides of the first movable electrode terminal so as to face each other with the first movable electrode terminal in between, and so that the two second stationary electrode terminals are disposed on both sides of the second movable electrode terminal so as to face each other with the second movable electrode terminal in between. In this configuration, the mirror can be deformed into the concave shape by generating an electrostatic force between the first movable electrode terminal and one first stationary electrode terminal and generating an electrostatic force between the second movable electrode terminal and one second stationary electrode terminal. The mirror can also be deformed into the convex shape by generating an electrostatic force between the first movable electrode terminal and the other first stationary electrode terminal and generating an electrostatic force between the second movable electrode terminal and the other second stationary electrode terminal. Therefore, where the movable mirror device of the present invention is applied, for example, to a dispersion compensator, it becomes feasible to effect compensation for both positive dispersion and negative dispersion.

Preferably, the movable mirror device of the present invention has a configuration further comprising another first stationary electrode terminal and another second stationary electrode terminal, wherein the first movable electrode terminal has a joint part coupled to the mirror, the first movable electrode terminal is disposed in a region on the front surface side out of two regions defined by the mirror in a first direction intersecting with the mirror, and the joint part of the first movable electrode terminal is coupled to the front surface of the mirror in one of two side portions of the mirror in a second direction intersecting with the first direction, wherein the second movable electrode terminal has a joint part coupled to the mirror, the second movable electrode terminal is disposed in a region on the back surface side out of the two regions, and the joint part of the second movable electrode terminal is coupled to the back surface of the mirror in the other side portion of the mirror in the second direction, wherein one of the two first stationary electrode terminals extends in the first direction along one of the two side portions in the second direction in the region on the front surface side, and the other of the two first stationary electrode terminals extends in the first direction along the other of the two side portions in the second direction in the region on the front surface side, wherein one of the two second stationary electrode terminals extends in the first direction along one of the two side portions in the second direction in the region on the back surface side, and the other of the two second stationary electrode terminals extends in the first direction along the other of the two side portions in the second direction in the region on the back surface side, wherein the first movable electrode terminal extends in the first direction between the two first stationary electrode terminals, wherein the second movable electrode terminal extends in the first direction between the two second stationary electrode terminals, and wherein the mirror is fixed at a portion along a center axis of the mirror intersecting with the first direction and with the second direction.

In this configuration, the front surface can be deformed either into the concave surface or into the convex surface by applying the voltage between the first movable electrode terminal and the first stationary electrode terminal placed along one side portion in the region on the front surface side and applying the voltage between the second movable electrode terminal and the second stationary electrode terminal placed along one side portion in the region on the back surface side. The front surface can be deformed into the other of the concave surface and the convex surface by applying the voltage between the first movable electrode terminal and the first stationary electrode terminal placed along the other side portion in the region on the front surface side and applying the voltage between the second movable electrode terminal and the second stationary electrode terminal placed along the other side portion in the region on the back surface side.

Here, preferably, each of the first movable electrode terminal and the second movable electrode terminal has a portion extending toward the center in the width direction of the mirror. Namely, each of the joint part of the first movable electrode terminal and the joint part of the second movable electrode terminal has a portion extending toward a plane intersecting with a central part in the second direction of the mirror and extending in the first direction, and the first movable electrode terminal and the second movable electrode terminal are provided along the plane. This makes it feasible to decrease the width of the movable mirror device more.

Preferably, the first stationary electrode terminal is disposed on one side of the first movable electrode terminal, and the second stationary electrode terminal is disposed on one side of the second movable electrode terminal and on the same side as the first stationary electrode terminal is. In this configuration, the mirror can be adequately deformed into the concave shape or into the convex shape. Therefore, where the movable mirror device of the present invention is applied, for example, to a dispersion compensator, it becomes feasible to effect compensation for large positive dispersion or large negative dispersion.

In this case, preferably, the first movable electrode terminal has a portion extending toward a side of the other side portion of the mirror, and the first stationary electrode terminal and the second stationary electrode terminal are disposed on a side of the one side portion of the mirror, with respect to the first movable electrode terminal and the second movable electrode terminal. In this configuration, for example, the flat mirror without flexure can be deformed into the convex shape while reducing the width of the movable mirror device more.

For example, in this case, preferably, the mirror is preliminarily formed in a concave shape with respect to the front surface of the mirror. In this configuration, the mirror can be deformed into the concave shape and into the convex shape even in a case where the stationary electrode terminal is provided on only one side of the movable electrode terminal.

In the movable mirror device of the present invention, preferably, the first movable electrode terminal has a joint part coupled to the mirror, the first movable electrode terminal is disposed in a region on the front surface side out of two regions defined by the mirror in a first direction intersecting with the mirror, the joint part of the first movable electrode terminal is coupled to the front surface of the mirror in one of two side portions of the mirror in a second direction intersecting with the first direction, the second movable electrode terminal has a joint part coupled to the mirror, the second movable electrode terminal is disposed in a region on the back surface side out of the two regions, the joint part of the second movable electrode terminal is coupled to the back surface of the mirror in the other side portion of the mirror in the second direction, the first stationary electrode terminal extends in the first direction along one of the two side portions in the second direction in the region on the front surface side, the second stationary electrode terminal extends in the first direction along one of the two side portions in the second direction in the region on the back surface side, the first movable electrode terminal extends in the first direction along the other of the two side portions in the second direction in the region on the front surface side, the second movable electrode terminal extends in the first direction along the other of the two side portions in the second direction in the region on the back surface side, and the mirror is fixed at a portion along a center axis of the mirror intersecting with the first direction and with the second direction.

This configuration increases the distance between the first movable electrode terminal and the first stationary electrode terminal and the distance between the second movable electrode terminal and the second stationary electrode terminal. Therefore, it is feasible to largely deform the front surface of the mirror into a convex surface.

In this configuration, the front surface of the mirror may be a surface for reflecting incident light, and is concave. In this case, the front surface of the mirror, i.e., the reflecting surface can be deformed from the concave surface into the convex surface. Therefore, where this movable mirror device is applied, for example, to a dispersion compensator, it becomes feasible to effect compensation for positive dispersion and negative dispersion.

The movable mirror device of the present invention may also have a configuration wherein the second movable electrode terminal has a portion extending toward a side of the one side portion of the mirror, and wherein the first stationary electrode terminal and the second stationary electrode terminal are disposed on a side of the other side portion of the mirror, with respect to the first movable electrode terminal and the second movable electrode terminal. In this configuration, for example, the flat mirror without flexure can be deformed into the concave shape while reducing the width of the movable mirror device more.

For example, in this case, preferably, the mirror is preliminarily formed in a convex shape with respect to the front surface of the mirror. In this configuration, the mirror can be deformed into the concave shape and into the convex shape even in the case where the stationary electrode terminal is provided on only one side of the movable electrode terminal.

In the movable mirror device of the present invention, preferably, the first movable electrode terminal has a joint part coupled to the mirror, the first movable electrode terminal is disposed in a region on the front surface side out of two regions defined by the mirror in a first direction intersecting with the mirror, the joint part of the first movable electrode terminal is coupled to the front surface of the mirror in one of two side portions of the mirror in a second direction intersecting with the first direction, the second movable electrode terminal has a joint part coupled to the mirror, the second movable electrode terminal is disposed in a region on the back surface side out of the two regions, the joint part of the second movable electrode terminal is coupled to the back surface of the mirror in the other side portion of the mirror in the second direction, the first movable electrode terminal extends in the first direction along one of the two side portions in the second direction in the region on the front surface side, the second movable electrode terminal extends in the first direction along one of the two side portions in the second direction in the region on the back surface side, the first stationary electrode terminal extends in the first direction along the other side portion out of the two side portions in the second direction in the region on the front surface side, the second stationary electrode terminal extends in the first direction along the other side portion out of the two side portions in the second direction in the region on the back surface side, and the mirror is fixed at a portion along a center axis of the mirror intersecting with the first direction and with the second direction.

This configuration increases the distance between the first movable electrode terminal and the first stationary electrode terminal and the distance between the second movable electrode terminal and the second stationary electrode terminal. Therefore, it becomes feasible to largely deform the front surface of the mirror into the concave surface.

In this configuration, the front surface of the mirror may be a surface for reflecting incident light, and is convex. In this case, the front surface of the mirror, i.e., the reflecting surface can be deformed from the convex surface into the concave surface. Therefore, where this movable mirror device is applied, for example, to a dispersion compensator, it becomes feasible to effect compensation for positive dispersion and negative dispersion.

Furthermore, preferably, each of the first movable electrode terminal and the second movable electrode terminal is coupled to a central portion in a height direction of the mirror, and has a portion extending in the height direction of the mirror. Namely, each of the joint part of the first movable electrode terminal and the joint part of the second movable electrode terminal is coupled to the central part of the mirror in the third direction intersecting with the first direction and with the second direction, and has a portion extending in the third direction. In this configuration, for example, even in the case where the first movable electrode terminal and the second movable electrode terminal have the portions extending toward the center in the width direction (second direction) of the mirror, it is feasible to secure a large effective area to be used as a light reflecting region in the front surface of the mirror and to deform the mirror in symmetry in the two side portions in the width direction of the mirror.

Preferably, the movable mirror device has a configuration wherein the first movable electrode terminal is coupled to two side portions in a width direction of the mirror in the front surface of the mirror, wherein the second movable electrode terminal is coupled to two side portions in the width direction of the mirror in the back surface of the mirror, wherein the first stationary electrode terminal faces the mirror with the first movable electrode terminal in between, and wherein the second stationary electrode terminal faces the mirror with the second movable electrode terminal in between. Namely, the first movable electrode terminal extends in the second direction intersecting with the first direction, in the region on the front surface side out of the two regions defined by the mirror in the first direction intersecting with the mirror, the second movable electrode terminal extends in the second direction in the region on the back surface side out of the two regions, the first movable electrode terminal has a joint part coupled to the mirror, the joint part is coupled to the front surface of the mirror in the two side portions of the mirror in the second direction, the second movable electrode terminal has a joint part coupled to the mirror, the joint part is coupled to the rear surface of the mirror in the two side portions of the mirror in the second direction, and the mirror is fixed at a portion along the center axis of the mirror intersecting with the first direction and with the second direction. In this case, for example, the flat mirror without flexure can be readily and securely deformed into the concave shape with respect to the front surface of the mirror by actuating the first driving means. Namely, where the front surface of the mirror is the flat surface, the front surface can be deformed into a concave surface by actuating the first driving means. By actuating the second driving means, for example, the flat mirror without flexure can be readily and securely deformed into the convex shape with respect to the front surface of the mirror. Namely, where the front surface of the mirror is the flat surface, the front surface can be deformed into the convex surface by actuating the second driving means.

The movable mirror device may also have a configuration wherein the first movable electrode terminal is coupled to a central portion in a width direction of the mirror in the front surface of the mirror, wherein the second movable electrode terminal is coupled to a central portion in the width direction of the mirror in the back surface of the mirror, wherein the first stationary electrode terminal faces the mirror with the first movable electrode terminal in between, and wherein the second stationary electrode terminal faces the mirror with the second movable electrode terminal in between. Namely, the first movable electrode terminal extends in the second direction intersecting with the first direction, in the region on the front surface side out of the two regions defined by the mirror in the first direction intersecting with the mirror, the second movable electrode terminal extends in the second direction in the region on the back surface side out of the regions, the first movable electrode terminal has a joint part coupled to the mirror, the joint part is coupled to the front surface of the mirror in the central part of the mirror in the second direction, the second movable electrode terminal has a joint part coupled to the mirror, the joint part is coupled to the rear surface of the mirror in the central part of the mirror in the second direction, and the mirror is fixed at two side portions in the second direction. In this case, for example, the flat mirror without flexure can be readily and securely deformed into the convex shape with respect to the front surface of the mirror, by actuating the first driving means. Namely, where the front surface of the mirror is the flat surface, the front surface can be deformed into the convex surface by actuating the first driving means. By actuating the second driving means, for example, the flat mirror without flexure can be readily and securely deformed into the concave shape with respect to the front surface of the mirror. Namely, where the front surface of the mirror is the flat surface, the front surface can be deformed into the concave surface by actuating the second driving means.

The present invention also provides a dispersion compensator for giving signal light a phase shift to effect a compensation for dispersion of the signal light, the dispersion compensator comprising: light separating means for separating signal light into wavelength components; and a plurality of movable mirror devices as set forth, to which the respective signal light components separated by the light separating means are incident.

By providing the dispersion compensator with the movable mirror devices based on the aforementioned invention (1) or (2), it is feasible to compensate for both positive dispersion and negative dispersion, as described above. For this reason, it becomes feasible to implement highly accurate dispersion compensation. By providing the dispersion compensator with the movable mirror devices of small width based on the aforementioned invention (3), it is feasible to array the mirrors of the respective movable mirror devices at a narrow pitch. Since the movable ranges of the respective mirrors are expanded as described above, it is feasible to increase amounts of dispersion compensation. This enables highly accurate dispersion compensation.

DESCRIPTION OF THE PREFERRED EMBODIMENTS

The preferred embodiments of the present invention will be described below with reference to the drawings. The embodiments will be described with reference symbols for each of the drawings.

Figure 1:
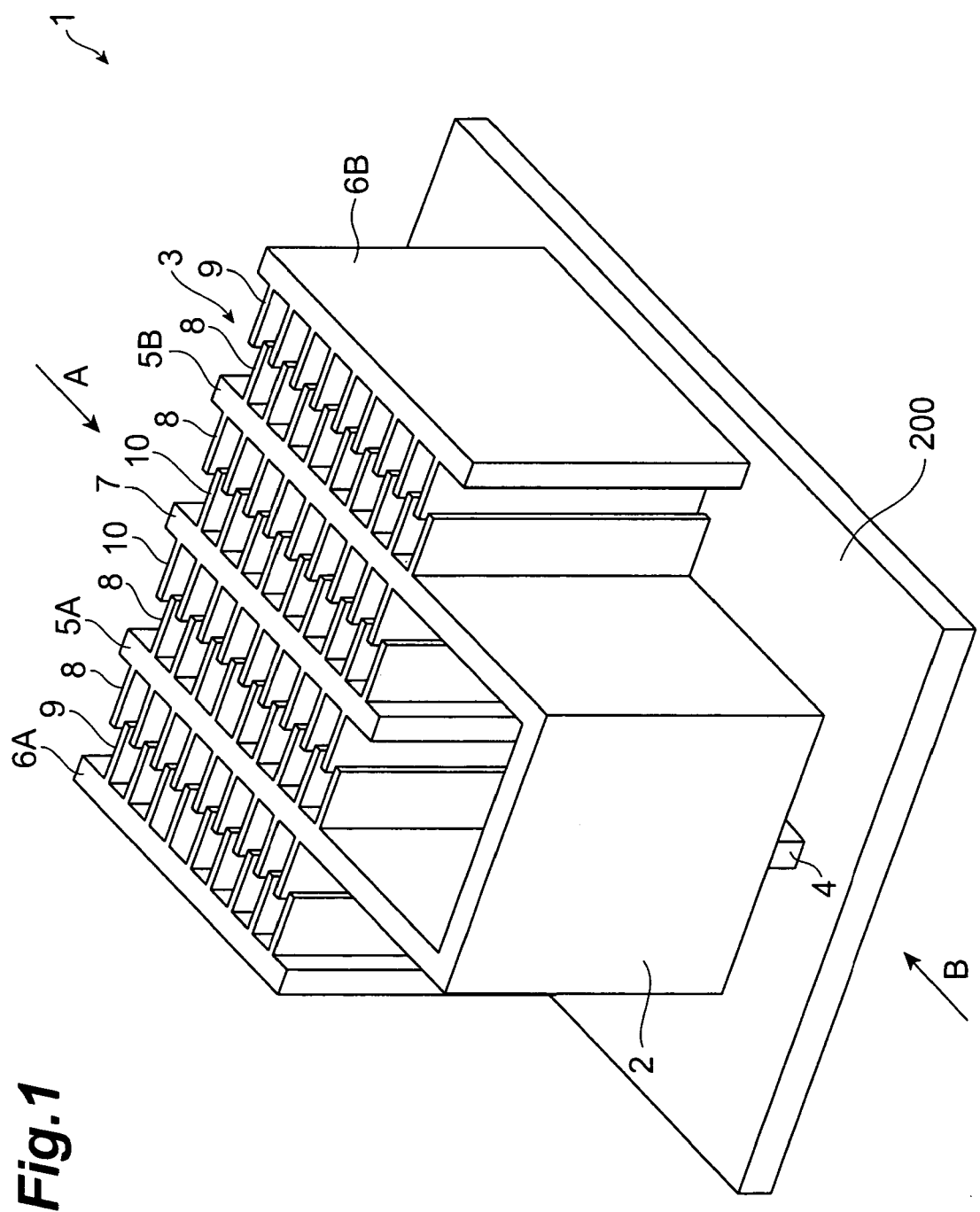
FIG. 1 is a perspective view showing an embodiment of the movable mirror device according to the present invention.

FIG. 1 is a perspective view showing an embodiment of the movable mirror device according to the present invention. The movable mirror device 1 of the present embodiment shown in FIG. 1 is, for example, a structure fabricated by the MEMS (Mirco-Electro-Mechanical-System) technology.

The movable mirror device 1 shown in FIG. 1 is comprised of a platelike mirror 2 for reflecting signal light, and a drive section 3 for deforming the mirror 2. The central part of the mirror 2 is coupled to a fixed portion 4 provided on a substrate 200. Namely, the mirror 2 is fixed at a portion along the center axis of the mirror 2, to the substrate 200. This center axis is an axis passing the center in the width direction of the mirror 2 and extending in a direction intersecting with the substrate 200. Since in this structure only the central part of the mirror 2 is supported and fixed on the substrate 200, the mirror 2 is deformable into a curved shape around a fulcrum at the center (cf. FIG. 2). Namely, the mirror 2 can be curved around the center axis. In the present specification, a direction intersecting with the mirror 2 or with the reflecting surface of the mirror 2 will sometimes be referred to as a first direction, a width direction of the mirror 2 intersecting with the first direction, as a second direction, and the extending direction of the center axis being a direction intersecting with the first direction and with the second direction, as a third direction.

The drive section 3 has two movable electrode terminals 5A, 5B coupled to two ends of the mirror 2 and extending backward from the mirror 2 (on the opposite side of the mirror to the reflecting surface), and two stationary electrode terminals 6A, 6B and a stationary electrode terminal 7 fixed to the substrate 200 so as to face the movable electrode terminals 5A, 5B.

Namely, the drive section 3 is provided in the region behind the reflecting surface of the mirror 2, out of the two regions defined by the mirror 2 in the first direction. The movable electrode terminal 5A is coupled to one side portion out of the two side portions in the width direction of the mirror 2, and the movable electrode terminal 5B is coupled to the other side portion out of the two side portions in the width direction of the mirror 2. The movable electrode terminals 5A, 5B extend in the first direction. The stationary electrode terminals 6A, 6B also extend in the first direction similarly. The movable electrode terminals 5A, 5B are provided between the stationary electrode terminals 6A and 6B.

The movable electrode terminals 5A, 5B are not fixed to the substrate 200 and are in a floating state relative to the substrate 200. The stationary electrode terminal 7 is placed between the movable electrode terminals 5A, 5B. The stationary electrode terminal 6A faces the stationary electrode terminal 7 with the movable electrode terminal 5A in between, and the stationary electrode terminal 6B faces the stationary electrode terminal 7 with the movable electrode terminal 5B in between. The movable electrode terminals 5A, 5B are provided with fingers 8 on both sides thereof, the stationary electrode terminals 6A, 6B are provided with fingers 9 on one side thereof (which is the side where the movable electrode terminals 5A, 5B are located), and the stationary electrode terminal 7 is provided with fingers 10 on both sides thereof.

The mirror 2 and drive section 3 as described above are formed, for example, by anisotropic etching and other processes of a silicon substrate containing an oxide film (insulator) in part. The front surface (reflecting surface) of the mirror 2 is coated with gold or the like to increase the optical reflectance. An example of a method of forming the mirror 2 and drive section 3 is shown in FIG. 2.

Figure 2:
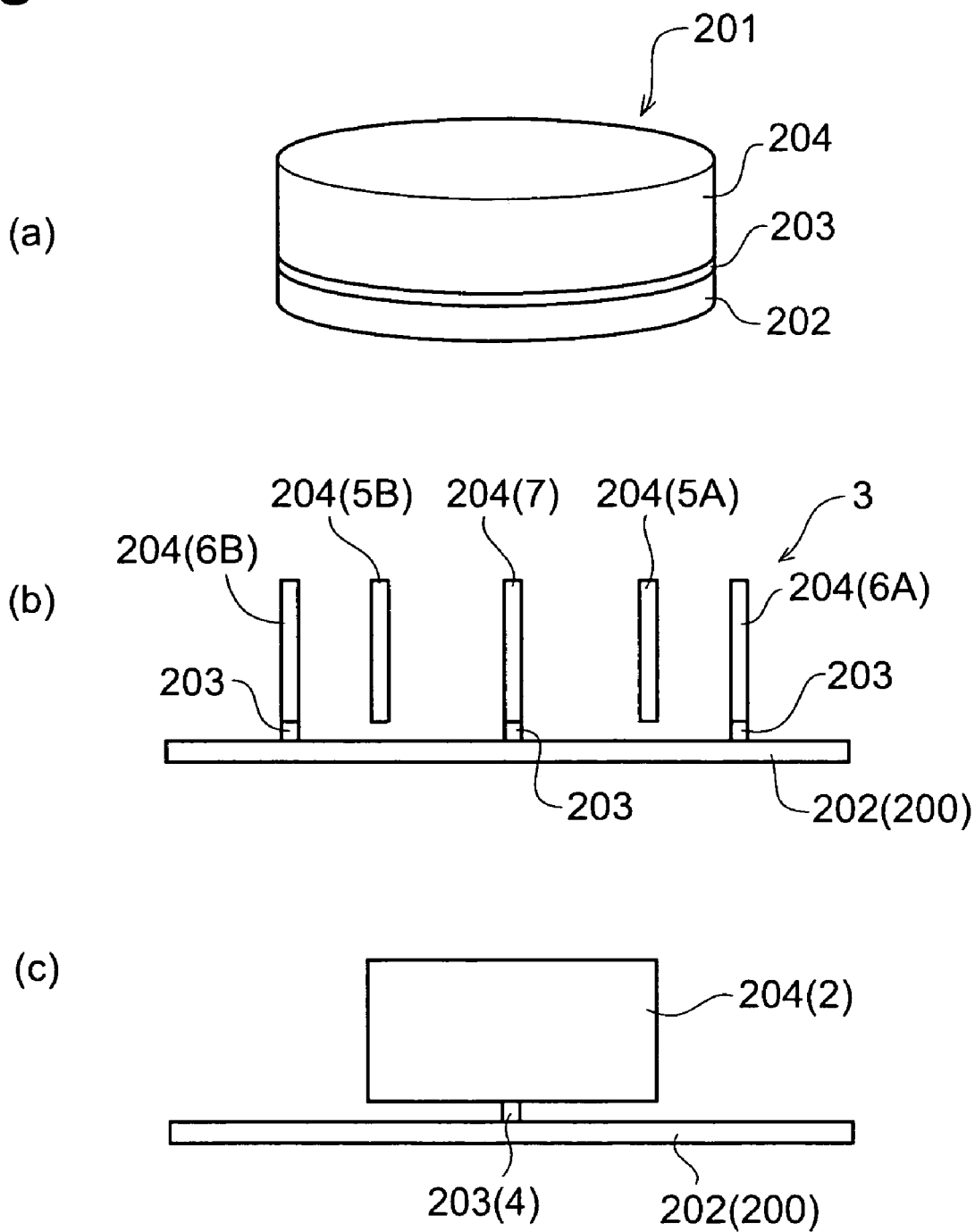
FIG. 2 is an illustration showing an example of a method of forming the movable mirror device shown in FIG. 1.

FIG. 2 is an illustration showing an example of the method of forming the movable mirror device shown in FIG. 1. In this forming method, the first step is to prepare a silicon substrate 201 as shown in FIG. 2(a). The silicon substrate 201 has a three-layer structure consisting of a lower silicon layer 202, an oxide film layer 203, and an upper silicon layer 204.

In this silicon substrate 201, the upper silicon layer 204 is first etched to form a structure having the mirror 2, movable electrode terminals 5A, 5B, and stationary electrode terminals 6A, 6B, 7. Then the oxide film layer 203 under the movable electrode terminals 5A, 5B and the oxide film layer 203 under the mirror 2 except for the central part of the mirror 2 are etched to obtain a structure in which the mirror 2 and drive section 3 are formed on the substrate 200 as described above, as shown in FIGS. 2(b) and (c). FIG. 2(b) is a view of the movable mirror device 1 from the direction A in FIG. 1, in which the mirror 2 and fingers 8–10 are omitted. FIG. 2(c) is a view of the movable mirror device 1 from the direction B in FIG. 1, in which the drive section 3 is omitted.

Figure 3:
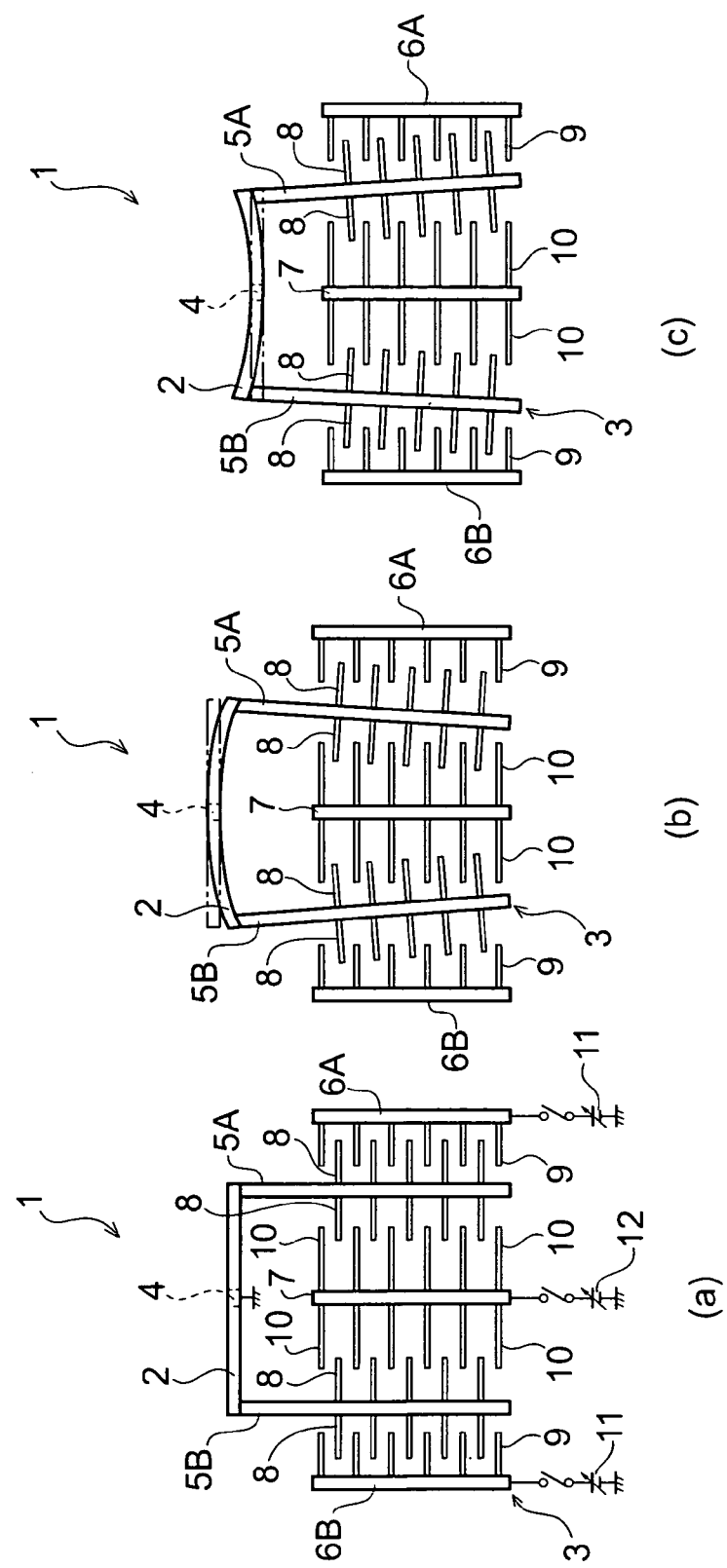
FIG. 3 is an illustration showing the operation of the movable mirror device shown in FIG. 1.

The operation of the movable mirror device 1 shown in FIG. 1 will be described below. FIG. 3 is an illustration showing the operation of the movable mirror device shown in FIG. 1. As shown in FIG. 3(a), the movable electrode terminals 5A, 5B are grounded through the mirror 2 and fixed portion 4. A variable voltage source 11 is connected to each stationary electrode terminal 6A, 6B, and a variable voltage source 12 to the stationary electrode terminal 7. In an initial state in which the voltage applied by the variable voltage sources 11, 12 is zero, the mirror 2 is in a flat state without flexure, as shown in FIG. 3(a).

When the variable voltage source 12 applies a voltage to the stationary electrode terminal 7, an electrostatic force (electrostatic attraction) is generated between the movable electrode terminals 5A, 5B and the stationary electrode terminal 7, as shown in FIG. 3(b), so that the movable electrode terminals 5A, 5B are attracted toward the stationary electrode terminal 7 by the electrostatic force. This causes the mirror 2 to be bent into a convex shape with respect to the front surface (reflecting surface) thereof. Namely, when the movable electrode terminals 5A, 5B are subject to the electrostatic attraction from the stationary electrode terminal 7, the two side portions of the mirror 2 to which the movable electrode terminals 5A, 5B are coupled, undergo the force toward the stationary electrode terminal 7. This stationary electrode terminal 7 is positioned at the center in the second direction in the region behind the reflecting surface of the mirror 2. Therefore, the reflecting surface of the mirror 2 is deformed into a convex surface, as shown in FIG. 3(b), around the portion along the center axis.

On the other hand, when the variable voltage sources 11 apply a voltage to the stationary electrode terminals 6A, 6B, an electrostatic force is generated between the movable electrode terminals 5A, 5B and the stationary electrode terminals 6A, 6B, so that the movable electrode terminals 5A, 5B are attracted toward the stationary electrode terminals 6A, 6B by the electrostatic force, as shown in FIG. 3(c), whereby the mirror 2 is bent into a concave shape with respect to the front surface. Namely, the movable electrode terminal 5A is subject to the electrostatic attraction from the stationary electrode terminal 6A, and the movable electrode terminal 5B to the electrostatic attraction from the stationary electrode terminal 6A, whereupon the two side portions of the mirror 2 to which the movable electrode terminals 5A, 5B are connected, undergo the forces in the opposite directions to those in the state shown in FIG. 3(b) As a result, the reflecting surface of the mirror 2 is deformed into a concave surface, as shown in FIG. 3(c), around the portion along the center axis. In this configuration, the amount of flexure (curvature) of the mirror 2 varies with change in the voltage applied by the variable voltage sources 11, 12.

Since the movable electrode terminals 5A, 5B and the stationary electrode terminals 6A, 6B, 7 are all of the interdigital structure, the electrostatic force is enhanced thereby between the movable electrode terminals 5A, 5B and the stationary electrode terminals 6A, 6B, 7. Therefore, the movable electrode terminals 5A, 5B can be driven by a lower voltage by that degree, and it is thus feasible to achieve power saving.

Figure 4:
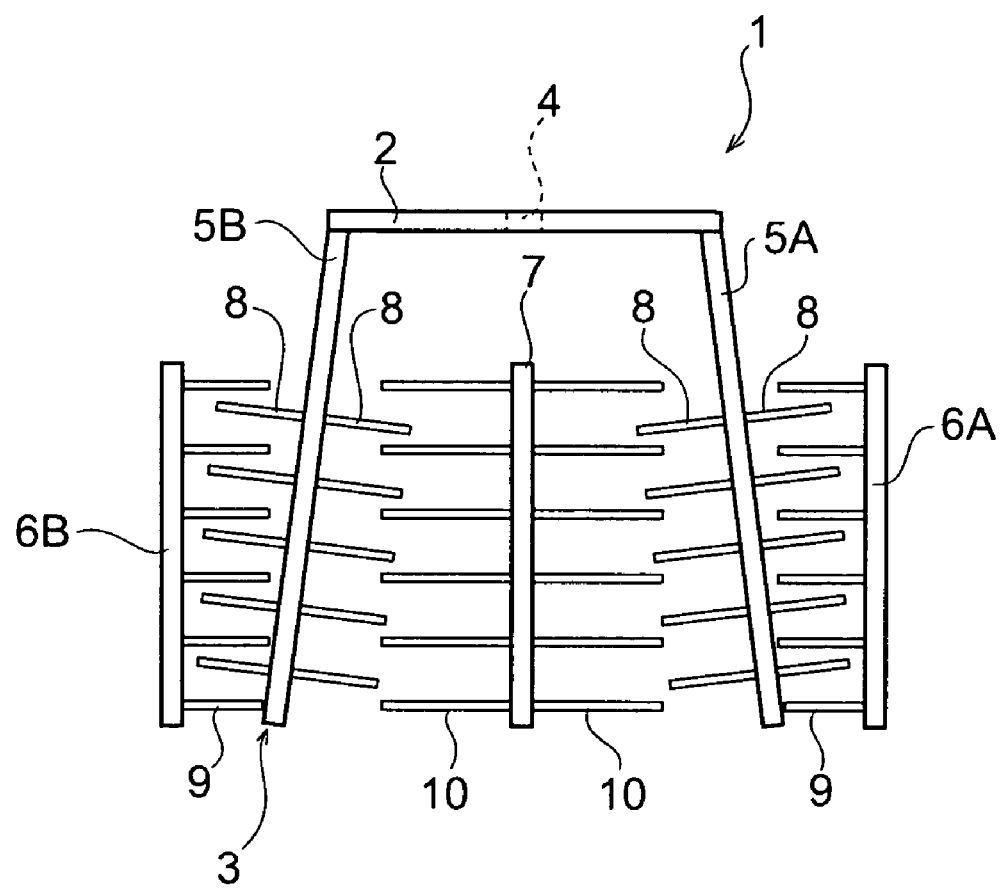
FIG. 4 is an illustration showing a state in which movable electrode terminals are moved, in a case where the rigidity of the joint parts between the mirror and the movable electrode terminals shown in FIG. 1 is smaller than that of the central part of the mirror.

If the rigidity of the joint parts between the mirror 2 and the movable electrode terminals 5A, 5B is smaller than that of the central part of the mirror 2, i.e., if the rigidity of the two side portions in the width direction of the mirror 2 is smaller than that of the other portion in the width direction of the mirror 2, the application of the voltage to the stationary electrode terminals 6A, 6B and to the stationary electrode terminal 7 can result in merely changing the angles between the mirror 2 and the movable electrode terminals 5A, 5B, as shown in FIG. 4, without deformation of the mirror 2, so that the mirror 2 can remain in the flat state.

For this reason, the rigidity of the joint parts between the mirror 2 and the movable electrode terminals 5A, 5B is preferably larger than that of the central part of the mirror 2. Here the rigidity of the joint parts between the mirror 2 and the movable electrode terminals 5A, 5B is particularly preferably as high as the angles between the mirror 2 and the movable electrode terminals 5A, 5B can be maintained in the state at the applied voltage of zero (90° in FIG. 2). This facilitates the deformation of the mirror 2 into the curved shape with the application of the voltage to the stationary electrode terminals 6A, 6B and to the stationary electrode terminal 7 to move the movable electrode terminals 5A, 5B toward the stationary electrode terminals 6A, 6B or to the stationary electrode terminal 7, whereby the mirror 2 can be smoothly and efficiently deformed.

In the present embodiment as described above, the mirror 2 can be deformed in the two ways from the flat state into both the convex shape and the concave shape. This expands the movable range of the mirror 2.

Since the mirror 2 is flat in the initial state, no large stress is generated in the mirror 2 during movement of the mirror 2. This permits the mirror 2 to be deformed on a stable basis. The mirror 2 can also be readily fabricated.

Figure 5:
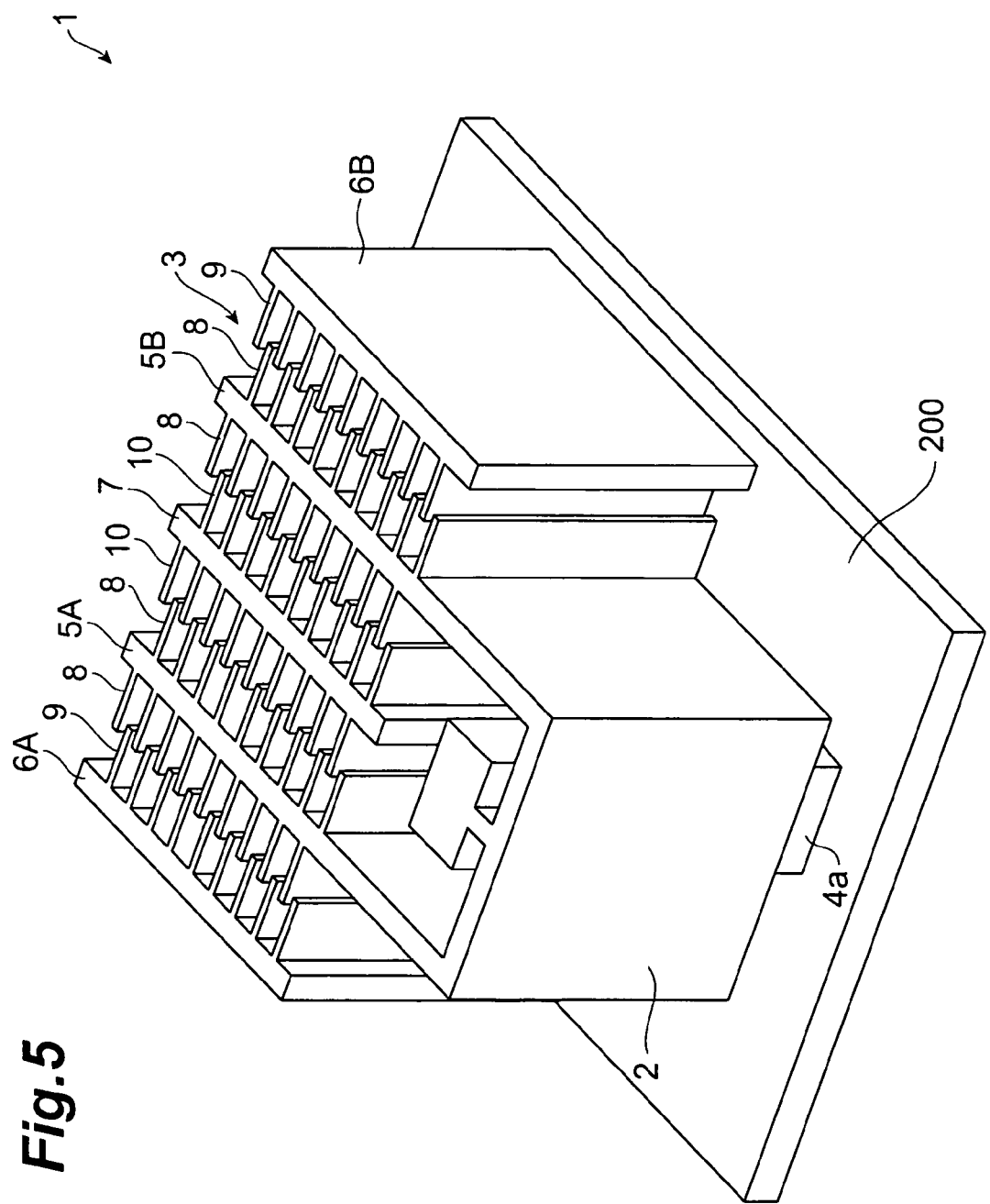
FIG. 5 is a perspective view showing a modification example of the movable mirror device according to the present invention.

FIG. 5 shows a modification example of the movable mirror device 1 of the present embodiment. In this movable mirror device 1, the central part of the mirror 2 is supported and fixed to the substrate 200 through a fixed portion 4a having a larger fixing region than the aforementioned fixed portion 4. The fixed portion 4a is provided behind the mirror 2 (on the opposite side of the mirror to the reflecting surface) on the substrate 200 and extends in the height direction of the mirror 2 (in the vertical direction to the substrate 200). The central part of the back surface of the mirror 2 (the surface on the opposite side of the mirror to the reflecting surface) is coupled to the fixed portion 4a. Namely, in the movable mirror device 1 shown in FIG. 5, the fixed portion 4a extends in the third direction intersecting with the substrate 200, in the region behind the reflecting surface of the mirror 2. This fixed portion 4a holds the portion along the center axis of the mirror 2 in the surface opposite to the reflecting surface of the mirror 2.

In the forming process shown in FIG. 2, it is sometimes difficult to etch the oxide film layer 203 so as to leave a small portion of the oxide film layer 203 under the mirror 2. In forming the structure in the present modification example, even if the oxide film layer 203 is completely etched away from under the mirror 2, there will remain the oxide film layer 203 forming the fixed portion 4a, and thus the structure for supporting the central part of the mirror 2 on the substrate 200 can be readily formed.

Figure 6:
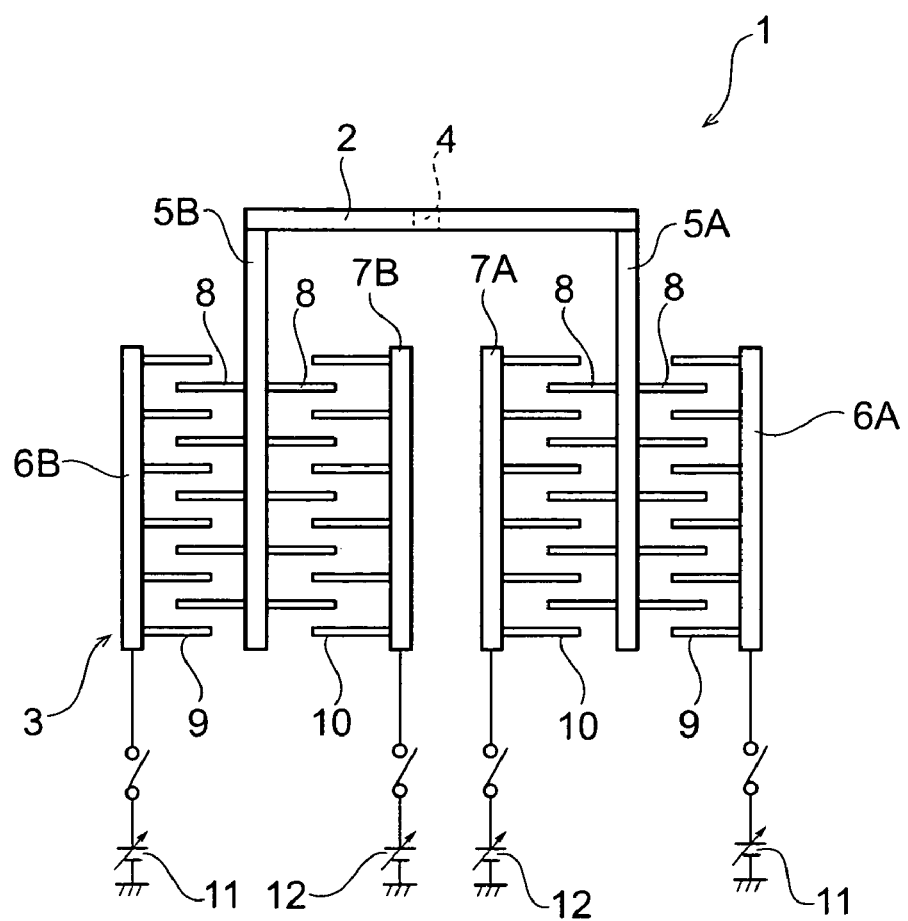
FIG. 6 is a configuration diagram showing another modification example of the movable mirror device according to the present invention.

FIG. 6 shows another modification example of the movable mirror device 1 of the present embodiment. This movable mirror device 1 has stationary electrode terminals 7A, 7B placed between the movable electrode terminals 5A, 5B, instead of the stationary electrode terminal 7. The stationary electrode terminal 7A faces the stationary electrode terminal 6A with the movable electrode terminal 5A in between, and the stationary electrode terminal 7B faces the stationary electrode terminal 6B with the movable electrode terminal 5B in between. A variable voltage source 12 is connected to each of the stationary electrode terminals 7A, 7B. In this case, the operation of the movable electrode terminal 5A and the operation of the movable electrode terminal 5B can be controlled completely independently of each other.

Figure 7:
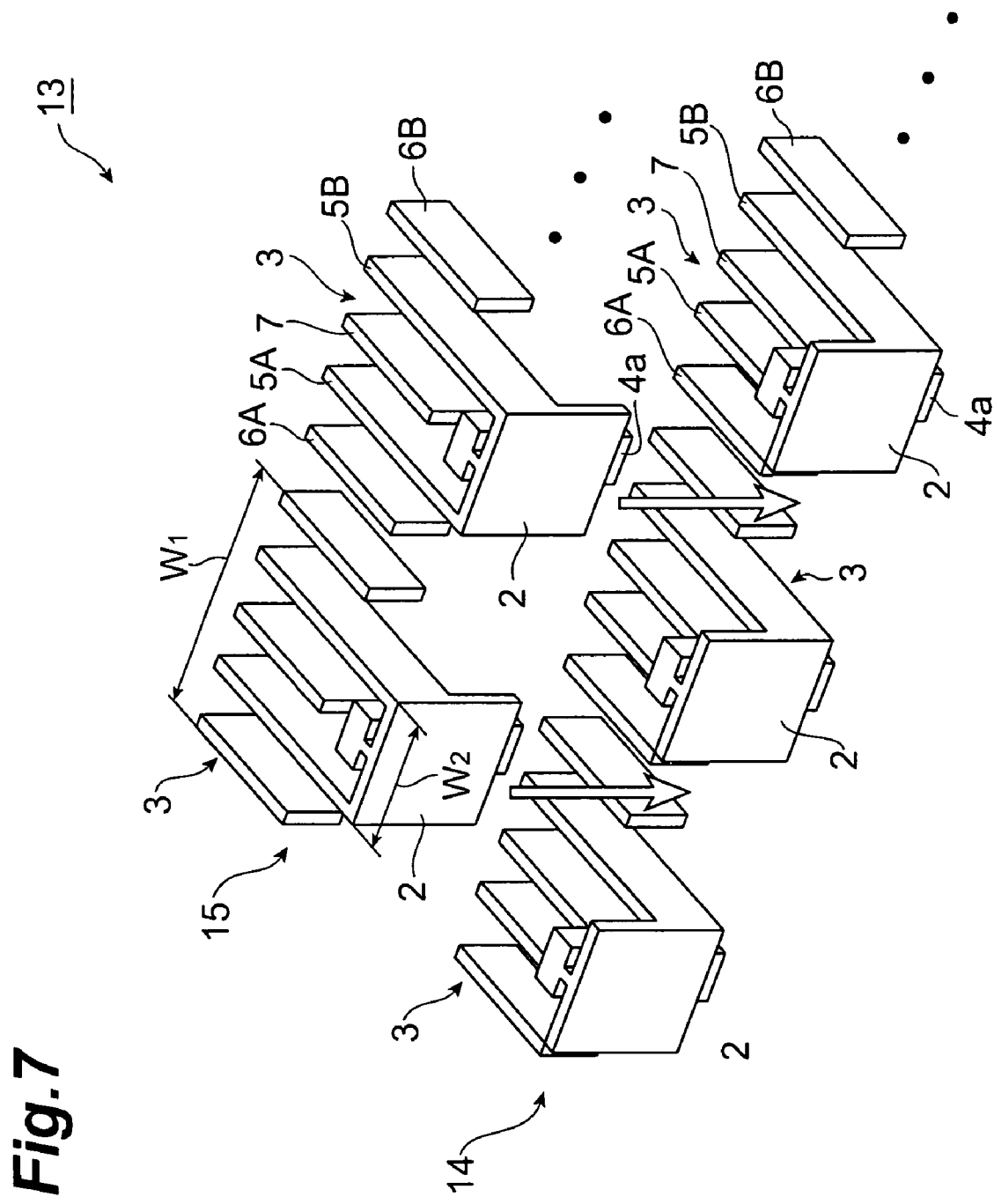
FIG. 7 is an exploded perspective view showing a movable mirror device array as an application of the movable mirror device shown in FIG. 5.

FIG. 7 shows a movable mirror device array as an application of the aforementioned movable mirror device 1. In the drawing, identical or equivalent members to those in the above movable mirror device 1 are denoted by the same reference symbols, without redundant description thereof.

The movable mirror device array 13 shown in FIG. 7 has two mirror array chips 14, 15, and each of the mirror array chips 14, 15 has plural sets of mirrors 2 and drive sections 3 arrayed on a substrate (not shown). FIG. 7 is illustrated without illustration of the fingers of the movable electrode terminals 5A, 5B and the stationary electrode terminals 6A, 6B, 7. The height of the drive sections 3 is half of that of the mirrors 2. Namely, the reflecting surfaces of the mirrors 2 project from the drive sections 3 in the third direction.

The movable mirror device array 13 is constructed in such a combinational configuration of mirror array chips 14, 15 that the mirrors 2 of the mirror array chip 15 are interposed between adjacent mirrors 2 of the mirror array chip 14 and that the drive sections 3 of the mirror array chips 14, 15 are opposed to each other. Namely, the plurality of mirrors 2 are one-dimensionally arrayed, while the plurality of drive sections 3 are two-dimensionally arrayed.

This permits the plurality of mirrors 2 to be arrayed with little clearance even if the width $W_1$ of the drive sections 3 is larger than the width $W_2$ of the mirrors 2. Accordingly, it becomes feasible to suitably apply the movable mirror device array 13 to a dispersion compensator for giving signal light a phase shift to compensate for dispersion of the signal light.

Figure 8:
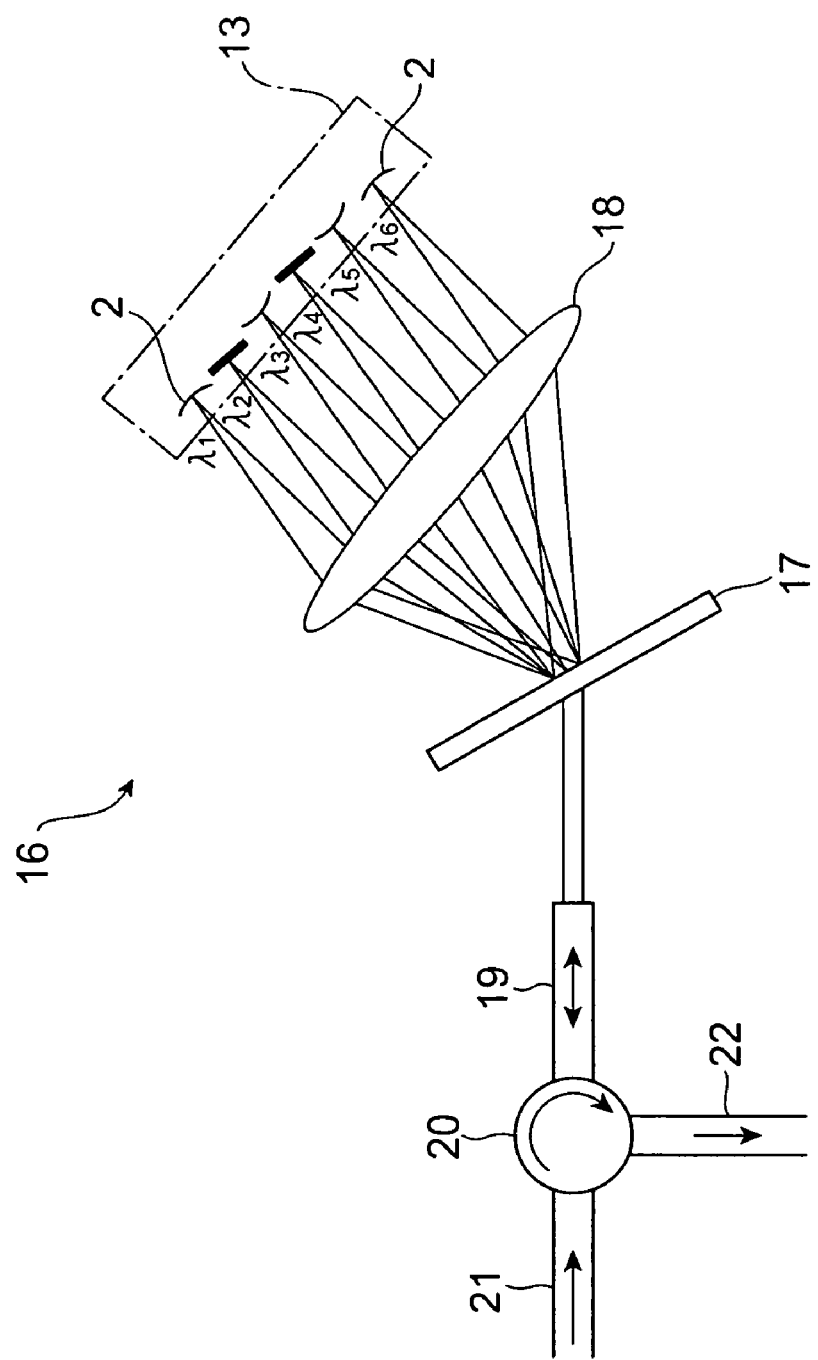
FIG. 8 is a configuration diagram showing an example of a dispersion compensator provided with the movable mirror device array shown in FIG. 7.

FIG. 8 is a configuration diagram showing an example of the dispersion compensator provided with the aforementioned movable mirror device array 13.

The dispersion compensator 16 shown in FIG. 8 has a diffraction grating 17 (light separating means), the aforementioned movable mirror device array 13, and a lens 18 disposed between the diffraction grating 17 and the movable mirror device array 13. The diffraction grating 17 separates (or spectroscopically divides) signal light containing a plurality of wavelength components from an optical transmission path 19 for dispersion compensation, into wavelength components. The mirrors 2 of the movable mirror device array 13 reflect the respective signal light components of wavelength channels separated by the diffraction grating 17. The dispersion-compensation optical transmission path 19 is connected through an optical circulator 20 to an input optical transmission path 21 and to an output optical transmission path 22.

In the dispersion compensator 16 of this configuration, the signal light injected into the input optical transmission path 21 travels through the optical circulator 20 to emerge from the dispersion-compensation optical transmission path 19, and the signal light is then separated into the wavelength components by the diffraction grating 17. Then the signal light propagates through the lens 18 to the movable mirror device array 13 to be reflected by each of the mirrors 2.

The signal light components of respective wavelength channels diffracted at different angles by the diffraction grating 17 are converged on the mirrors 2 corresponding to the respective channels (center wavelengths $\lambda_1-\lambda_6$) by the lens 18. At this time, the mirrors 2 are controlled in their flexure amount so as to compensate for dispersion by giving desired phase differences to the separated signal light components of the respective wavelength channels. Since on each mirror 2 in-band wavelength components in a corresponding channel are continuously converged at respective, different positions, there occurs a phase difference between wavelengths because of the curvature of the mirror 2, whereby dispersion can be added. For this reason, by adjusting the curvature of each mirror 2, dispersion compensation can be implemented in different compensation amounts for the respective channels.

The signal light components reflected by the respective mirrors 2 propagate again through the lens 18 to the diffraction grating 17 to be multiplexed in this diffraction grating 17. Then the multiplexed signal light travels through the dispersion-compensation optical transmission path 19, the optical circulator 20, and the output optical transmission path 22 to be outputted.

Since the mirrors 2 can be deformed both into the convex shape and into the concave shape as described above, they can compensate for both positive dispersion and negative dispersion with certainty. Therefore, the dispersion compensation for each wavelength can be controlled with good controllability, so that the dispersion compensation can be effected with high accuracy.

In the dispersion compensator 16 shown in FIG. 8, supposing the grating period of the diffraction grating 17 is 1 µm and the focal length of the lens 18 is 100 mm, where the channel spacing of the signal light is 100 GHz, the width $W_2$ of the mirrors 2 in the movable mirror device array 13 is preferably about 120 µm. In this case, for example, supposing the range of dispersion compensation amounts is ±800 ps/nm, a necessary maximum mirror displacement is a forward or backward travel of about 6 µm from the initial position (the flat state of the mirrors 2) at the ends of the mirrors 2. The absolute value of the radius of curvature of the mirrors 2 at this time is about 0.25 mm.

The above described the application of the foregoing movable mirror device array 13 to the dispersion compensator, but it can also be applied, for example, to pickup devices of DVD, displays, etc. to compensate for irregularities of phases and wavefronts of light, thereby achieving improvement in the quality of images and others.

Figure 9:
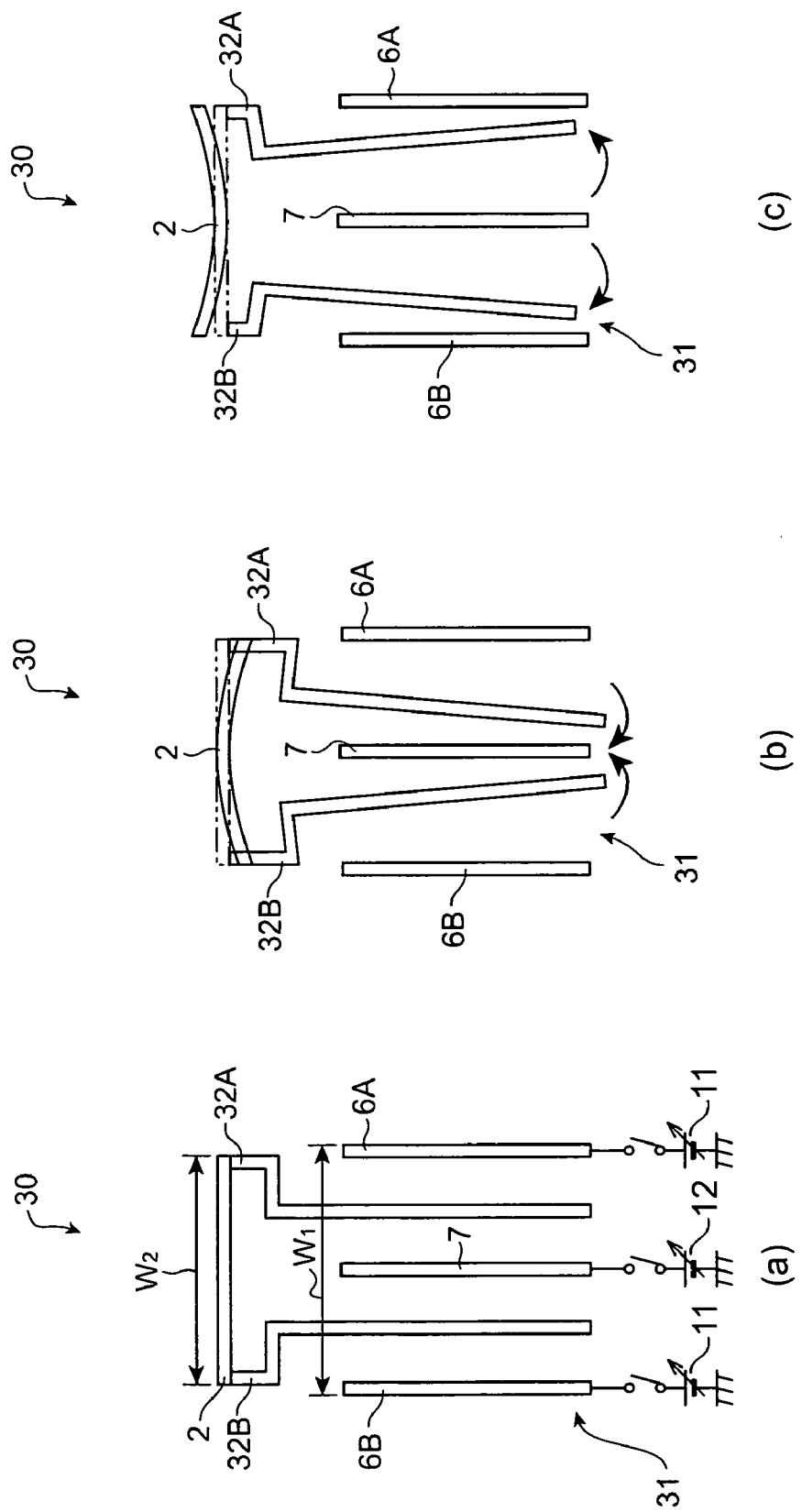
FIG. 9 is an illustration showing a schematic configuration and operation of an embodiment of the movable mirror device according to the present invention.

Another embodiment of the movable mirror device according to the present invention will be described below. FIG. 9 is a schematic configuration diagram showing an embodiment of the movable mirror device according to the present invention. In FIG. 9, identical or equivalent members to those in the above-described embodiment are denoted by the same reference symbols. The description of the identical or equivalent members to those in the above-described embodiment will be omitted below.

The movable mirror device 30 of the present embodiment shown in FIG. 9 has a drive section 31 for deforming the mirror 2. This drive section 31 has two movable electrode terminals 32A, 32B coupled to the two ends of the mirror 2, i.e., to two side portions in the width direction of the mirror 2. Each movable electrode terminal 32A, 32B extends backward from the mirror 2 in a state in which it is bent toward the center side of the mirror 2. Namely, each of the movable electrode terminals 32A and 32B has a portion extending in the width direction of the mirror 2 from the joint part to the mirror 2 toward a plane intersecting with the center in the width direction of the mirror 2. The movable electrode terminals 32A and 32B extend in the first direction from the foregoing portions. The other configuration and operation of the movable mirror device 30 are much the same as those of the movable mirror device 1 in the embodiment shown in FIG. 1. FIG. 9 is illustrated without the fingers of the movable electrode terminals 32A, 32B and the stationary electrode terminals 6A, 6B, 7.

Since the present embodiment adopts the configuration wherein the movable electrode terminals 32A, 32B are bent toward the center side of the mirror 2, the width $W_1$ of the drive section 31 can be made smaller. From the viewpoint of miniaturization, the width $W_1$ of the drive section 31 is preferably smaller than one and half times the width $W_2$ of the mirror 2 and, particularly, in a case where the mirror device is applied to the dispersion compensator 16 as shown in FIG. 8, or the like, the width $W_1$ of the drive section 31 is more preferably smaller than the width $W_2$ of the mirror 2.

This provides the following advantage in an array form of movable mirror devices 30: the mirrors 2 can be arranged at a narrow array pitch while the drive sections 31 are one-dimensionally arrayed. Therefore, a compact movable mirror device array can be readily fabricated and it is thus feasible to achieve reduction of cost.

Figure 10:
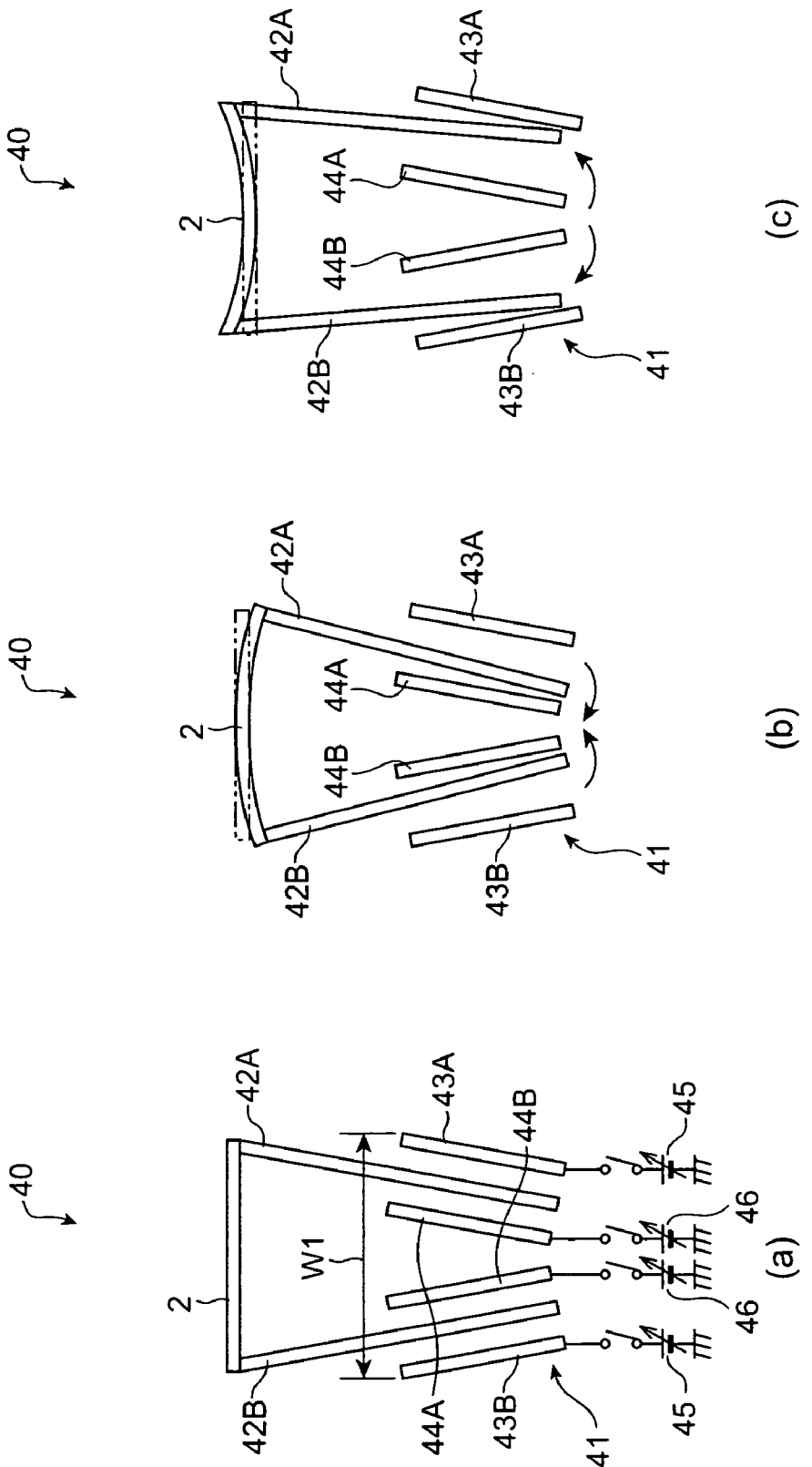
FIG. 10 is an illustration showing a schematic configuration and operation of an embodiment of the movable mirror device according to the present invention.

Furthermore, still another embodiment of the movable mirror device according to the present invention will be described below. FIG. 10 is a schematic configuration diagram showing an embodiment of the movable mirror device according to the present invention. In FIG. 10, identical or equivalent members to those in the above-described embodiments are denoted by the same reference symbols. The description of the identical or equivalent members to those in the above-described embodiments will be omitted below.

The movable mirror device 40 of the present embodiment shown in FIG. 10 has a drive section 41 for deforming the mirror 2. The drive section 41 has two movable electrode terminals 42A, 42B coupled to the two ends of the mirror 2, i.e., to the two side portions in the width direction of the mirror 2, and two stationary electrode terminals 43A, 43B and two stationary electrode terminals 44A, 44B fixed to a substrate (not shown). The movable electrode terminals 42A, 42B extend obliquely relative to the mirror 2 toward the center side of the mirror 2 so that the spacing between the two electrode terminals becomes narrower with distance from the mirror 2. Namely, the movable electrode terminals 42A, 42B obliquely extend from the joint parts to the mirror 2 toward a plane intersecting with the center in the width direction of the mirror 2. The stationary electrode terminals 44A, 44B are disposed between the movable electrode terminals 42A, 42B. The stationary electrode terminal 43A faces the stationary electrode terminal 44A with the movable electrode terminal 42A in between, and the stationary electrode terminal 43B faces the stationary electrode terminal 44B with the movable electrode terminal 42B in between. The electrode terminals 42A–44B are provided with fingers similar to those of the aforementioned electrode terminals, though not illustrated.

The movable electrode terminals 42A, 42B are grounded through the mirror 2 and the fixed portion 4a, though not shown. A variable voltage source 45 is connected to each stationary electrode terminal 43A, 43B, and a variable voltage source 46 to each stationary electrode terminal 44A, 44B.

The operation of the movable mirror device 40 of this configuration is similar to that of the movable mirror device 1 shown in FIG. 1. If the same voltage is applied to the stationary electrode terminals 44A, 44B, only one stationary electrode terminal can suffice instead of the stationary electrode terminals placed between the movable electrode terminals 42A, 42B.

Since the present embodiment adopts the configuration wherein the movable electrode terminals 42A, 42B are inclined toward the center side relative to the mirror 2, the width $W_1$ of the drive section 41 (maximum width) can be made smaller. This provides the following advantage in an array form of movable mirror devices 40: the mirrors 2 can be formed in compact size and at a narrow array pitch while the drive sections 41 are one-dimensionally arrayed.

Figure 11:
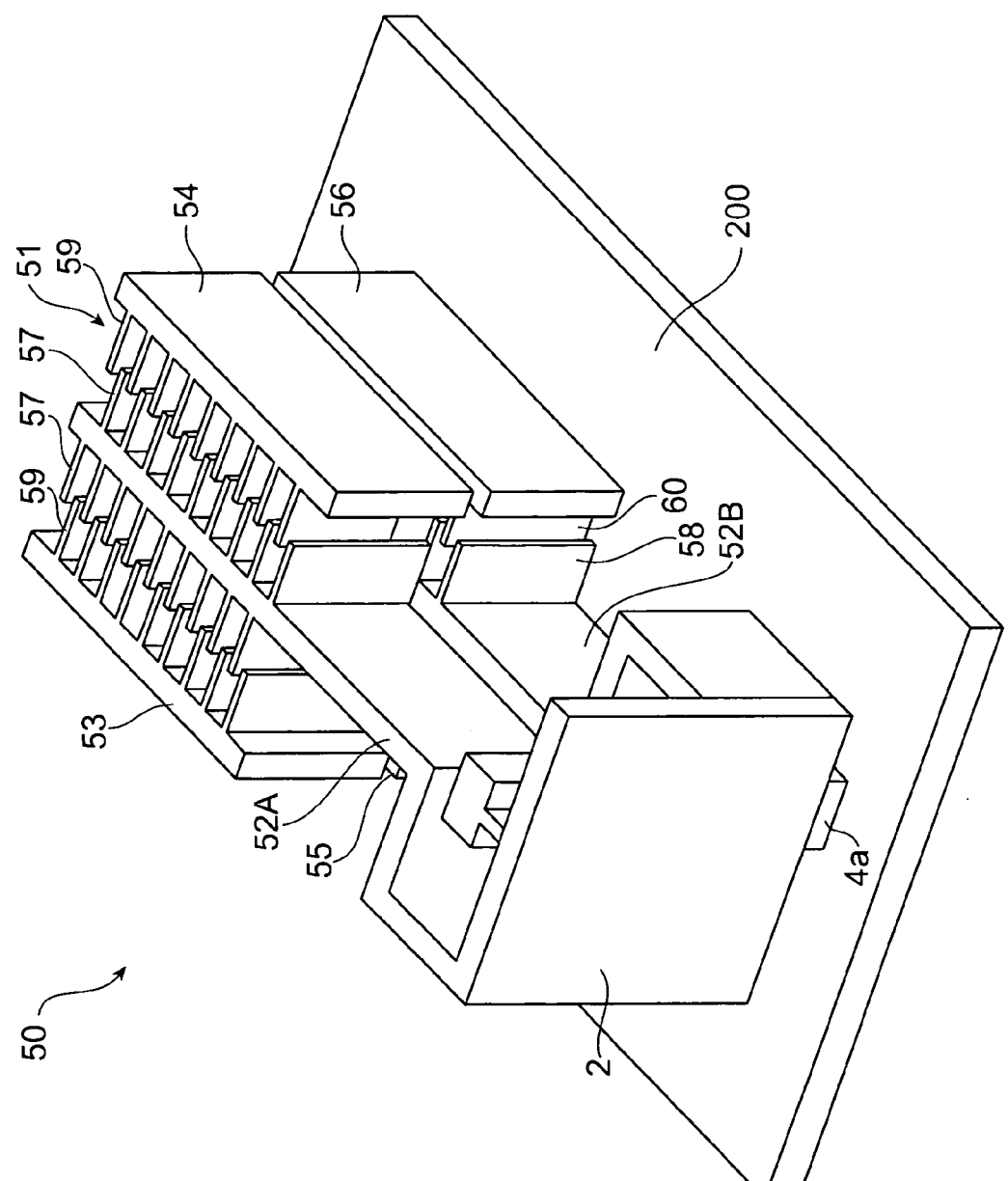
FIG. 11 is a perspective view showing an embodiment of the movable mirror device according to the present invention.
Figure 12:
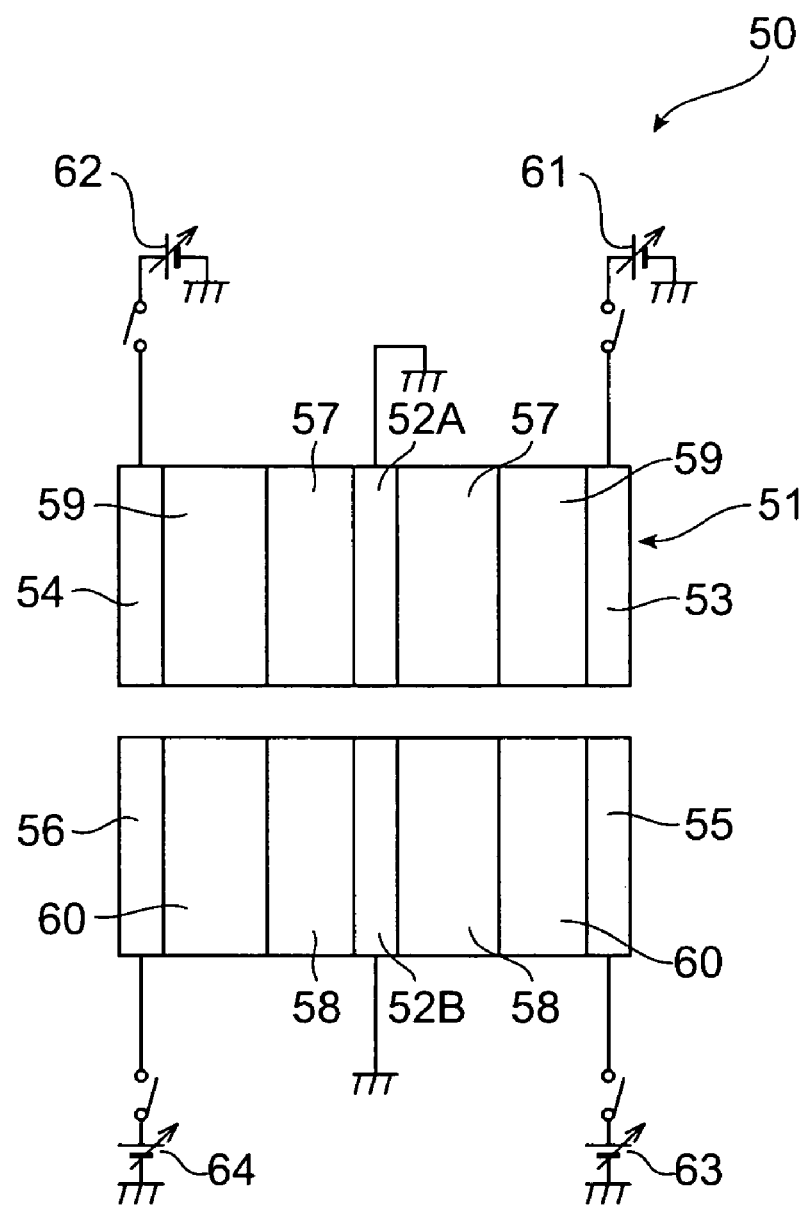
FIG. 12 is a back view of the movable mirror device shown in FIG. 11.

Furthermore, still another embodiment of the movable mirror device according to the present invention will be described below. FIG. 11 is a perspective view showing an embodiment of the movable mirror device according to the present invention, and FIG. 12 a back view of the movable mirror device shown in FIG. 11. In FIGS. 11 and 12, identical or equivalent members to those in the above-described embodiments are denoted by the same reference symbols. The description of the identical or equivalent members to those in the above-described embodiments will be omitted below.

As shown in FIGS. 11 and 12, the movable mirror device 50 of the present embodiment has a drive section 51 for deforming the mirror 2 into a curved shape. The drive section 51 is provided in the region behind the reflecting surface of the mirror 2 out of the two regions defined by the mirror 2 in the first direction intersecting with the mirror 2. The drive section 51 has two movable electrode terminals 52A, 52B coupled to the two ends of the mirror 2 and extending backward from the mirror 2, two stationary electrode terminals 53, 54 fixed to an upper substrate (not shown) so as to face the movable electrode terminal 52A, and two stationary electrode terminals 55, 56 fixed to a lower substrate 200 so as to face the movable electrode terminal 52B. Namely, the movable electrode terminal 52A is coupled to one side portion out of the two side portions in the width direction (second direction) of the mirror 2, and the movable electrode terminal 52B is coupled to the other side portion out of the two side portions.

The upper substrate (not shown) is interconnected with the lower substrate 200, for example, through a plurality of columns or the like. The movable electrode terminals 52A, 52B are vertically arranged relative to the lower substrate

200, the movable electrode terminal 52A is coupled to an upper part of one end of the mirror 2, and the movable electrode terminal 52B is coupled to a lower part of the other end of the mirror 2. The stationary electrode terminals 53, 54 face each other with the upper movable electrode terminal 52A in between, and the lower stationary electrode terminals 55, 56 face each other with the movable electrode terminal 52B in between. Namely, the movable electrode terminal 52A and the stationary electrode terminals 53, 54 are provided in a first region out of the first region and second region located in order in the third direction intersecting with the substrate 200, and the movable electrode terminal 52B and stationary electrode terminals 55, 56 are provided in the second region.

The movable electrode terminals 52A, 52B extend backward from the mirror 2 in a state in which they are bent toward the center side of the mirror 2. Namely, each of the movable electrode terminals 52A, 52B has a portion extending in the same direction as the width direction of the mirror from the joint part to the mirror 2, toward the plane intersecting with the center in the width direction of the mirror 2. The movable electrode terminals 52A, 52B extend in the first direction from the foregoing portions. In the initial state of the mirror 2, the portion of the movable electrode terminal 52B on the back side (the opposite side of the mirror 2 to the reflecting surface) is placed with a predetermined clearance immediately below the back portion of the movable electrode terminal 52A. The stationary electrode terminals 53–56 all have the same shape, for simplification of the process and others. The stationary electrode terminal 55 is placed with a predetermined clearance immediately below the stationary electrode terminal 53, and the stationary electrode terminal 56 with a predetermined clearance immediately below the stationary electrode terminal 54.

The movable electrode terminal 52A is provided with fingers 57 on both sides, and the movable electrode terminal 52B with fingers 58 on both sides. The stationary electrode terminals 53, 54 are provided with fingers 59 on one side (the side where the movable electrode terminal 52A is disposed), and the stationary electrode terminals 55, 56 with fingers 60 on one side (the side where the movable electrode terminal 52B is provided).

The movable mirror device 50 with the upper and lower structures as described above can be fabricated, for example, by wafer lamination technology.

The movable electrode terminals 52A, 52B are grounded through the mirror 2 and fixed portion 4a. A variable voltage source 61 is connected to the stationary electrode terminal 53, a variable voltage source 62 to the stationary electrode terminal 54, a variable voltage source 63 to the stationary electrode terminal 55, and a variable voltage source 64 to the stationary electrode terminal 56.

Figure 13:
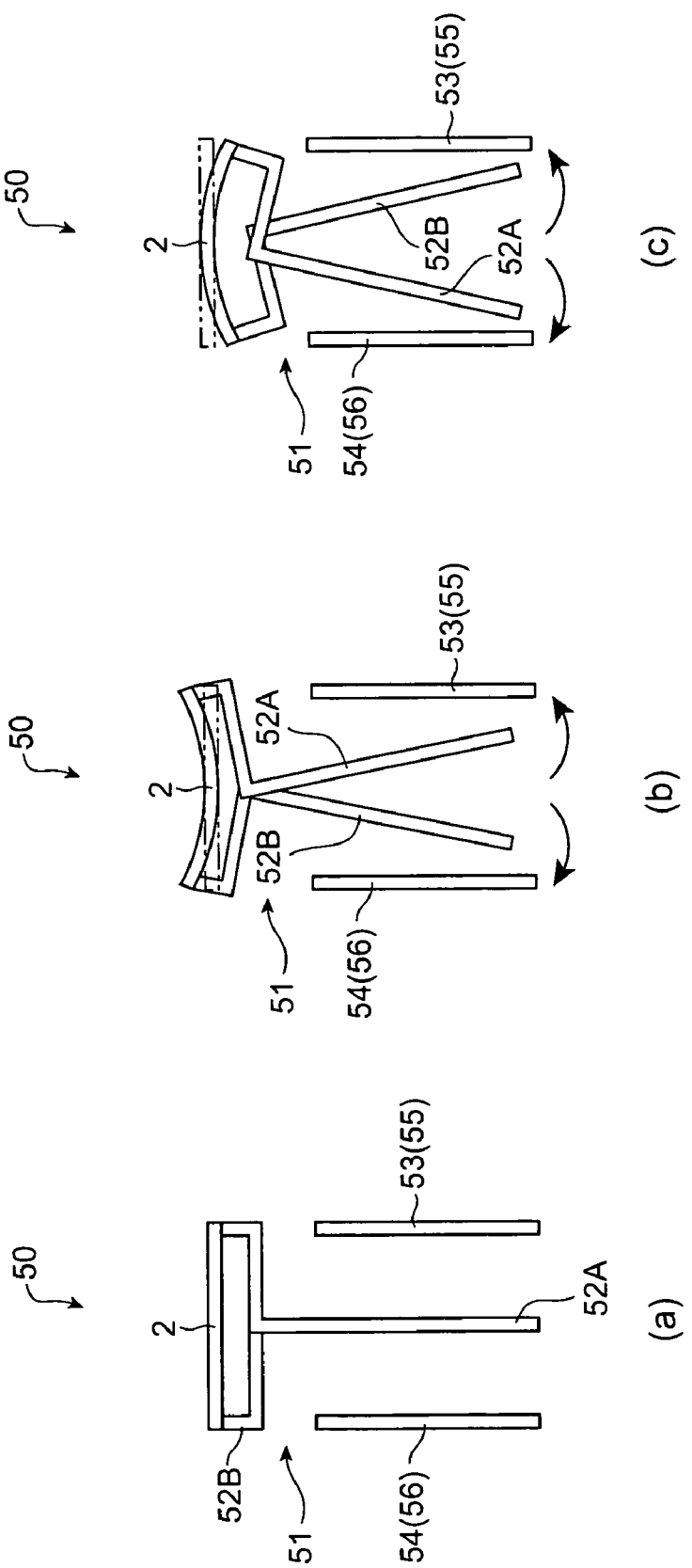
FIG. 13 is an illustration showing the operation of the movable mirror device shown in FIG. 11.

The operation of the movable mirror device 50 will be described below. FIG. 13 is an illustration showing the operation of the movable mirror device shown in FIG. 11. In the initial state in which the variable voltage sources 61–64 apply the voltage of zero, the back parts of the movable electrode terminals 52A, 52B overlap each other with the predetermined clearance and the mirror 2 is in the flat state without flexure, as shown in FIG. 13(*a*). Namely, the reflecting surface of the mirror 2 in the initial state is the flat surface as shown in FIG. 13(*a*).

When the variable voltage source 61 applies a voltage to the stationary electrode terminal 53 and when the variable voltage source 64 applies a voltage to the stationary electrode terminal 56, as shown in FIG. 13(*b*), the movable electrode terminal 52A is attracted toward the stationary electrode terminal 53 by an electrostatic force occurring between the movable electrode terminal 52A and the stationary electrode terminal 53 and the movable electrode terminal 52B is attracted toward the stationary electrode terminal 56 by an electrostatic force occurring between the movable electrode terminal 52B and the stationary electrode terminal 56. This results in bending the mirror 2 into a concave shape. Namely, when the movable electrode terminal 52A is subject to the electrostatic attraction from the stationary electrode terminal 53, one side portion of the mirror 2 coupled to the movable electrode terminal 52A undergoes a force in the opposite direction to the direction where the stationary electrode terminal 53 is located with respect to the center axis of the mirror 2 fixed by the fixed portion 4a. When the movable electrode terminal 52B is subject to the electrostatic attraction from the stationary electrode terminal 56, the other side portion of the mirror 2 connected to the movable electrode terminal 52B undergoes a force in the opposite direction to the direction where the stationary electrode terminal 56 is located with respect to the center axis. As a result, the reflecting surface of the mirror 2 is deformed into a concave surface, as shown in FIG. 13(*b*).

When the variable voltage source 62 applies a voltage to the stationary electrode terminal 54 and when the variable voltage source 63 applies a voltage to the stationary electrode terminal 55, as shown in FIG. 13(*c*), the movable electrode terminal 52A is attracted toward the stationary electrode terminal 54 by an electrostatic force occurring between the movable electrode terminal 52A and the stationary electrode terminal 54 and the movable electrode terminal 52B is attracted toward the stationary electrode terminal 55 by an electrostatic force occurring between the movable electrode terminal 52B and the stationary electrode terminal 55. This results in bending the mirror 2 into a convex shape. Namely, when the movable electrode terminal 52A is subject to the electrostatic attraction from the stationary electrode terminal 54 and when the movable electrode terminal 52B is subject to the electrostatic attraction from the stationary electrode terminal 55, the two side portions of the mirror 2 undergo the forces in the opposite directions to those in the state shown in FIG. 13(*b*). As a result, the reflecting surface of the mirror 2 is deformed into a convex surface, as shown in FIG. 13(*c*).

In the present embodiment as described above, the mirror 2 can also be deformed from the flat state into the convex shape and into the concave shape and thus the movable range of the mirror 2 is expanded.

Since the present embodiment adopts the configuration wherein the movable electrode terminals 52A, 52B are folded toward the center side of the mirror 2 and wherein the back parts of the movable electrode terminals 52A, 52B overlap each other with the predetermined clearance, the movable range of the mirror 2 can be efficiently expanded. The width of the drive section 51 can be made smaller and thus, in a case where such movable mirror devices 50 are arrayed, the mirrors 2 can be arranged at a narrow array pitch while the drive sections 51 are one-dimensionally arrayed.

Although the present embodiment adopted the configuration wherein the movable electrode terminals 52A, 52B were folded toward the center side of the mirror 2, it is also possible, for example, to adopt a configuration wherein the movable electrode terminals 52A, 52B extend obliquely relative to the mirror 2 toward the center side of the mirror 2 and wherein the arrangement of the stationary electrode terminals 53 to 56 is properly adjusted according to the arrangement of the movable electrode terminals.

Figure 14:
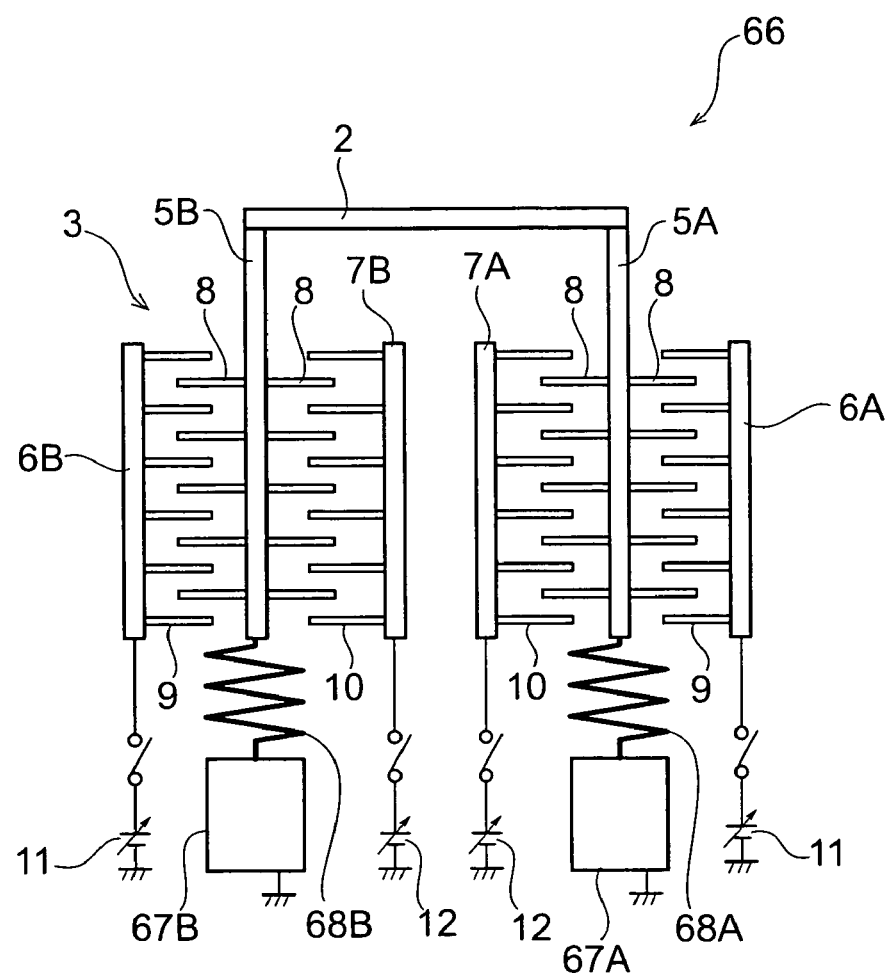
FIG. 14 is a configuration diagram showing an embodiment of the movable mirror device according to the present invention.

Furthermore, still another embodiment of the movable mirror device according to the present invention will be described below. FIG. 14 is a configuration diagram showing an embodiment of the movable mirror device according to the present invention. In FIG. 14, identical or equivalent members to those in the embodiment shown in FIG. 1 are denoted by the same reference symbols. The description of the identical or equivalent members to those in the foregoing embodiment will be omitted below.

The movable mirror device 66 of the present embodiment shown in FIG. 14, has two fixed portions 67A, 67B fixed to distal ends of the movable electrode terminals 5A, 5B (on the opposite side to the joint parts to the mirror 2), on the substrate 200 (not shown). The fixed portions 67A, 67B are connected to the distal ends of the movable electrode terminals 5A, 5B, for example, by elastic members 68A, 68B of spring shape. The elastic modulus of the elastic members 68A, 68B is smaller than those of the movable electrode terminals 5A, 5B and the fixed portions 67A and 67B. The fixed portions 67A, 67B and the elastic members 68A, 68B constitute two support portions (supporting means) for supporting the movable electrode terminals 5A, 5B movably relative to the stationary electrode terminals 6A, 6B and the stationary electrode terminals 7A, 7B. The movable electrode terminals 5A, 5B are grounded through the respective support portions.

Figure 15:
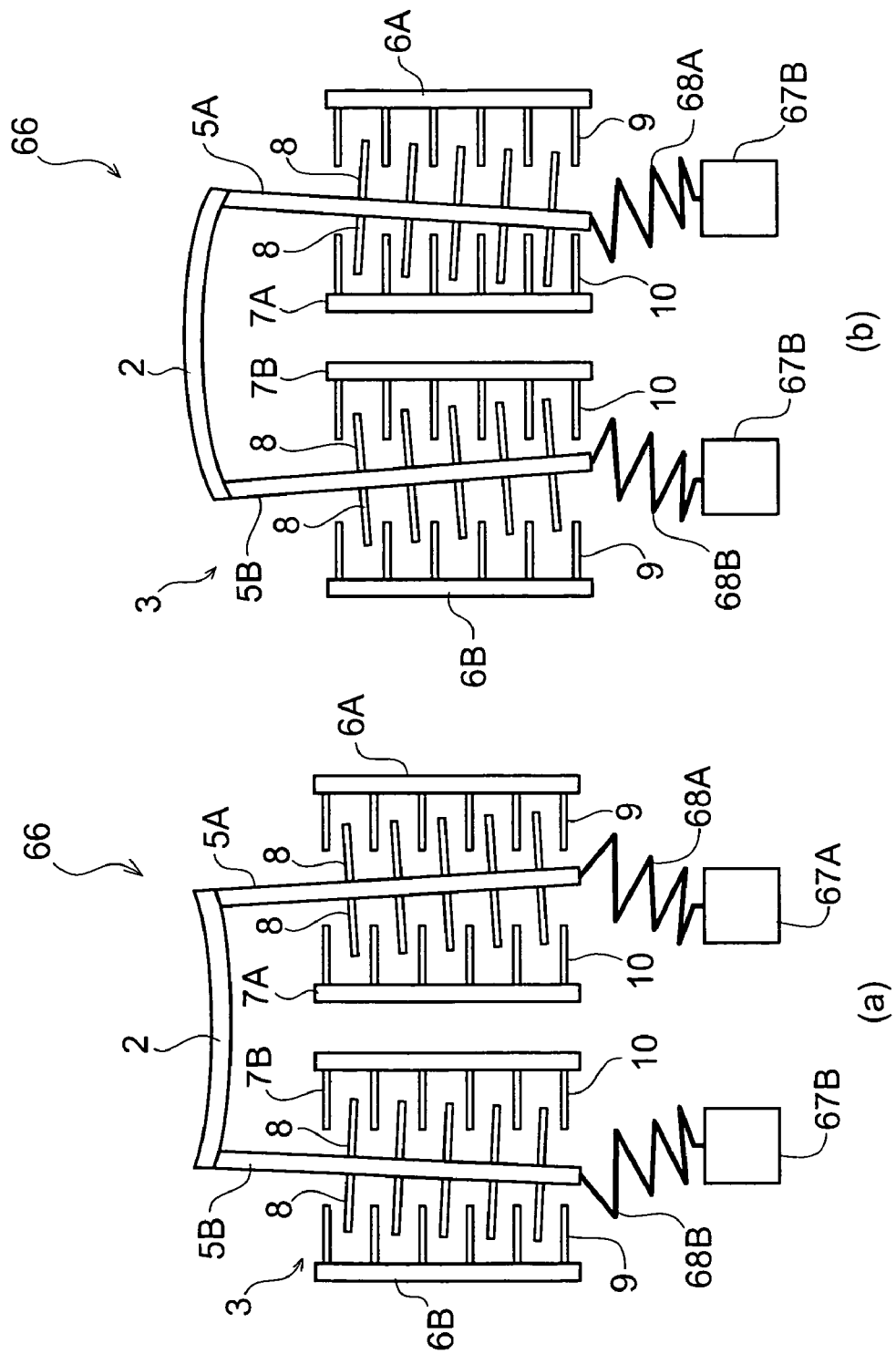
FIG. 15 is an illustration showing the operation of the movable mirror device shown in FIG. 14.

When the variable voltage sources 11 apply a voltage to the stationary electrode terminals 6A, 6B, as shown in FIG. 15(a), the movable electrode terminals 5A, 5B are attracted toward the stationary electrode terminals 6A, 6B while the elastic members 68A, 68B are elastically deformed toward the stationary electrode terminals 6A, 6B. This results in bending the mirror 2 into a concave shape. On the other hand, when the variable voltage sources 12 apply a voltage to the stationary electrode terminals 7A, 7B, as shown in FIG. 15(b), the movable electrode terminals 5A, 5B are attracted toward the stationary electrode terminals 7A, 7B while the elastic members 68A, 68B are elastically deformed toward the stationary electrode terminals 7A, 7B. This results in bending the mirror 2 into a convex shape.

In the present embodiment as described above, the mirror 2 can also be deformed into the curved shape around a fulcrum at the central part of the mirror 2, without need for fixing the central part of the mirror 2 to the substrate. This allows the mirror 2 and drive section 3 to be readily formed on the substrate. Since there is no fixed portion in the central part of the mirror 2 as described above, the surface shape of the reflecting surface of the mirror 2 becomes wholly smooth while the mirror 2 is bent in the curved shape.

Furthermore, since the movable electrode terminals 5A, 5B are supported by the fixed portions 67A, 67B through the elastic members 68A, 68B, it is feasible to prevent the motion of the movable electrode terminals 5A, 5B from being regulated.

Figure 16:
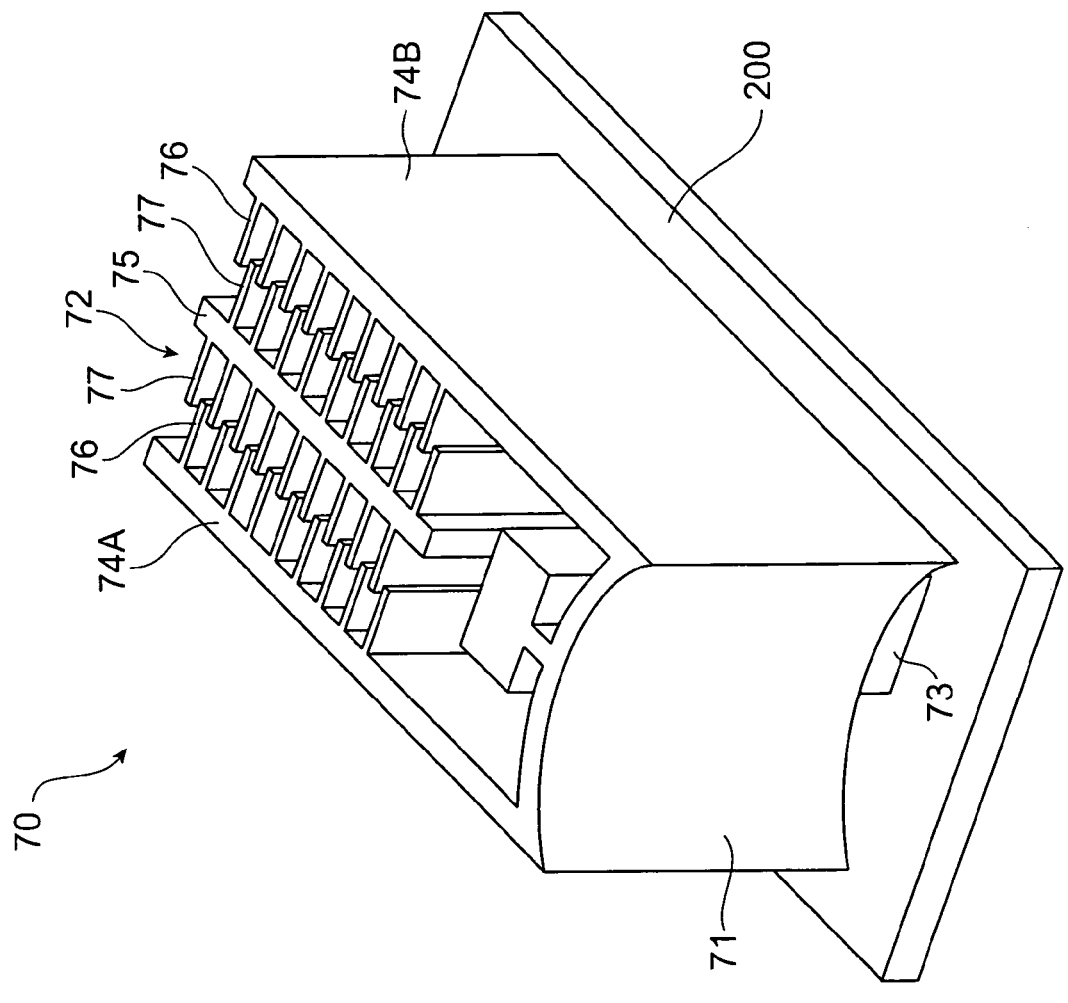
FIG. 16 is a perspective view showing an embodiment of the movable mirror device according to the present invention.

Furthermore, still another embodiment of the movable mirror device according to the present invention will be described below. FIG. 16 is a perspective view showing an embodiment of the movable mirror device according to the present invention.

The movable mirror device 70 of the present embodiment shown in FIG. 16 is provided with a platelike mirror 71 for reflecting signal light, and a drive section 72 for deforming this mirror 71. The mirror 71 in the initial state is preliminarily bent in a concave shape with respect to the front surface (reflecting surface) side of the mirror 71. Namely, the reflecting surface of the mirror 71 is preliminarily formed as a concave surface. A fixed portion 73 fixed to a substrate 200 is coupled to the central part of the back surface of the mirror 71.

The drive section 72 is provided in a region behind the reflecting surface of the mirror 71 out of two regions defined by the mirror 71 in the first direction intersecting with the reflecting surface of the mirror 71. The drive section 72 has two movable electrode terminals 74A, 74B coupled to two ends of the mirror 71 and extending backward from the mirror 71, and a stationary electrode terminal 75 fixed to the substrate 200 so as to face the movable electrode terminals 74A, 74B. Namely, the movable electrode terminal 74A is coupled to one side portion out of the two side portions in the width direction (second direction) of the mirror 71, and extends in the first direction. The movable electrode terminal 74B is coupled to the other side portion out of the two side portions and extends in the first direction.

The stationary electrode terminal 75 is disposed between the movable electrode terminals 74A, 74B. The movable electrode terminals 74A, 74B are provided with fingers 76 on one side (the side where the stationary electrode terminal 75 is located), and the stationary electrode terminal 75 with fingers 77 on both sides thereof. The rigidity of the joint parts between the mirror 71 and the movable electrode terminals 74A, 74B is preferably larger than that of the central part of the mirror 71.

The movable electrode terminals 74A, 74B are grounded through the mirror 71 and the fixed portion 73, though not shown. A variable voltage source 78 is connected to the stationary electrode terminal 75.

Figure 17:
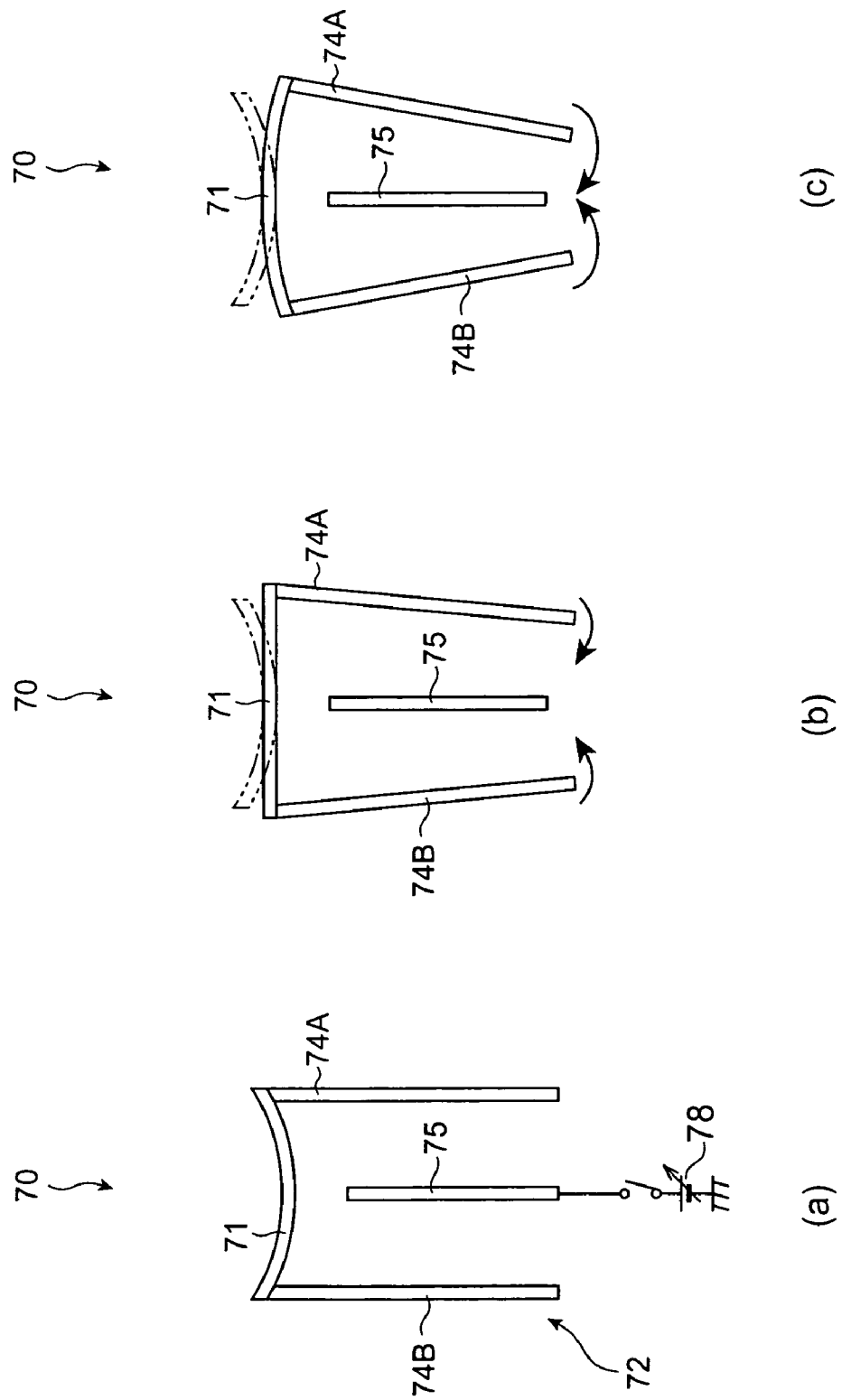
FIG. 17 is an illustration showing the operation of the movable mirror device shown in FIG. 16.

The operation of the movable mirror device 70 will be described below. FIG. 17 is an illustration showing the operation of the movable mirror device shown in FIG. 16. In the initial state in which the variable voltage source 78 applies the voltage of zero, the mirror 71 is in a bent state in the concave shape, as shown in FIG. 17(a). Namely, the reflecting surface of the mirror 71 is concave.

When the variable voltage source 78 applies a voltage to the stationary electrode terminal 75, as shown in FIG. 17(b), the movable electrode terminals 74A, 74B are attracted toward the stationary electrode terminal 75 by an electrostatic force occurring between the movable electrode terminals 74A, 74B and the stationary electrode terminal 75, whereby the mirror 71 turns into a flat state without flexure. Namely, the reflecting surface of the mirror 71 becomes flat. When the variable voltage source 78 further increases the voltage applied to the stationary electrode terminal 75, as shown in FIG. 17(c), the movable electrode terminals 74A, 74B are further attracted toward the stationary electrode terminal 75, whereby the mirror 71 is bent into a convex shape. Namely, the reflecting surface of the mirror 71 turns into a convex surface. It is noted that FIG. 17 is illustrated without the fingers 76, 77.

In the present embodiment as described above, the mirror 71 can be deformed from the bent state of the concave shape into the bent state of the convex shape, and thus the movable range of the mirror 71 can be expanded thereby.

Since the number of stationary electrode terminals to be used can be small, the structure of the drive section 72 can be simplified and cost reduction can be achieved. Since the mirror 71 is moved in only one direction, the control can be simpler in the application of the voltage to the stationary electrode terminal 75.

Furthermore, since the stationary electrode terminal 75 is placed only between the movable electrode terminals 74A, 74B, the width of the drive section 72 can be made smaller.

Although the present embodiment adopted the configuration wherein the central part of the mirror 71 was supported on the substrate 200, it is also possible to adopt a configuration wherein the distal ends of the movable electrode terminals 74A, 74B are supported through elastic members or the like on the substrate 200, as in the embodiment shown in FIG. 14.

Figure 18:
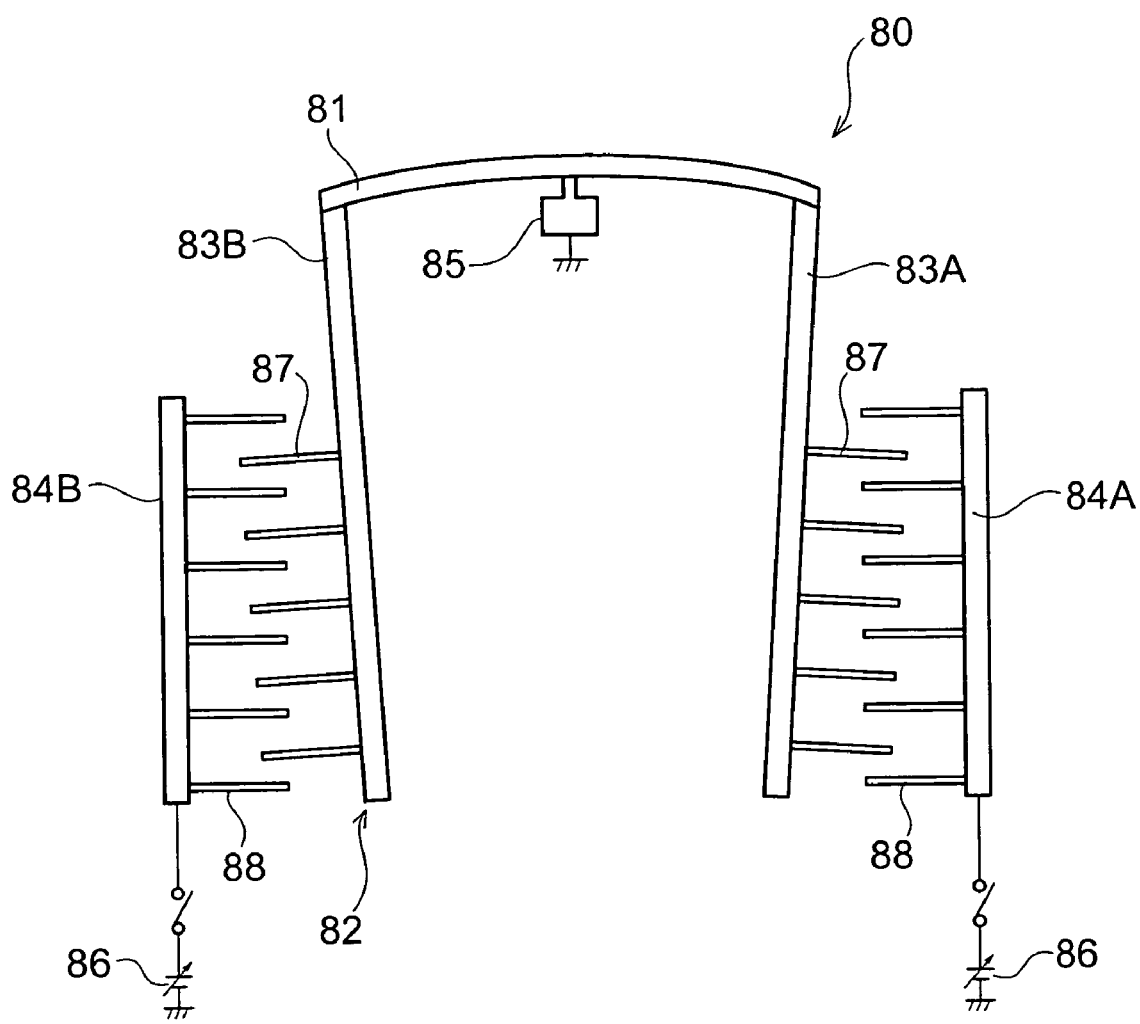
FIG. 18 is a configuration diagram showing an embodiment of the movable mirror device according to the present invention.

Furthermore, still another embodiment of the movable mirror device according to the present invention will be described below. FIG. 18 is a configuration diagram showing an embodiment of the movable mirror device according to the present invention.

The movable mirror device 80 of the present embodiment shown in FIG. 18 is provided with a platelike mirror 81 for reflecting signal light, and a drive section 82 for deforming this mirror 81. The mirror 81 in the initial state is preliminarily bent in a convex shape with respect to the front surface (reflecting surface) side of the mirror 81. Namely, the reflecting surface of the mirror 81 is preliminarily formed as a convex surface. A fixed portion 85 fixed to the substrate 200 (not shown) is coupled to the central part of the back surface of the mirror 81.

The drive section 82 is provided in a region behind the reflecting surface of the mirror 81 out of two regions defined by the mirror 81 in the first direction intersecting with the reflecting surface of the mirror 81. The drive section 82 has two movable electrode terminals 83A, 83B coupled to the two ends of the mirror 81 and extending backward from the mirror 81, and two stationary electrode terminals 84A, 84B fixed to the substrate (not shown) so as to face the movable electrode terminals 83A, 83B. Namely, the movable electrode terminal 83A is coupled to one side portion out of the two side portions in the width direction (second direction) of the mirror 81, and extends in the first direction. The movable electrode terminal 83B is coupled to the other side portion out of the two side portions and extends in the first direction.

The stationary electrode terminals 84A, 84B are arranged to face each other with the movable electrode terminals 83A, 83B in between. The movable electrode terminals 83A, 83B in the initial state extend obliquely relative to the mirror 81 toward the center side of the mirror 81. The movable electrode terminals 83A, 83B are provided with fingers 87 on one side (the side where the stationary electrode terminal 84A or 84B is located), and the stationary electrode terminals 84A, 84B are provided with fingers 88 on one side (the side where the movable electrode terminal 83A or 83B is located).

The movable electrode terminals 83A, 83B are grounded through the mirror 81 and the fixed portion 85. A variable voltage source 86 is connected to each stationary electrode terminal 84A, 84B.

Figure 19:
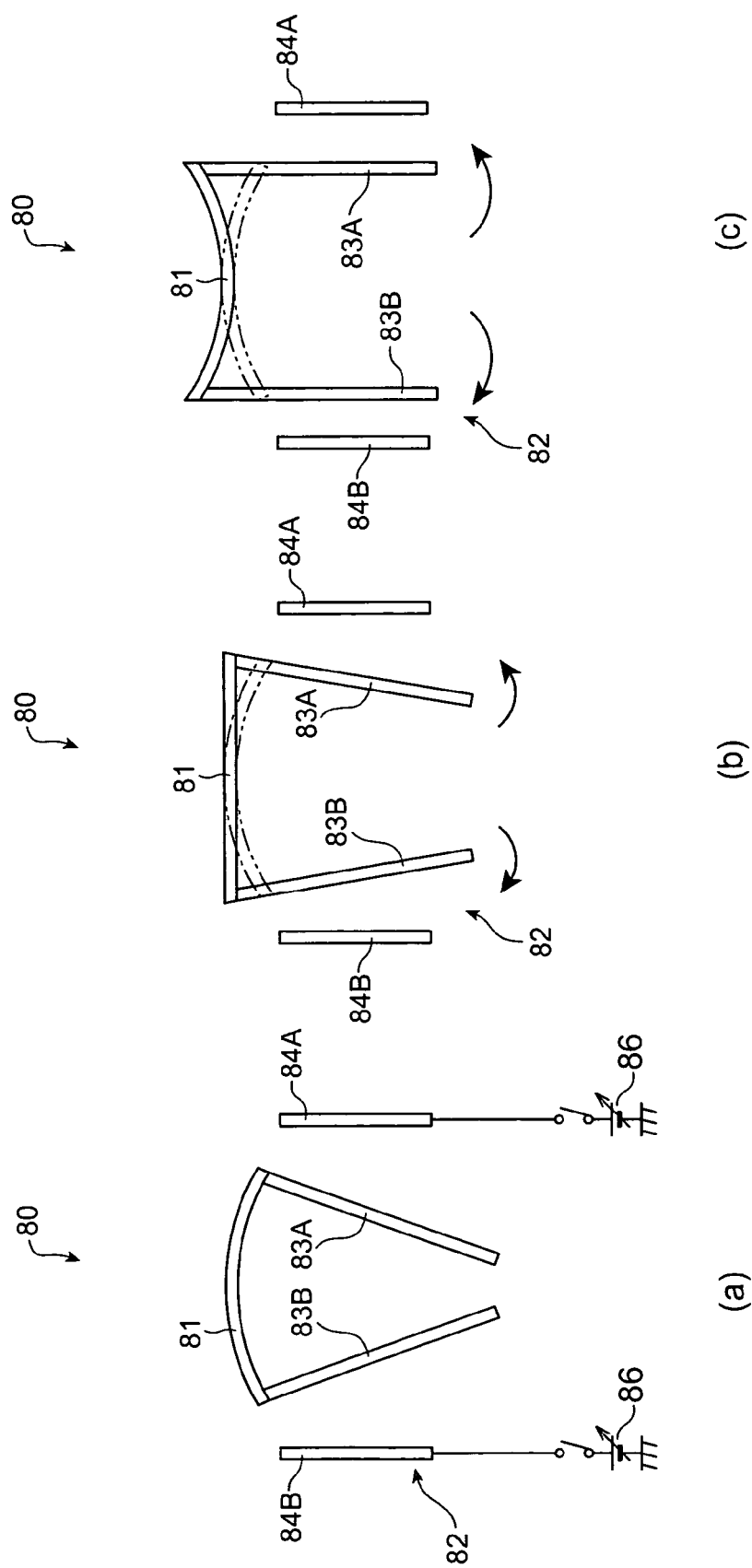
FIG. 19 is an illustration showing the operation of the movable mirror device shown in FIG. 18.

The operation of the movable mirror device 80 will be described below. FIG. 19 is an illustration showing the operation of the movable mirror device shown in FIG. 18. In the initial state in which the variable voltage sources 86 apply the voltage of zero, as shown in FIG. 19(a), the mirror 81 is bent in a convex shape. Namely, the reflecting surface of the mirror 81 is convex. When the variable voltage sources 86 apply a voltage to the stationary electrode terminals 84A, 84B, as shown in FIG. 19(b), the movable electrode terminals 83A, 83B are attracted toward the stationary electrode terminals 84A, 84B by electrostatic forces occurring between the movable electrode terminals 83A, 83B and the stationary electrode terminals 84A, 84B, whereby the mirror 81 turns into a flat state without flexure. Namely, the reflecting surface of the mirror 81 becomes flat. When the variable voltage sources 86 further increase the voltage applied to the stationary electrode terminals 84A, 84B, as shown in FIG. 19(c), the movable electrode terminals 83A, 83B are further attracted toward the stationary electrode terminals 84A, 84B, whereby the mirror 81 is bent in a concave shape. Namely, the reflecting surface of the mirror 81 becomes concave. It is noted that FIG. 19 is illustrated without the fingers 87, 88.

In the present embodiment as described above, the mirror 81 can be deformed from the bent state of the convex shape to the bent state of the concave shape, and thus the movable range of the mirror 81 can be expanded thereby. Just as in the case of the embodiment shown in FIG. 16, the structure of the drive section 82 is simplified and the control becomes simpler in the application of the voltage to the stationary electrode terminals 84A, 84B.

Figure 20:
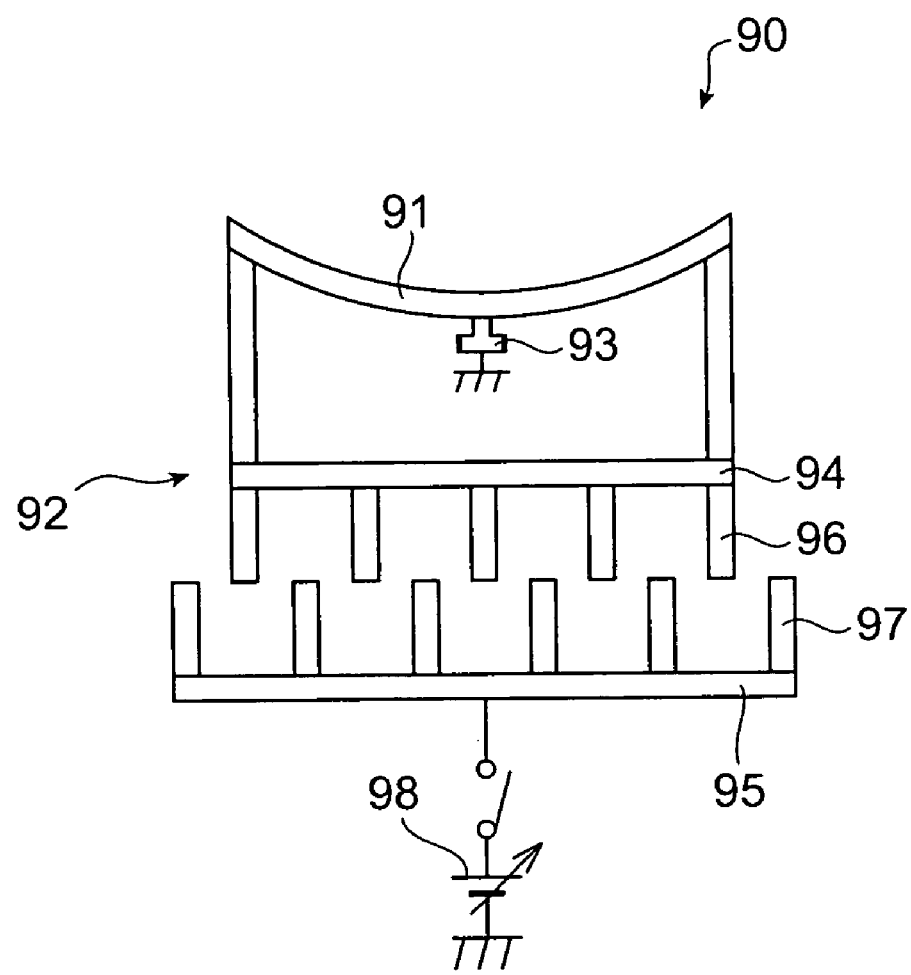
FIG. 20 is a configuration diagram showing an embodiment of the movable mirror device according to the present invention.

Furthermore, still another embodiment of the movable mirror device according to the present invention will be described below. FIG. 20 is a configuration diagram showing an embodiment of the movable mirror device according to the present invention.

The movable mirror device 90 of the present embodiment shown in FIG. 20 is provided with a mirror 91 for reflecting signal light, and a drive section 92 for deforming this mirror 91. The mirror 91 is preliminarily bent in a concave shape with respect to the front surface (reflecting surface) side thereof. Namely, the reflecting surface of the mirror 91 is preliminarily formed as a concave surface. A fixed portion 93 fixed to a substrate (not shown) is coupled to the central part of the mirror 91.

The drive section 92 is provided in a region behind the reflecting surface out of two regions defined by the mirror 91 in the first direction intersecting with the reflecting surface of the mirror 91. The drive section 92 has a U-shaped movable electrode terminal 94 coupled to two ends of the mirror 91, and a stationary electrode terminal 95 fixed to the substrate (not shown) so as to face the movable electrode terminal 94. Namely, the movable electrode terminal 94 extends in the width direction (second direction) of the mirror 91 and is coupled to the both side portions in the width direction of the mirror 91. The stationary electrode terminal 95 faces the mirror 91 with the movable electrode terminal 94 in between. The movable electrode terminal 94 is provided with fingers 96 on one side (the side where the stationary electrode terminal 95 is located), and the stationary electrode terminal 95 is provided with fingers 97 on one side (the side where the movable electrode terminal 94 is located).

The movable electrode terminal 94 is grounded through the mirror 91 and the fixed portion 93. A variable voltage source 98 is connected to the stationary electrode terminal 95. When this variable voltage source 98 applies a voltage to the stationary electrode terminal 95, the movable electrode terminal 94 is attracted toward the stationary electrode terminal 95 by an electrostatic force occurring between the movable electrode terminal 94 and the stationary electrode terminal 95, whereby the mirror 91 is deformed from the concave shape into a convex shape. Namely, when the movable electrode terminal 94 is attracted to the stationary electrode terminal 97, the two side portions of the mirror 91 connected to the movable electrode terminal 94 move toward the stationary electrode terminal 97. On the other hand, the portion along the center axis of the mirror 91 is fixed by the fixed portion 93. As a result, the reflecting surface of the mirror 91 is deformed from the concave surface into a convex surface. Therefore, the movable range of the mirror 91 can be expanded.

Since there is only one movable electrode terminal and one stationary electrode terminal to be used, the structure of the drive section 92 can be simplified and cost reduction can be achieved. Since the mirror 91 is moved in only one direction, the control becomes simpler in the application of the voltage to the stationary electrode terminal 95.

Figure 21:
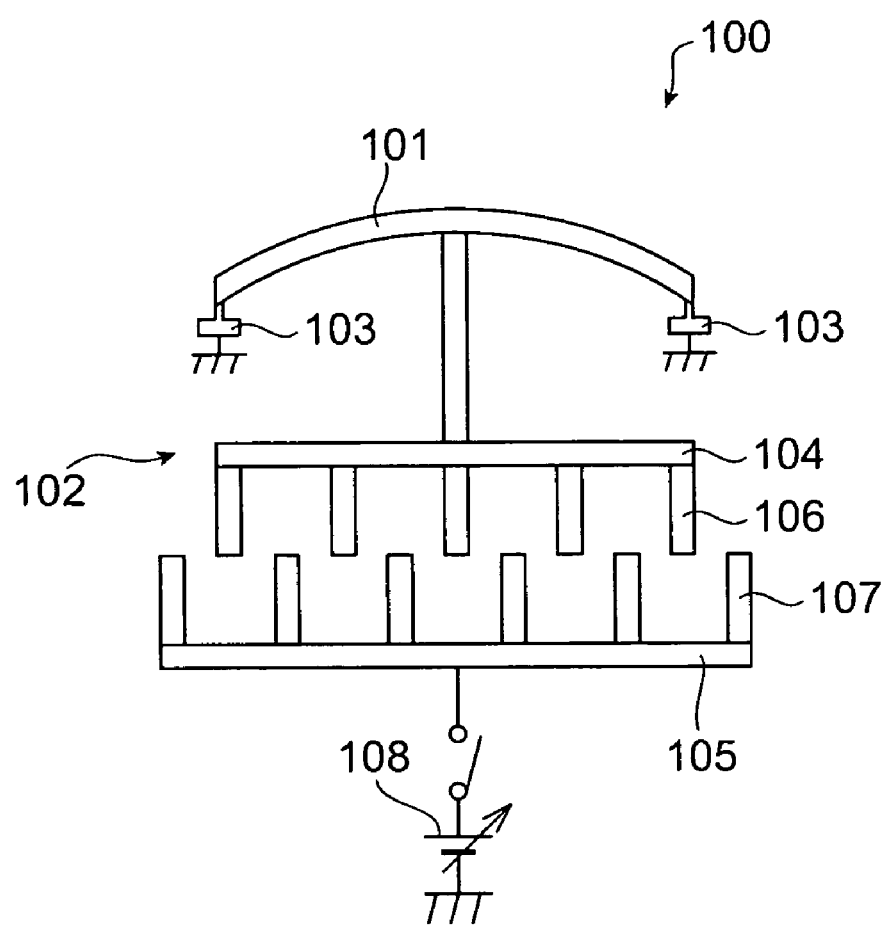
FIG. 21 is a configuration diagram showing an embodiment of the movable mirror device according to the present invention.

Furthermore, still another embodiment of the movable mirror device according to the present invention will be described below. FIG. 21 is a configuration diagram showing an embodiment of the movable mirror device according to the present invention.

The movable mirror device 100 of the present embodiment shown in FIG. 21 is provided with a mirror 101 for reflecting signal light, and a drive section 102 for deforming this mirror 101. The mirror 101 is preliminarily bent in a convex shape with respect to the front surface (reflecting surface) side thereof. Namely, the reflecting surface of the mirror 101 is preliminarily formed as a convex surface. Fixed portions 103 fixed to a substrate (not shown) are coupled to the two ends of the mirror 101. This permits the mirror 101 to be deformable into a curved shape with its two ends as fixed points.

The drive section 102 is provided in a region behind the reflecting surface out of two regions defined by the mirror 101 in the first direction intersecting with the reflecting surface of the mirror 101. The drive section 102 has a T-shaped movable electrode terminal 104 coupled to the central part of the mirror 101, and a stationary electrode terminal 105 fixed to the substrate (not shown) so as to face the movable electrode terminal 104. Namely, the movable electrode terminal 104 extends in the same direction (second direction) as the width direction of the mirror 101, and is coupled to the center in the width direction of the mirror 101.

The stationary electrode terminal 105 faces the mirror 101 with the movable electrode terminal 104 in between. The movable electrode terminal 104 is provided with fingers 106 on one side (the side where the stationary electrode terminal 105 is located), and the stationary electrode terminal 105 with fingers 107 on one side (the side where the movable electrode terminal 104 is located).

The movable electrode terminal 104 is grounded through the mirror 101 and the fixed portion 103. A variable voltage source 108 is connected to the stationary electrode terminal 105. When this variable voltage source 108 applies a voltage to the stationary electrode terminal 105, the movable electrode terminal 104 is attracted toward the stationary electrode terminal 105 by an electrostatic force occurring between the movable electrode terminal 104 and the stationary electrode terminal 105, whereby the mirror 101 is deformed from the convex shape into a concave shape. Namely, when the movable electrode terminal 104 is attracted to the stationary electrode terminal 107, the central part of the mirror 101 coupled to the movable electrode terminal 104 moves toward the stationary electrode terminal 107. On the other hand, the two side portions in the width direction of the mirror 101 are fixed by the fixed portions 103. As a result, the mirror 101 is deformed from the convex surface into a concave surface. Therefore, the movable range of the mirror 101 can be expanded. Just as in the case of the embodiment shown in FIG. 20, the structure of the drive section 102 is simplified and the control becomes simpler in the application of the voltage to the stationary electrode terminal 105.

The above described several preferred embodiments of the present invention, and the movable mirror device of the present invention can also be applied to any other equipment necessitating reflection on the curved mirror like the aforementioned pickup devices and others, without having to be limited to the dispersion compensators, as long as it is used in the application to give different optical path differences by one mirror according to positions of incident light to the mirror and to require expansion of the movable range of the mirror.

Figure 22:
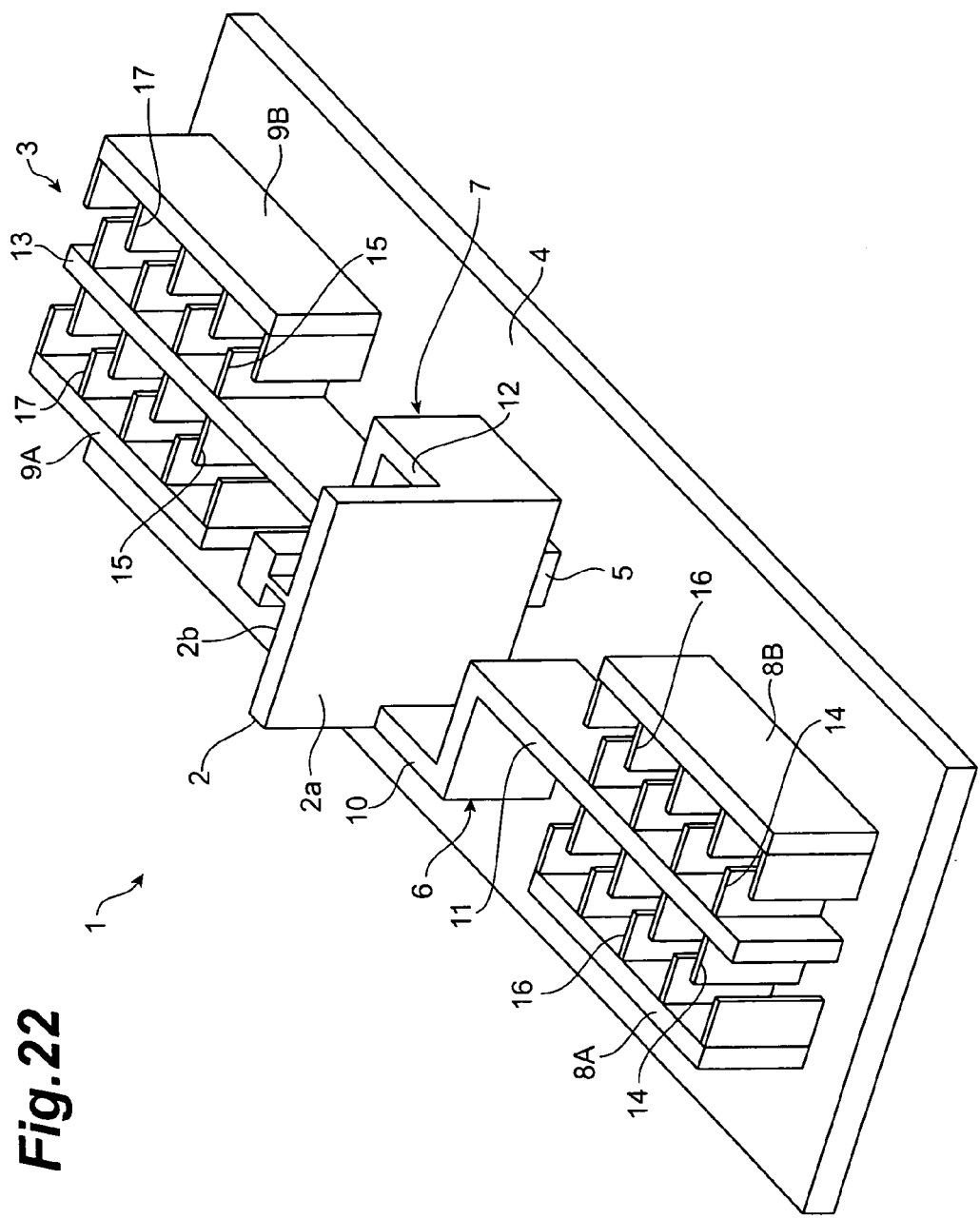
FIG. 22 is a perspective view showing an embodiment of the movable mirror device according to the present invention.

Furthermore, still another embodiment of the movable mirror device according to the present invention will be described below. FIG. 22 is a perspective view showing an embodiment of the movable mirror device according to the present invention. The movable mirror device 1 of the present embodiment shown in FIG. 22 is a structure fabricated, for example, by use of the MEMS (Micro-Electro-Mechanical-System) technology.

The movable mirror device 1 is provided with a mirror 2 of rectangular plate shape for reflecting signal light, and a drive section 3 for deforming this mirror 2 into a curved shape. An anchor part 5 fixed to an upper surface of a substrate 4 and extending in the height direction of the mirror 2 is coupled to the central part in the width direction (second direction) of the mirror 2 in the back surface 2b (the surface on the opposite side to the reflecting surface 2a) of the mirror 2. This permits the mirror 2 to be deformable into a curved shape around the central part G thereof as an axis of rotation (cf. FIG. 23). The height direction of the mirror 2 (which is the same direction as the third direction) refers to a direction normal to the upper surface of the substrate 4, and the width direction of the mirror 2 refers to a direction normal to both the height direction and the thickness direction of the mirror 2.

The drive section 3 has a movable electrode terminal 6 coupled to one side portion in the width direction of the mirror 2 (which will be referred to hereinafter as the left end of the mirror 2 on the view from the front surface 2a side) in the front surface (reflecting surface) 2a of the mirror 2, a movable electrode terminal 7 coupled to the other side portion in the width direction of the mirror 2 (which will be referred to hereinafter as the right end of the mirror 2 on the view from the front surface 2a side) in the back surface 2b of the mirror 2, a pair of stationary electrode terminals 8A, 8B fixed to the upper surface of the substrate 4 so as to face the movable electrode terminal 6 on the front surface 2a side of the mirror 2, and a pair of stationary electrode terminals 9A, 9B fixed to the upper surface of the substrate 4 so as to face the movable electrode terminal 7 on the back surface 2b side of the mirror 2. Namely, the movable electrode terminal 6 and the stationary electrode terminals 8A, 8B are provided in a region on the front surface 2a side, out of two regions defined by the mirror 2 in the first direction intersecting with the reflecting surface 2a of the mirror 2. The movable electrode terminal 7 and stationary electrode terminals 9A, 9B are provided in a region behind the front surface 2a (the region on the back surface 2b side), out of the two regions. These movable electrode terminals 6, 7 and stationary electrode terminals 8A–9B are all of plate shape.

The movable electrode terminal 6 has a joint part 10 coupled to the front surface 2a of the mirror 2 and having a bent structure toward the central part in the width direction of the mirror 2, and an electrode part 11 integrated with the joint part 10 and extending forward from the mirror 2. Namely, the movable electrode terminal 6 has the joint part 10 and the electrode part 11. The joint part 10 is coupled to the front surface 2a of the mirror 2 in one side portion out of the two side portions in the width direction of the mirror 2 and extends toward a plane intersecting with the center in the width direction of the mirror 2. The electrode part 11 extends in the first direction along the plane, from an end of the joint part 10.

The movable electrode terminal 7 has a joint part 12 coupled to the back surface 2b of the mirror 2 and having a bent structure toward the central part in the width direction of the mirror 2, and an electrode part 13 integrated with the joint part 12 and extending backward from the mirror 2. Namely, the movable electrode terminal 7 has the joint part 12 and the electrode part 13. The joint part 12 is coupled to the back surface 2b of the mirror 2 in the other side portion out of the two side portions in the width direction of the mirror 2, and extends toward the plane intersecting with the center in the width direction of the mirror 2. The electrode part 13 extends in the first direction along the plane, from an end of the joint part 12.

The joint parts 10, 12 are coupled to the lower portions of the front surface 2a and back surface 2b of the mirror 2, respectively. In this structure, the upper part of the front surface 2a of the mirror 2 serves as a light reflecting region. Namely, the mirror 2 has two regions located in order in the height direction thereof (which is the same direction as the third direction), the drive section 3 is coupled to one of the two regions, and the other region projects in the third direction with respect to the drive section 3. This other region functions as a light reflecting region for reflecting light. The electrode parts 11, 13 are constructed so as to extend substantially on a straight line.

The joint parts 10, 12 do not have to be limited to the bent structure as described above, but may be those extending obliquely relative to the front surface 2a and back surface 2b of the mirror 2 so as to be directed toward the central part in the width direction of the mirror 2.

The stationary electrode terminals 8A, 8B are placed on both sides of the electrode part 11 so as to face each other with the electrode part 11 in between. The stationary electrode terminals 9A, 9B are placed on both sides of the electrode part 13 so as to face each other with the electrode part 13 in between. Then the stationary electrode terminals 8A, 9A are arranged to extend substantially on a straight line, and the stationary electrode terminals 8B, 9B are arranged to extend substantially on a straight line. In the present embodiment, the stationary electrode terminals 8A, 9A are provided along one side portion of the movable mirror device 1 in the second direction, and the stationary electrode terminals 8B, 9B along the other side portion of the movable mirror device 1. Namely, the stationary electrode terminal 8A is provided along one side portion in the second direction, in the region on the front surface 2a side out of the two regions defined by the mirror 2, and the stationary electrode terminal 8B along the other side portion in the same region. The stationary electrode terminal 9A is provided along one side portion in the second direction, in the region on the back surface 2b side out of the two regions, and the stationary electrode terminal 9B along the other side portion in the same region.

The electrode part 11 is provided with fingers 14 on both sides, and the electrode part 13 with fingers 15 on both sides. The stationary electrode terminals 8A, 8B are provided with fingers 16 on the side facing the electrode part 11, and the stationary electrode terminals 9A, 9B with fingers 17 on the side facing the electrode part 13.

The movable mirror device 1 of this configuration is fabricated, for example, by anisotropic etching and others of a silicon substrate or the like. The surface (front surface 2a) of the mirror 2 is coated with gold or the like, in order to increase the optical reflectance.

Figure 23:
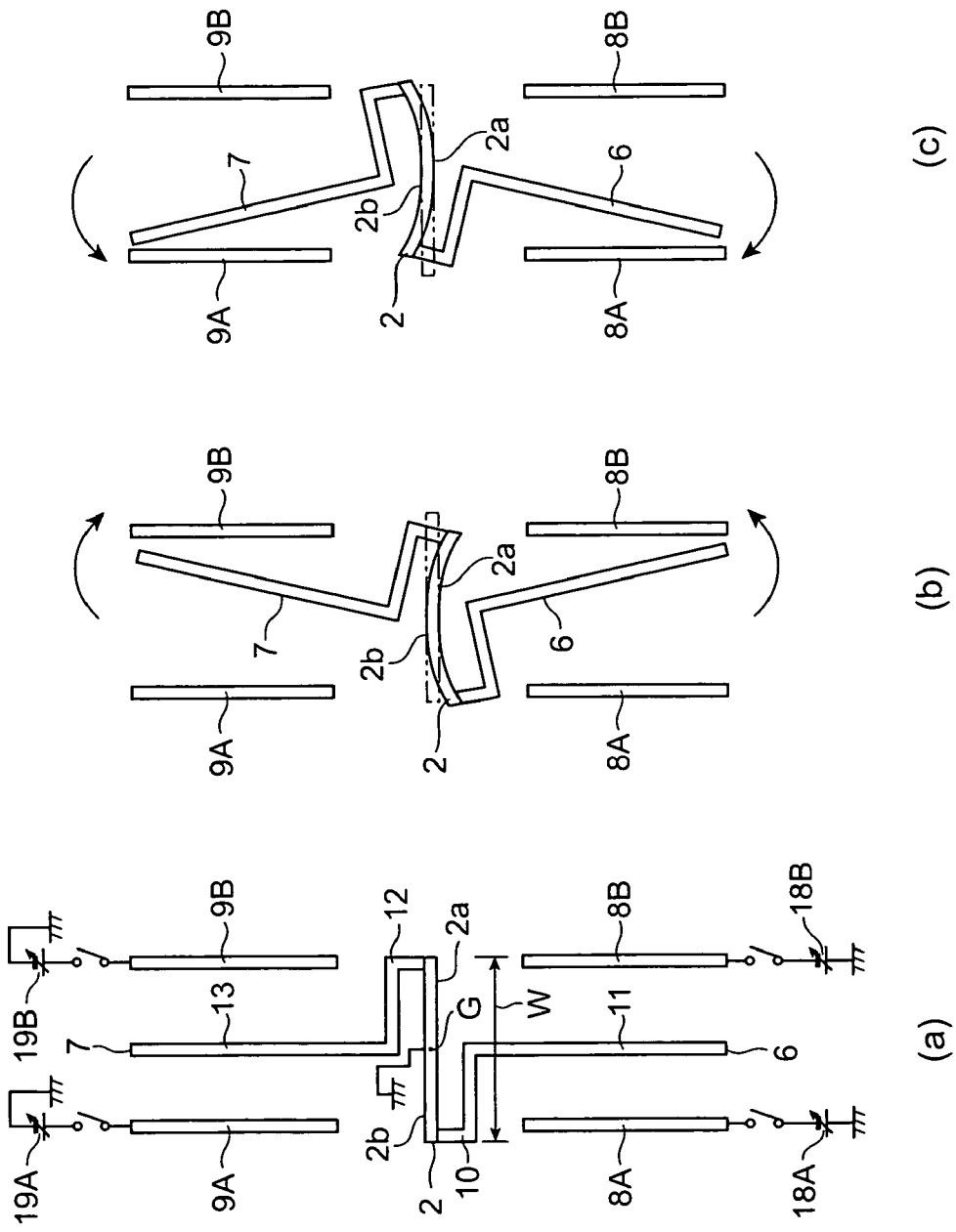
FIG. 23 is an illustration showing the operation of the movable mirror device shown in FIG. 22.

As shown in FIG. 23(*a*), the movable electrode terminals 6, 7 are grounded through the mirror 2 and anchor part 5. Variable voltage sources 18A, 18B for generating an electrostatic force between the movable electrode terminal 6 and the stationary electrode terminals 8A, 8B are connected to the respective stationary electrode terminals 8A, 8B, while variable voltage sources 19A, 19B for generating an electrostatic force between the movable electrode terminal 7 and the stationary electrode terminals 9A, 9B are connected to the respective stationary electrode terminals 9A, 9B.

The operation of the movable mirror device 1 shown in FIG. 22 will be described below. FIG. 23 is an illustration showing the operation of the movable mirror device shown in FIG. 22. First, in the initial state in which the variable voltage sources 18A–19B apply the voltage of zero, as shown in FIG. 23(*a*), the mirror 2 is in a flat state without flexure. Namely, the front surface 2a of the mirror 2 in the initial state is a flat surface, as shown in FIG. 23(*a*).

When the variable voltage source 18B applies a voltage to the stationary electrode terminal 8B and when the variable voltage source 19B applies a voltage to the stationary electrode terminal 9B, as shown in FIG. 23(*b*), the movable electrode terminal 6 is attracted toward the stationary electrode terminal 8B by an electrostatic force occurring between the movable electrode terminal 6 and the stationary electrode terminal 8B, and the movable electrode terminal 7 is attracted toward the stationary electrode terminal 9B by an electrostatic force occurring between the movable electrode terminal 7 and the stationary electrode terminal 9B. This results in bending the mirror 2 into a concave shape with respect to the front surface 2a thereof. Namely, when the movable electrode terminal 6 is subject to the electrostatic attraction from the stationary electrode terminal 8B, one side portion of the mirror 2 coupled to the movable electrode terminal 6 undergoes a force directed toward the other side portion in the region on the front surface 2a side where the stationary electrode terminal 8B is provided. When the movable electrode terminal 7 is subject to the electrostatic attraction from the stationary electrode terminal 9B, the other side portion of the mirror 2 coupled to the movable electrode terminal 7 undergoes a force directed toward one side portion in the region on the front surface 2a side (in the opposite direction to the direction where the stationary electrode terminal 9B is located with respect to the center axis of the mirror 2). As a result, the front surface 2a of the mirror 2 is deformed into a concave surface around the center axis. At this time, the amount of flexure of the mirror 2 varies with change in the applied voltages by the variable voltage sources 18B, 19B.

On the other hand, when the variable voltage source 18A applies a voltage to the stationary electrode terminal 8A and when the variable voltage source 19A applies a voltage to the stationary electrode terminal 9A, as shown in FIG. 23(*c*), the movable electrode terminal 6 is attracted toward the stationary electrode terminal 8A by an electrostatic force occurring between the movable electrode terminal 6 and the stationary electrode terminal 8A, and the movable electrode terminal 7 is attracted toward the stationary electrode terminal 9A by an electrostatic force occurring between the movable electrode terminal 7 and the stationary electrode terminal 9A. This results in bending the mirror 2 into a convex shape with respect to the front surface 2a thereof. Namely, when the movable electrode terminal 6 is subject to the electrostatic attraction from the stationary electrode terminal 8A, one side portion of the mirror 2 coupled to the movable electrode terminal 6 undergoes a force directed toward the other side portion in the region on the back surface 2b side (in the opposite direction to the direction where the stationary electrode terminal 8A is located with respect to the center axis), around the center axis. When the movable electrode terminal 7 is subject to the electrostatic attraction from the stationary electrode terminal 9A, the other side portion of the mirror 2 coupled to the movable electrode terminal 7 undergoes a force directed toward one side portion in the region on the back surface 2b side (the side where the stationary electrode terminal 9A is provided), around the center axis. Therefore, the front surface 2a of the mirror 2 is deformed into a convex surface around the center axis. At this time, the amount of flexure of the mirror 2 varies with change in the applied voltages by the variable voltage sources 18A, 19A.

In the present embodiment as described above, the movable electrode terminals 6, 7 are coupled to the front surface 2a and to the back surface 2b, respectively, of the mirror 2, whereby no so large space is necessary in the width direction of the mirror 2 even if a desired clearance is secured between the movable electrode terminal 6 and the stationary electrode terminals 8A, 8B and between the movable electrode terminal 7 and the stationary electrode terminals 9A, 9B in order to expand the movable range of the movable electrode terminals 6, 7. This permits the mirror 2 to be deformed in the wide range in the both ways from the flat state into the convex shape and into the concave shape while keeping the width W (cf. FIG. 23) of the movable mirror device 1 (drive section 3) small. In this case, since part of the movable electrode terminals 6, 7 is bent toward the central part in the width direction of the mirror 2, it becomes feasible to make the width W of the movable mirror device 1 smaller and to efficiently move the movable electrode terminals 6, 7.

Since in the initial state the shape of the mirror 2 is flat, the stress can be small upon the drive to deform the mirror 2, and the mirror 2 can be readily fabricated.

Furthermore, since the movable electrode terminals 6, 7 and the stationary electrode terminals 8A–9B are all of the interdigital structure, the electrostatic forces are enhanced thereby between the movable electrode terminal 6 and the stationary electrode terminals 8A, 8B and between the movable electrode terminal 7 and the stationary electrode terminals 9A, 9B. Therefore, the movable electrode terminals 6, 7 can be driven by a lower voltage by that degree, so as to achieve power saving.

Figure 24:
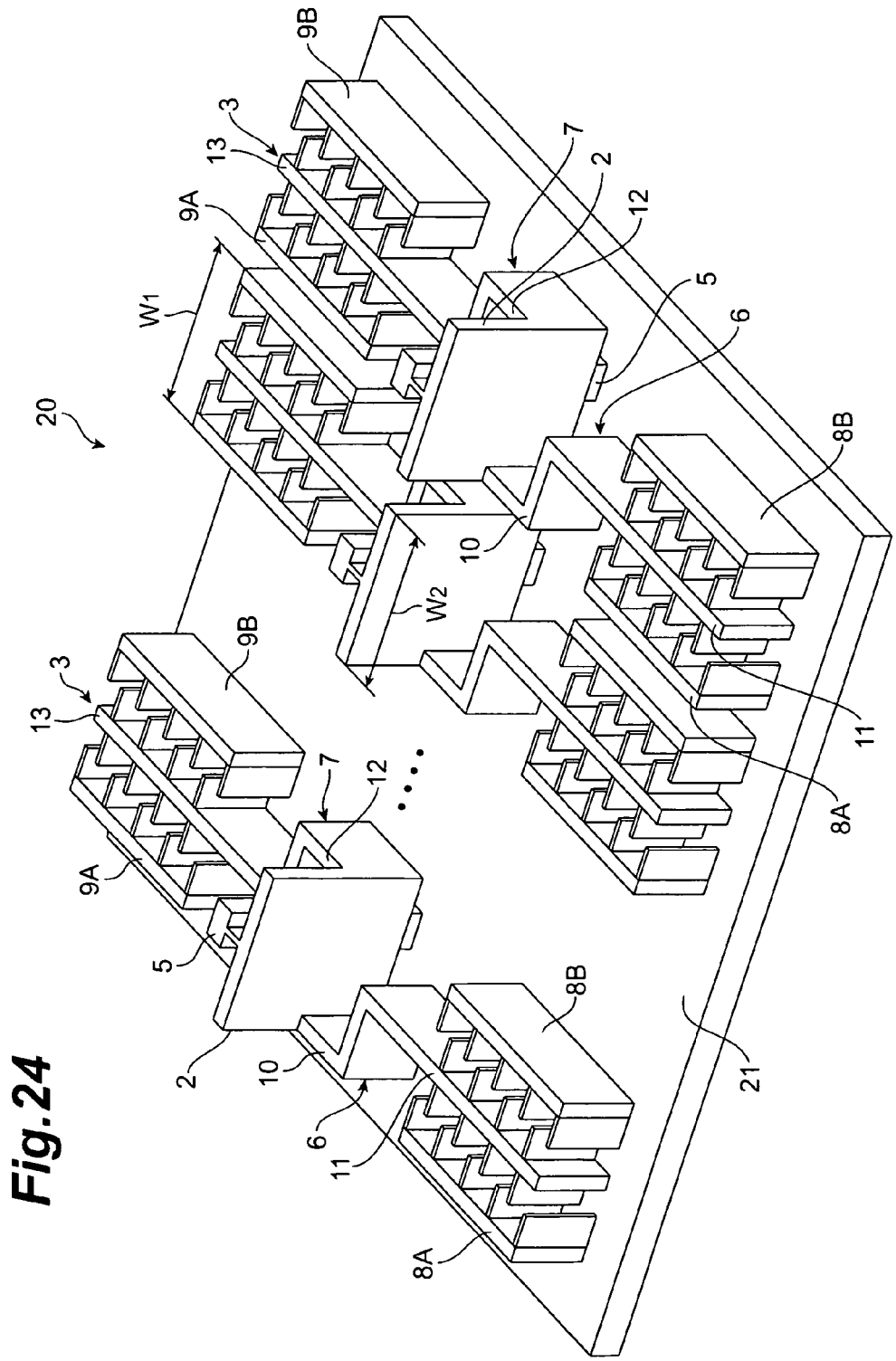
FIG. 24 is a perspective view showing a movable mirror device array as an application of the movable mirror device shown in FIG. 22.

FIG. 24 is a perspective view showing a movable mirror device array as an application of the above-described movable mirror device 1 shown in FIG. 22. In the drawing, identical or equivalent members to those in the above movable mirror device 1 shown in FIG. 22 are denoted by the same reference symbols, without redundant description thereof.

The movable mirror device array 20 shown in FIG. 24 has plural sets of mirrors 2 and drive sections 3 one-dimensionally arrayed on one substrate 21. In order to narrow the array spacing between mirrors 2, the width $W_1$ of the drive sections 3 is preferably not more than one and half times the width $W_2$ of the mirrors 2; particularly, in a case where the array is applied to a dispersion compensator described later, or the like, the width $W_1$ of the drive sections 3 is more preferably smaller than the width $W_2$ of the mirrors 2, in order to array the mirrors 2 with little clearance in accordance with the wavelength spacing of light.

Figure 25:
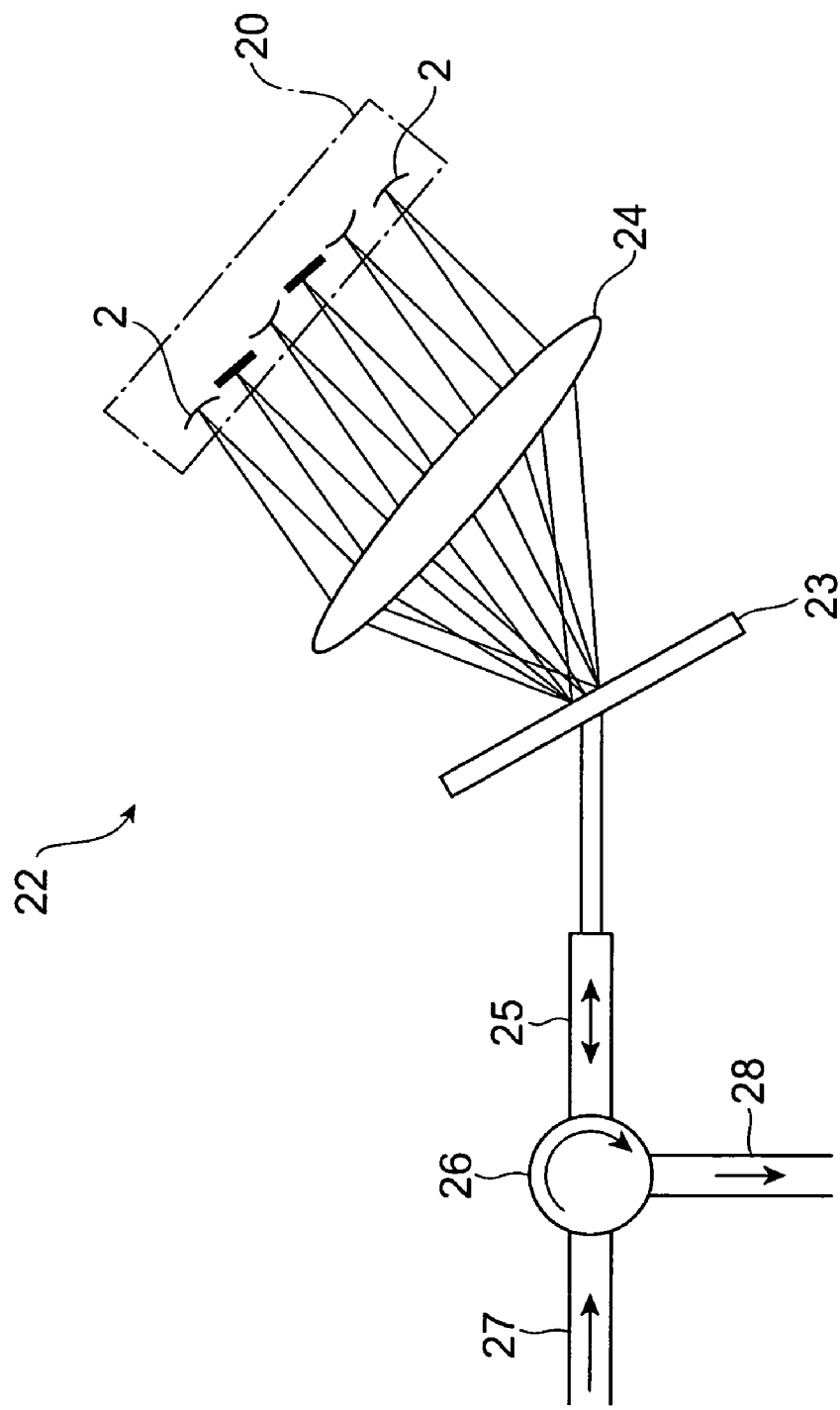
FIG. 25 is a configuration diagram showing a dispersion compensator provided with the movable mirror device array shown in FIG. 24.

FIG. 25 is a configuration diagram showing a dispersion compensator provided with the above-described movable mirror device array. The dispersion compensator 22 shown in FIG. 25 is a device for optical communication which is configured to give signal light a phase shift to effect compensation for dispersion of the signal light.

The dispersion compensator 22 has a diffraction grating 23, the aforementioned movable mirror device array 20, and a lens 24 disposed between the diffraction grating 23 and the movable mirror device array 20. The diffraction grating 23 separates.

(or spectrally divides) the signal light containing a plurality of wavelength components from an optical transmission path 25 for dispersion compensation, into wavelength components. Each mirror 2 in the movable mirror device array 20 reflects one of the plurality of signal light components of the respective wavelength channels separated by the diffraction grating 23. The dispersion-compensation optical transmission path 25 is connected through an optical circulator 26 to an input optical transmission path 27 and to an output optical transmission path 28.

In the dispersion compensator 22 of this configuration, the signal light injected into the input optical transmission path 27 travels through the optical circulator 26 to emerge from the dispersion-compensation optical transmission path 25, and is separated into the wavelength components by the diffraction grating 23. Then the separated signal light components propagate through the lens 24 to the movable mirror device array 20 and are reflected on the respective mirrors 2. At this time, each mirror 2 is controlled in flexure amount so as to compensate for dispersion by giving a desired phase difference to the signal light of each wavelength channel separated. The signal light components reflected by the respective mirrors 2 again propagate through the lens 24 to the diffraction grating 23 and are combined in this diffraction grating 23. Then the combined signal light travels through the dispersion-compensation optical transmission path 25, optical circulator 26, and output optical transmission path 28 to be outputted.

Since the mirrors 2 can be deformed both into the convex shape and into the concave shape as described above, they can securely compensate for both positive dispersion and negative dispersion. Therefore, the dispersion compensation for each wavelength can be controlled with good controllability and the dispersion compensation can be carried out with high accuracy.

Figure 26:
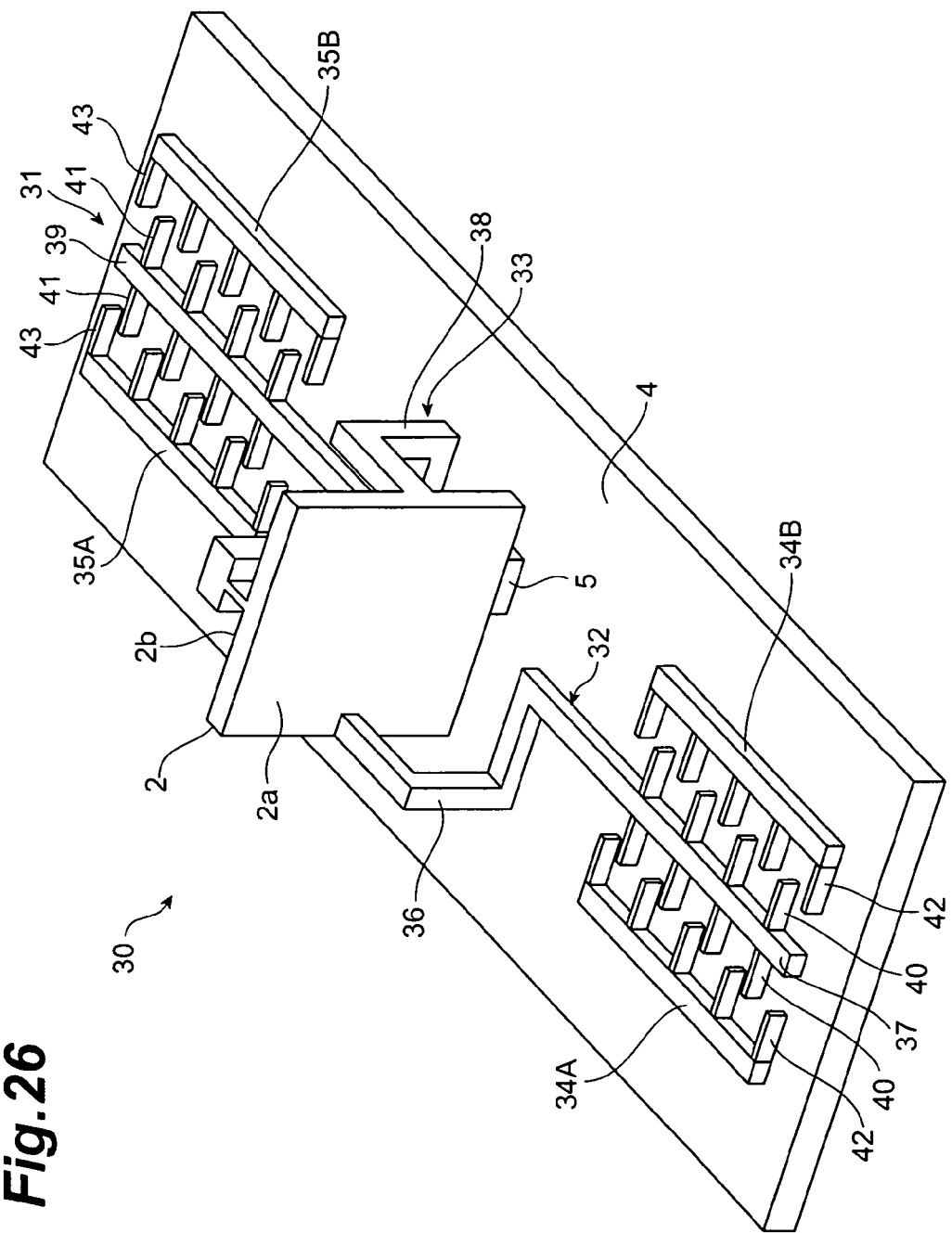
FIG. 26 is a perspective view showing an embodiment of the movable mirror device according to the present invention.

Furthermore, still another embodiment of the movable mirror device according to the present invention will be described below. FIG. 26 is a perspective view showing an embodiment of the movable mirror device according to the present invention. In FIG. 26, identical or equivalent members to those in the above embodiment are denoted by the same reference symbols. The description of the identical or equivalent members to those in the above embodiment will be omitted below.

The movable mirror device 30 of the present embodiment shown in FIG. 26 is provided with a drive section 31 for deforming the mirror 2 into a curved shape. The drive section 31 has a movable electrode terminal 32 coupled to the left end of the mirror 2 on the view from the front surface 2a side in the front surface 2a of the mirror 2, a movable electrode terminal 33 coupled to the right end of the mirror 2 on the view from the front surface 2a side in the back surface 2b of the mirror 2, a pair of stationary electrode terminals 34A, 34B fixed to the upper surface of the substrate 4 so as to face the movable electrode terminal 32 on the front surface 2a side of the mirror 2, and a pair of stationary electrode terminals 35A, 35B fixed to the upper surface of the substrate 4 so as to face the movable electrode terminal 33 on the back surface 2b side of the mirror 2. Namely, the movable electrode terminal 32 and the stationary electrode terminals 34A, 34B are provided in the region on the front surface 2a side, out of the two regions defined by the mirror 2 in the first direction intersecting with the reflecting surface 2a of the mirror 2. The movable electrode terminal 33 and the stationary electrode terminals 35A, 35B are provided in the region behind the front surface 2a (the region on the back surface 2b side), out of the two regions. These movable electrode terminals 32, 33 and stationary electrode terminals 34A–35B are all of rod shape of a rectangular cross section.

The movable electrode terminal 32 has a joint part 36 coupled to the front surface 2a of the mirror 2, and an electrode part 37 integrated with the joint part 36 and extending forward from the mirror 2. The joint part 36 has a structure in which it is coupled to the central part in the height direction of the mirror 2 in the left end portion of the mirror 2 on the view from the front surface 2a side, in the front surface 2a of the mirror 2, and in which it is bent downward toward the substrate 4 and further bent toward the central part in the width direction of the mirror 2. Namely, the movable electrode terminal 32 has the joint part 36 and the electrode part 37, and the joint part 36 is coupled to the front surface 2a of the mirror 2 in one side portion in the width direction (second direction) of the mirror 2. The joint part 36 is coupled to the central part in the height direction of the mirror 2 (which is the same direction as the third direction). The joint part 36 has a portion extending in the height direction and extends from an end of the portion toward a plane passing the center in the width direction of the mirror 2. The electrode part 37 is continuous to the joint part 36 and extends in the first direction along the plane passing the center in the width direction of the mirror 2.

The movable electrode terminal 33 has a joint part 38 coupled to the back surface 2b of the mirror 2, and an electrode part 39 integrated with this joint part 38 and extending backward from the mirror 2. The joint part 38 has a structure in which it is coupled to the central part in the height direction of the mirror 2 in the right end portion of the mirror 2 on the view from the front surface 2a side, in the back surface 2b of the mirror 2, and in which it is bent downward toward the substrate 4 and further bent toward the central part in the width direction of the mirror 2. Namely, the movable electrode terminal 33 has the joint part 38 and the electrode part 39, and the joint part 38 is coupled to the back surface 2b of the mirror 2 in the other side portion in the width direction (second direction) of the mirror 2. The joint part 38 is coupled to the central part in the height direction (which is the same direction as the third direction) of the mirror 2. The joint part 38 has a portion extending in the height direction, and extends from an end of the portion toward the plane passing the center in the width direction of the mirror 2. The electrode part 39 is continuous to the joint part 38 and extends in the first direction along the plane passing the center in the width direction of the mirror 2.

The stationary electrode terminals 34A, 34B are placed on both sides of the electrode part 37 so as to face each other with the electrode part 37 in between. The stationary electrode terminals 35A, 35B are placed on both sides of the electrode part 39 so as to face each other with the electrode part 39 in between.

In the present embodiment, the stationary electrode terminals 34A, 35A are provided along one side portion of the movable mirror device 30 in the second direction, while the stationary electrode terminals 34B, 35B along the other side portion of the movable mirror device 30. Namely, the stationary electrode terminal 34A is provided along one side portion in the second direction in the region on the front surface 2a side out of the two regions defined by the mirror 2, and the stationary electrode terminal 34B along the other side portion in the same region. The electrode part 37 extends in the first direction between the stationary electrode terminal 34A and the stationary electrode terminal 34B. The stationary electrode terminal 35A is provided along one side portion in the second direction in the region on the back surface 2b side out of the two regions, while the stationary electrode terminal 35B along the other side portion in the same region. The electrode part 39 extends in the first direction between the stationary electrode terminal 35A and the stationary electrode terminal 35B.

The electrode part 37 is provided with fingers 40 on both sides, and the electrode part 39 with fingers 41 on both sides. The stationary electrode terminals 34A, 34B are provided with fingers 42 on the side facing the electrode part 37, and the stationary electrode terminals 35A, 35B with fingers 43 on the side facing the electrode part 39.

Since the present embodiment adopts the configuration wherein the movable electrode terminals 32, 33 are of the rod shape and wherein the movable electrode terminals 32, 33 are of the bent structure as described above, the effective area of the mirror 2 is increased, and most part of the front surface 2a of the mirror 2 can be used as a light reflecting region. Since the movable electrode terminals 32, 33 are coupled to the central parts in the height direction of the mirror 2, the mirror 2 can be deformed in bilateral symmetry with respect to the axis of rotation on the central part in the width direction of the mirror 2.

Figure 27:
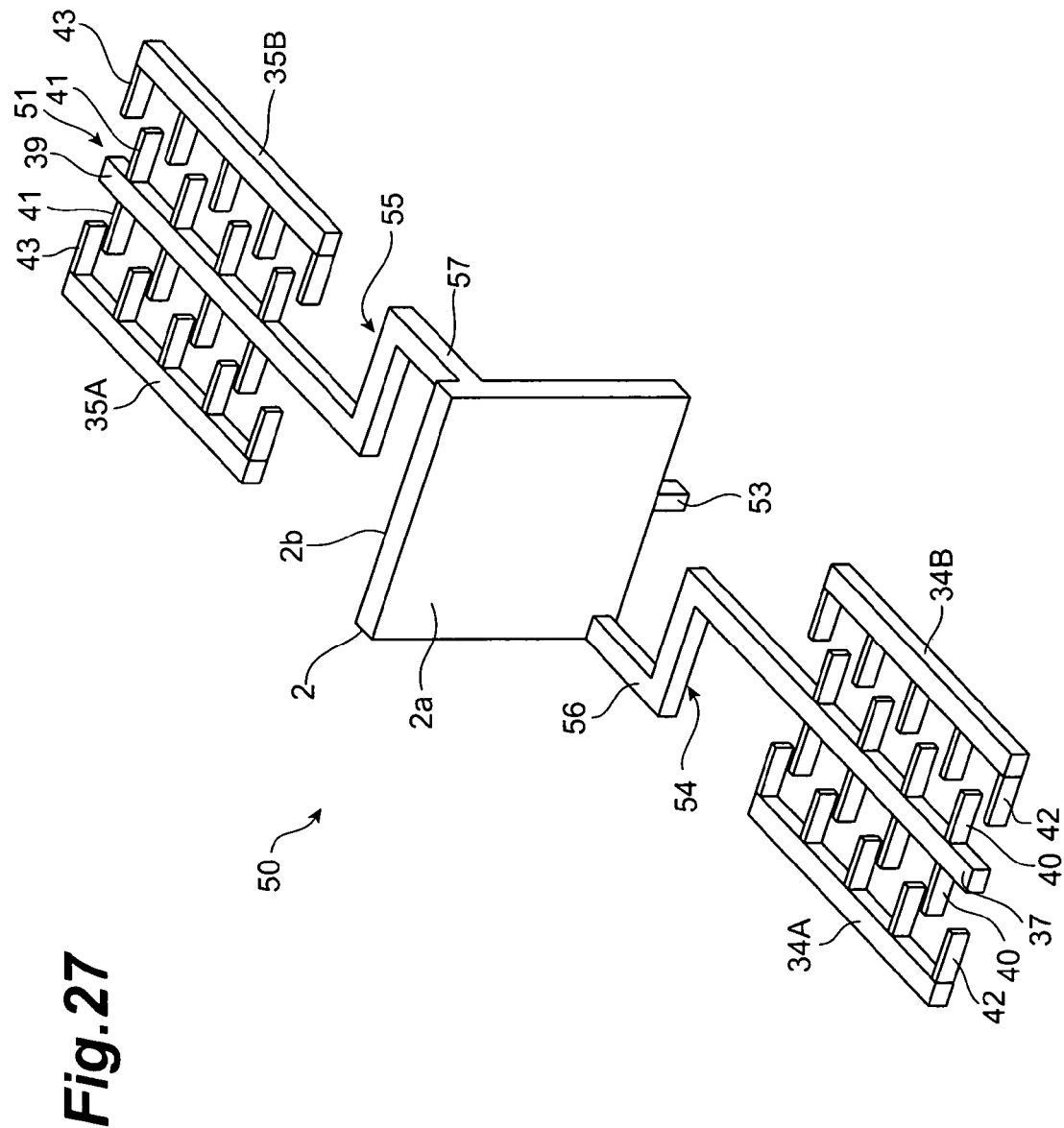
FIG. 27 is a perspective view showing an embodiment of the movable mirror device according to the present invention.
Figure 28:
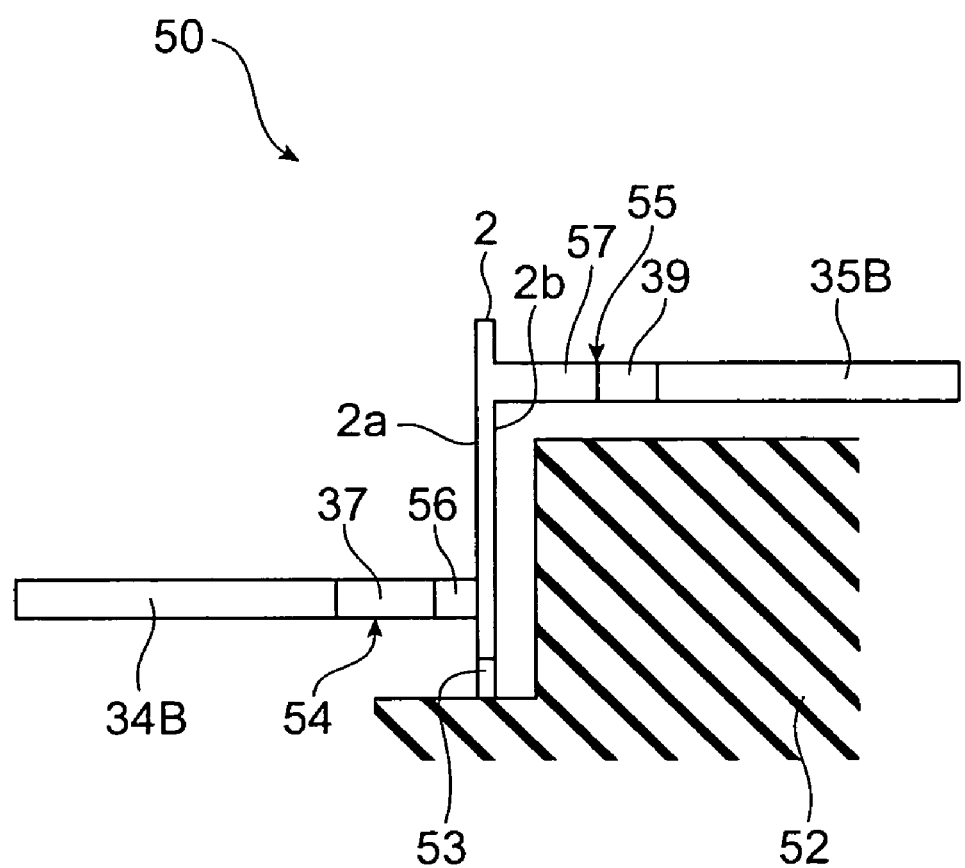
FIG. 28 is a side view of the movable mirror device shown in FIG. 27.

Furthermore, still another embodiment of the movable mirror device according to the present invention will be described below. FIG. 27 is a perspective view showing an embodiment of the movable mirror device according to the present invention. FIG. 28 is a side view of the movable mirror device shown in FIG. 27. In FIGS. 27 and 28, identical or equivalent members to those in the embodiment shown in FIG. 26 are denoted by the same reference symbols. The description of the identical or equivalent members to those in the above embodiment will be omitted below.

The movable mirror device 50 of the present embodiment shown in FIGS. 27 and 28 is provided with a drive section 51 for deforming the mirror 2 into a curved shape. An anchor part 53 fixed to the upper surface of substrate 52 is provided in the lower part of the mirror 2, as shown in FIGS. 27 and 28. The substrate 52 is formed in a step shape so as to make the height position of the upper surface on the back surface 2b side of the mirror 2 higher than the height position of the upper surface on the front surface 2a side of the mirror 2.

The drive section 51 has movable electrode terminals 54, 55. The movable electrode terminal 54 has a joint part 56 coupled to the lower part of the left end of the mirror 2 on the view from the front surface 2a side, in the front surface 2a of the mirror 2, and an electrode part 37 integrated with the joint part 56. The movable electrode terminal 55 has a joint part 57 coupled to the upper part of the right end of the mirror 2 on the view from the front surface 2a side, in the back surface 2b of the mirror 2, and an electrode part 39 integrated with this joint part 57. The other structure is similar to the drive section 31 in the embodiment shown in FIG. 26.

Namely, the movable electrode terminal 54 and the stationary electrode terminals 34A, 34B are provided in the region on the front surface 2a side out of the two regions defined by the mirror 2 in the first direction intersecting with the reflecting surface 2a of the mirror 2. The movable electrode terminal 55 and the stationary electrode terminals 35A, 35B are provided in the region behind the front surface 2a (in the region on the back surface 2b side) out of the two regions.

The movable electrode terminal 54 has the joint part 56 and the electrode part 37. The movable electrode terminal 55 has the joint part 57 and the electrode part 39. The joint part 56 and the joint part 57 are coupled to the corners located on a diagonal line with respect to the center of the mirror 2. The joint part 56 is coupled to the front surface 2a, while the joint part 57 to the back surface 2b.

The joint part 56 and the joint part 57 have portions extending toward the plane passing the center in the width direction (second direction) of the mirror 2. The electrode part 37 is continuous to the joint part 56 and extends in the first direction along the plane passing the center in the width direction of the mirror 2. The electrode part 39 is continuous to the joint part 57 and extends in the first direction along the plane passing the center in the width direction of the mirror 2.

The stationary electrode terminals 34A and 34B extend in the first direction with the electrode part 37 of the movable electrode terminal 54 between them. The stationary electrode terminals 35A and 35B extend in the first direction with the electrode part 39 of the movable electrode terminal 55 between them.

In the present embodiment, the effective area of the mirror 2 can be increased and the major part of the front surface 2a of the mirror 2 can be used as a light reflecting region. Since there is only one bent portion existing in each of the joint parts 56, 57 of the movable electrode terminals 54, 55, the production process of the movable mirror device by the MEMS technology can be simplified.

Figure 29:
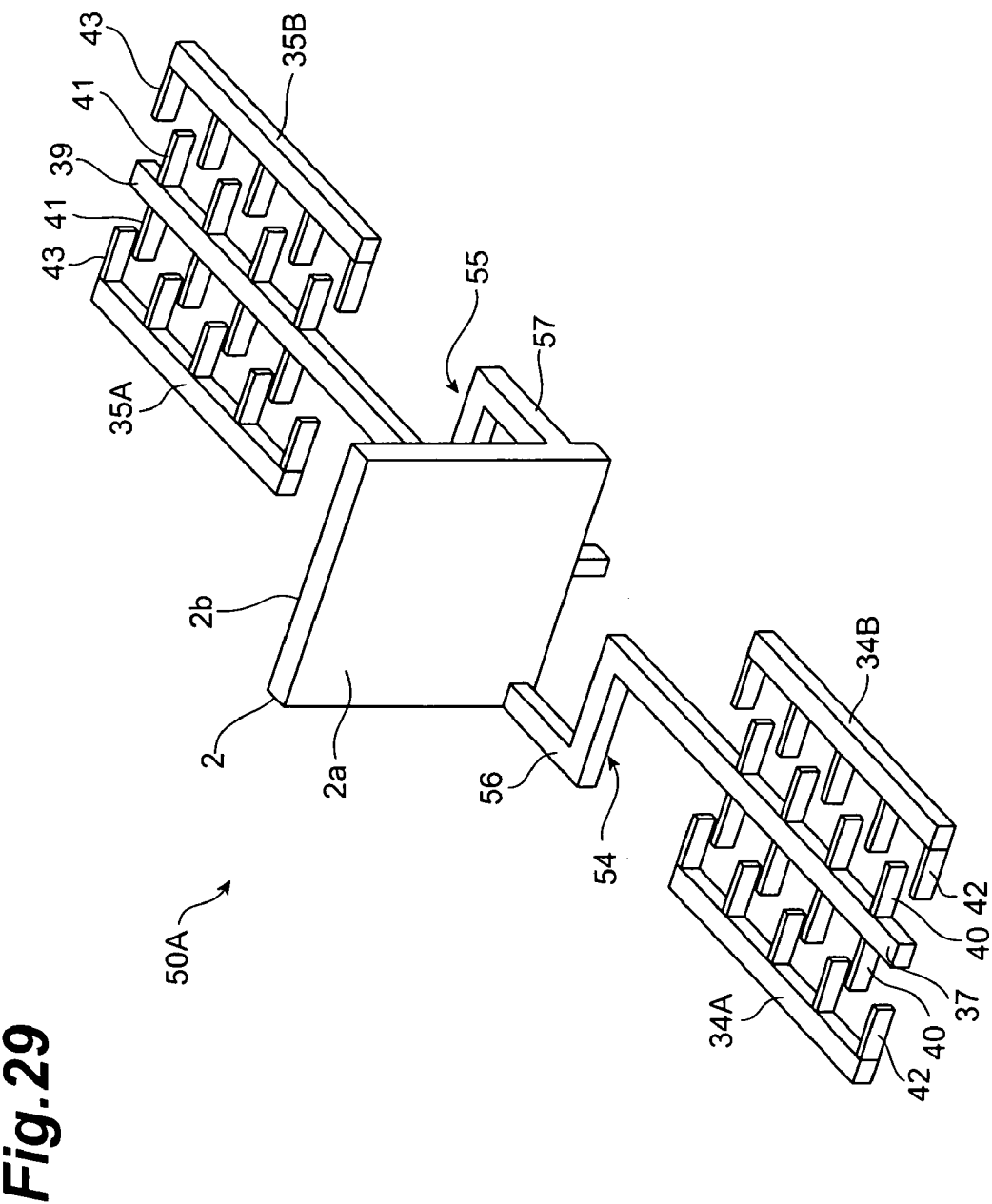
FIG. 29 is a perspective view showing a modification example of the movable mirror device according to the present invention.
Figure 30:
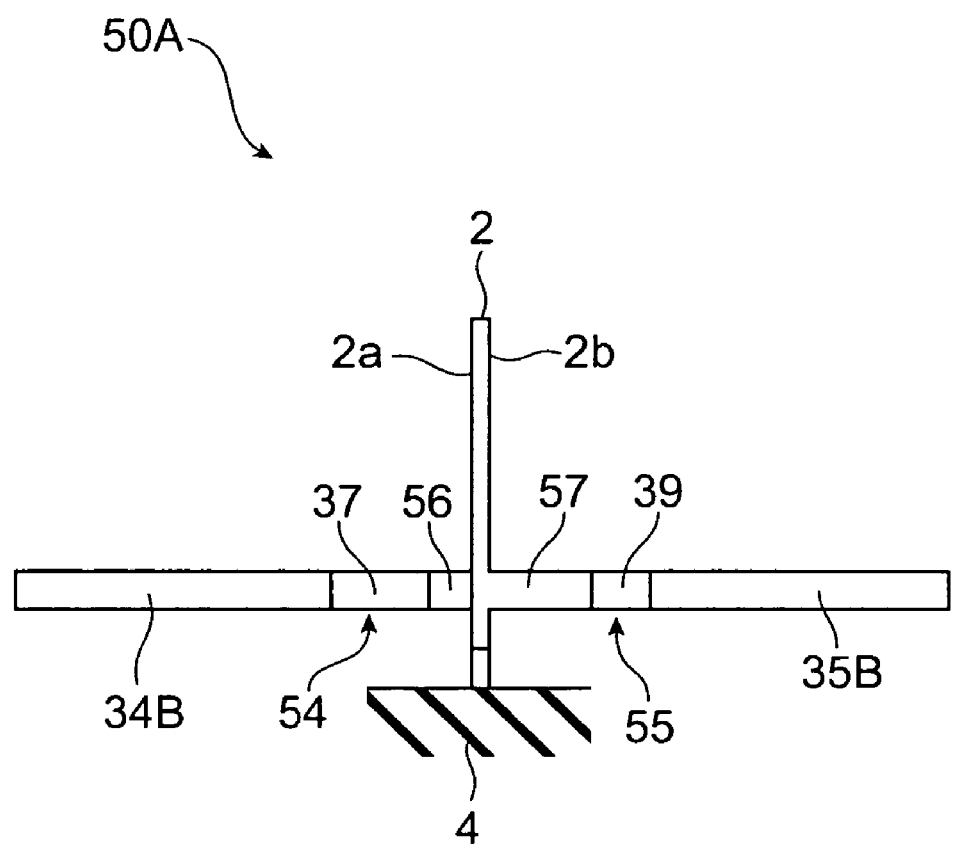
FIG. 30 is a side view of the movable mirror device shown in FIG. 29.

FIG. 29 is a perspective view showing a modification example of the foregoing embodiment of the movable mirror device according to the present invention. Namely, FIG. 29 shows a modification example of the movable mirror device shown in FIG. 27. FIG. 30 is a side view of the movable mirror device shown in FIG. 29. The movable mirror device 50A shown in FIGS. 29 and 30 is constructed so that the movable electrode terminal 55 is coupled to the lower part of the right end of the mirror 2 on the view from the front surface 2a side, in the back surface 2b of the mirror 2, in order to locate the movable electrode terminals 54, 55 at the same height. The mirror 2 is fixed through the anchor part 53 to the upper surface of the substrate 4 of flat plate shape, as shown in FIGS. 29 and 30.

Namely, the movable electrode terminals 54, 55 and the stationary electrode terminals 34A, 34B, 35A, 35B are provided along a plane passing one side portion in the height direction of the mirror 2 (the third direction intersecting with the first direction intersecting with the reflecting surface 2a, and intersecting with the second direction).

The movable electrode terminal 54 and the movable electrode terminal 56 are provided in symmetry with respect to the center axis passing the center in the width direction (second direction) of the mirror 2. The joint part 56 of the movable electrode terminal 54 is coupled to the front surface 2a in one side portion in the width direction of the mirror 2, extends toward the plane passing the center in the width direction of the mirror 2, and is connected to the electrode part 37. The joint part 57 of the movable electrode terminal 56 is coupled to the back surface 2b in the other side portion in the width direction of the mirror 2, extends toward the plane passing the center in the width direction of the mirror 2, and is connected to the electrode part 39. The electrode parts 37 and 39 extend along the plane passing the center in the width direction of the mirror 2. The positional relation of the stationary electrode terminals 34A, 34B with the electrode part 37 and the positional relation of the stationary electrode terminals 35A, 35B with the electrode part 39 are similar to those in the movable mirror device shown in FIG. 27.

Figure 31:
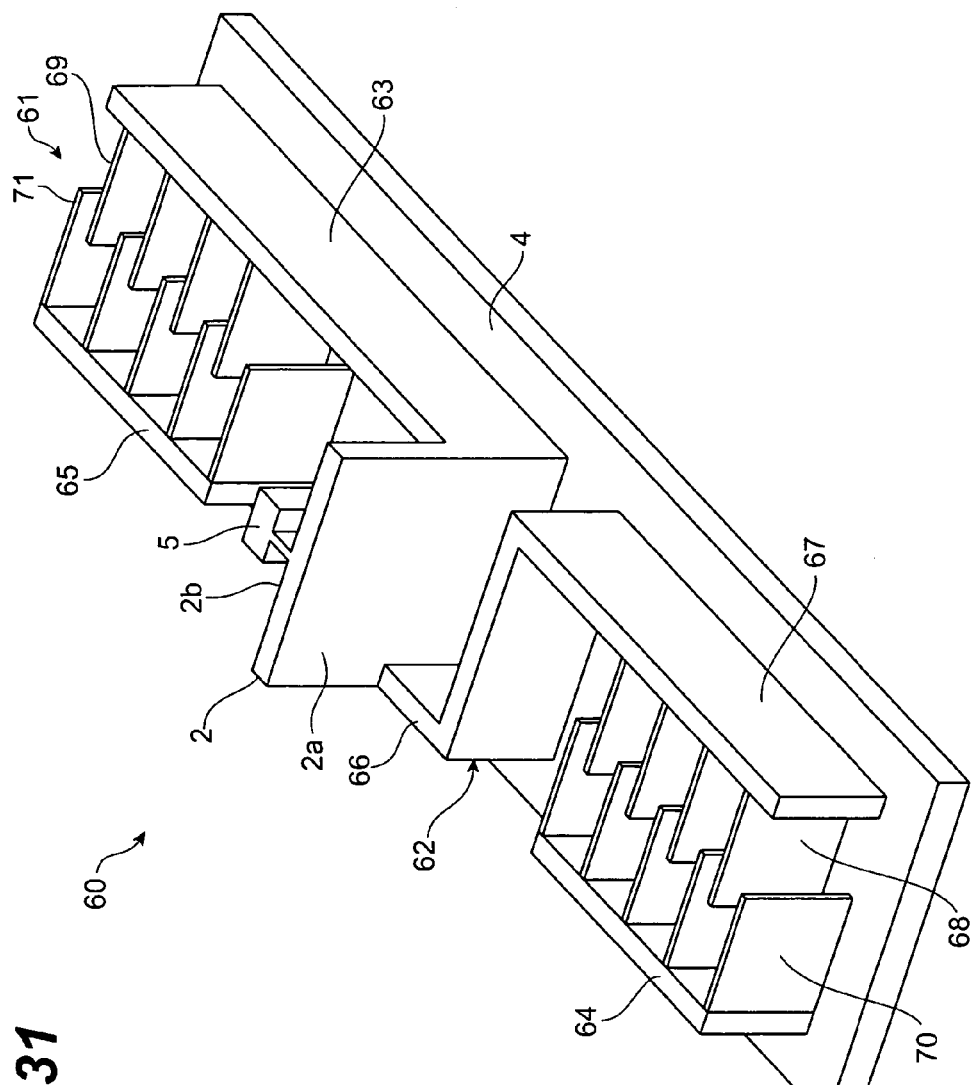
FIG. 31 is a perspective view showing an embodiment of the movable mirror device according to the present invention.
Figure 32:
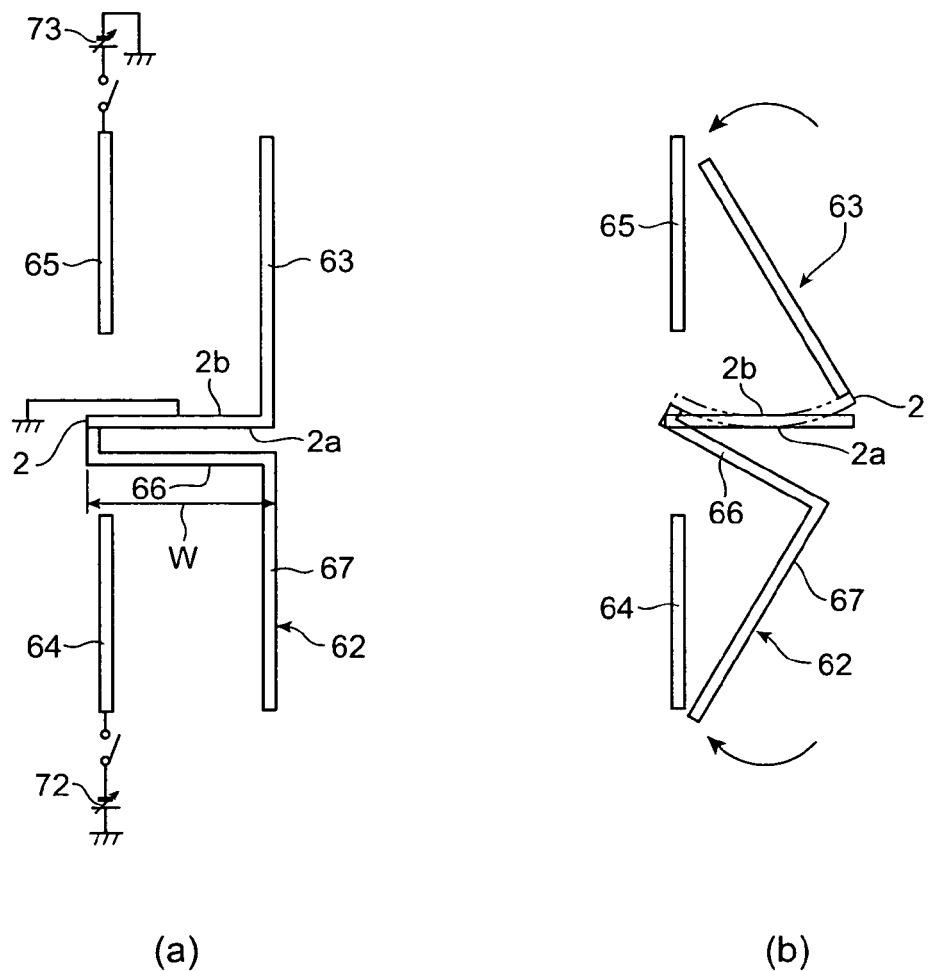
FIG. 32 is an illustration showing the operation of the movable mirror device shown in FIG. 31.

Furthermore, still another embodiment of the movable mirror device according to the present invention will be described below. FIG. 31 is a perspective view showing an embodiment of the movable mirror device according to the present invention. FIG. 32 is an illustration showing the operation of the movable mirror device shown in FIG. 31. In FIGS. 31 and 32, identical or equivalent members to those in the embodiment shown in FIG. 22 are denoted by the same reference symbols. The description of the identical or equivalent members to those in the above embodiment will be omitted below.

The movable mirror device 60 of the present embodiment shown in FIG. 31 is provided with a drive section 61 for deforming the mirror 2 into a curved shape. The drive section 61 has a movable electrode terminal 62 coupled to the front surface 2a of the mirror 2, a movable electrode terminal 63 coupled to the back surface 2b of the mirror 2, a stationary electrode terminal 64 fixed to the upper surface of the substrate 4 so as to face the movable electrode terminal 62 on the front surface 2a side of the mirror 2, and a stationary electrode terminal 65 fixed to the upper surface of the substrate 4 so as to face the movable electrode terminal 63 on the back surface 2b side of the mirror 2. Namely, the drive section 61 has the movable electrode terminals 62, 63 and the stationary electrode terminals 64, 65. The movable electrode terminal 62 and the stationary electrode terminal 64 are provided in the region on the front surface 2a side out of the two regions defined by the mirror 2 in the first direction intersecting with the reflecting surface 2a of the mirror 2. The movable electrode terminal 63 and the stationary electrode terminal 65 are provided in the region behind the front surface 2a (in the region on the back surface 2b side) out of the two regions.

The movable electrode terminal 62 has a joint part 66 having a bent structure in which it is coupled to the left end of the mirror 2 on the view from the front surface 2a side, in the front surface 2a of the mirror 2 and in which it is bent toward the right end of the mirror 2, and an electrode part 67 integrated with the joint part 66 and extending forward from the mirror 2. Namely, the movable electrode terminal 62 has the joint part 66 and the electrode part 67. The joint part 66 is coupled to the front surface 2a in one side portion in the width direction (second direction) of the mirror 2, and extends toward the other side portion in the second direction in the region on the front surface 2a side. The electrode part 67 is connected to the joint part 66 and extends in the first direction along the other side portion in the second direction in the region on the front surface 2a side.

The movable electrode terminal 63 is coupled to the right end of the mirror 2 on the view from the front surface 2a side, in the back surface 2b of the mirror 2, and extends backward from the mirror 2. The electrode part 67 of the movable electrode terminal 62, and the movable electrode terminal 63 are arranged to extend substantially on a straight line. Namely, the joint part of the movable electrode terminal 63 is coupled to the back surface 2b in the other side portion in the width direction (second direction) of the mirror 2, and the movable electrode terminal 63 extends in the first direction along the other side portion in the second direction in the region behind the front surface 2a.

The stationary electrode terminals 64, 65 are placed on the left end side of the mirror 2 on the view from the front surface 2a side, relative to the electrode part 67 of the movable electrode terminal 62, and the movable electrode terminal 63. The stationary electrode terminals 64, 65 are arranged so as to extend substantially on a straight line. Namely, the stationary electrode terminal 64 is provided along one side portion in the second direction in the region on the front surface 2a side, and the stationary electrode terminal 65 along one side portion in the second direction in the region behind the front surface 2a (in the region on the back surface 2b side). Therefore, the stationary electrode terminals 64 and 65 extend substantially on a straight line.

The electrode part 67 of the movable electrode terminal 62 is provided with fingers 68 on the side facing the stationary electrode terminal 64, and the movable electrode terminal 63 is provided with fingers 69 on the side facing the stationary electrode terminal 65. The stationary electrode terminal 64 is provided with fingers 70 on the side facing the electrode part 67, and the stationary electrode terminal 65 is provided with fingers 71 on the side facing the movable electrode terminal 63.

As shown in FIG. 32(a), the movable electrode terminals 62, 63 are grounded through the mirror 2 and anchor part 5. A variable voltage source 72 for generating an electrostatic force between the movable electrode terminal 62 and the stationary electrode terminal 64 is connected to the stationary electrode terminal 64, and a variable voltage source 73 for generating an electrostatic force between the movable electrode terminal 63 and the stationary electrode terminal 65 is connected to the stationary electrode terminal 65.

The operation of the movable mirror device 60 shown in FIG. 31 will be described below. In the initial state in which the variable voltage sources 72, 73 apply the voltage of zero, as shown in FIG. 32(a), the mirror 2 is in a flat state without flexure. Namely, in the initial state the front surface 2a of the mirror 2 is a flat surface, as shown in FIG. 32(a).

When the variable voltage source 72 applies a voltage to the stationary electrode terminal 64 and when the variable voltage source 73 applies a voltage to the stationary electrode terminal 65, as shown in FIG. 32(b), the movable electrode terminal 62 is attracted toward the stationary electrode terminal 64 by an electrostatic force occurring between the movable electrode terminal 62 and the stationary electrode terminal 64, and the movable electrode terminal 63 is attracted toward the stationary electrode terminal 65 by an electrostatic force occurring between the movable electrode terminal 63 and the stationary electrode terminal 65. This results in bending the mirror 2 into a convex shape with respect to the front surface 2a thereof.

Namely, when the movable electrode terminal 62 is subject to the electrostatic attraction from the stationary electrode terminal 64, one side portion of the mirror 2 connected to the movable electrode terminal 62 undergoes a force directed toward the other side portion in the region on the back surface 2b side (in the opposite direction to the direction where the stationary electrode terminal 64 is located with respect to the center axis). When the movable electrode terminal 63 undergoes the force from the stationary electrode terminal 65, the other side portion of the mirror 2 connected to the movable electrode terminal 63 is attracted to one side portion in the region on the back surface 2b side (toward the stationary electrode terminal 65). As a result, the front surface 2a of the mirror 2 is deformed into a convex surface around the center axis of the mirror 2.

Since the present embodiment as described above adopts the configuration wherein the movable electrode terminals 62, 63 are coupled to the front surface 2a and to the back surface 2b, respectively, of the mirror 2, no so large space is necessary in the width direction of the mirror 2 even if the desired space is secured between the movable electrode terminal 62 and the stationary electrode terminal 64 and between the movable electrode terminal 63 and the stationary electrode terminal 65 in order to increase the movable range of the movable electrode terminals 62, 63. This permits the mirror 2 to be largely deformed from the flat state into the convex shape while keeping the width W of the movable mirror device 60 (drive section 61) small. Therefore, in a case where the present movable mirror device 60 is applied to the dispersion compensator as shown in FIG. 25, it is feasible to compensate for large positive dispersion.

Figure 33:
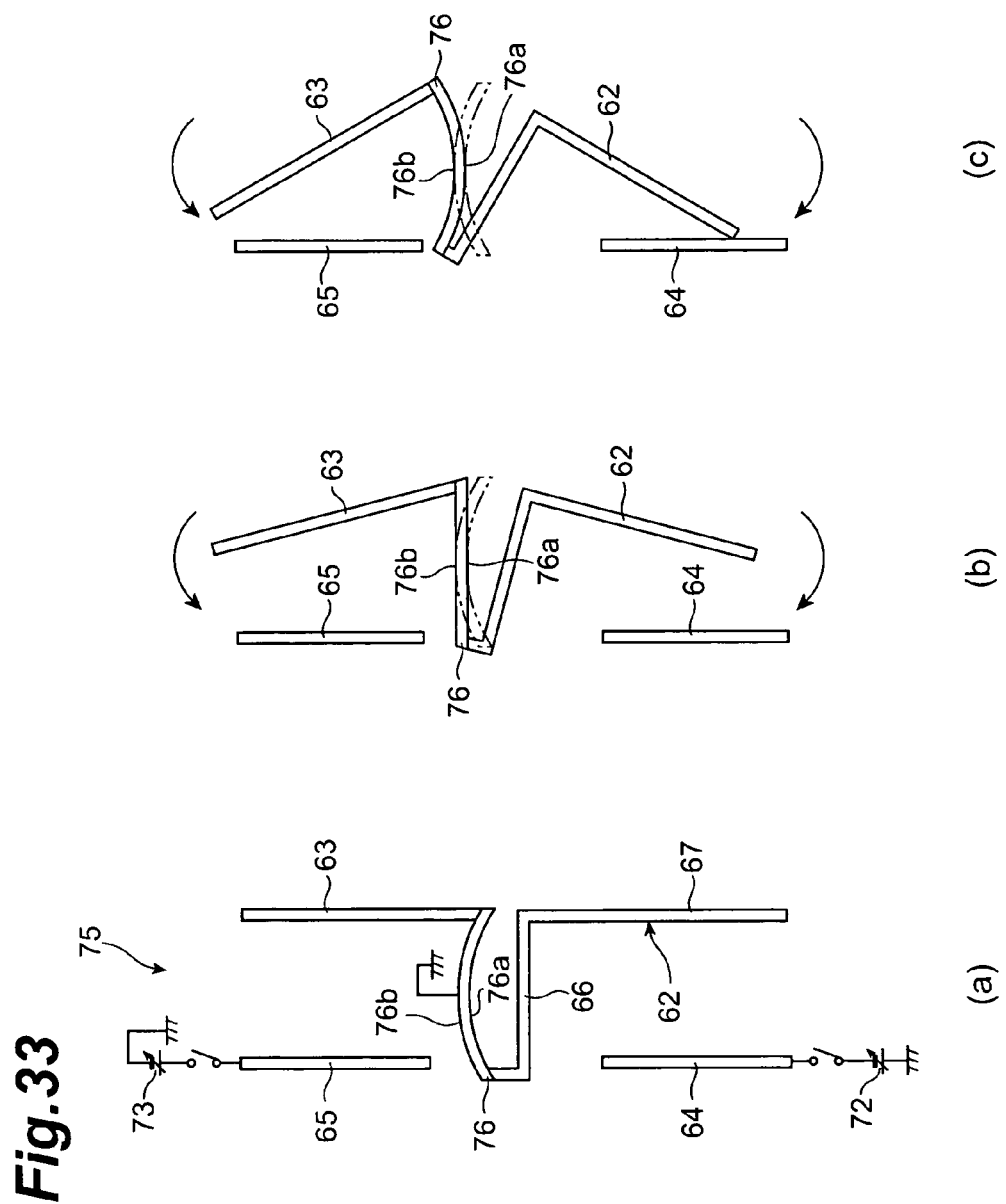
FIG. 33 is an illustration showing a schematic configuration and operation of an embodiment of the movable mirror device according to the present invention.

Furthermore, still another embodiment of the movable mirror device according to the present invention will be described below. FIG. 33 is an illustration showing a schematic configuration of an embodiment of the movable mirror device according to the present invention and the operation thereof. In FIG. 33, identical or equivalent members to those in the embodiment shown in FIG. 31 are denoted by the same reference symbols. The description of the identical or equivalent members to those in the embodiment shown in FIG. 31 will be omitted below.

The movable mirror device 75 of the present embodiment shown in FIG. 33 is different from the movable mirror device of the embodiment shown in FIG. 31 in that a mirror 76 replaces the mirror 2. The mirror 76 is of structure in which it is preliminarily bent in a concave shape with respect to the front surface (reflecting surface) 76a side, as shown in FIG. 33(a). Namely, the front surface 76a of the mirror 76 is formed as a concave surface in the initial state. The other structure of the movable mirror device 75 is similar to the movable mirror device of the embodiment shown in FIG. 31.

The operation of the movable mirror device 75 shown in FIG. 33 will be described below. When the variable voltage source 72 applies a voltage to the stationary electrode terminal 64 and when the variable voltage source 73 applies a voltage to the stationary electrode terminal 65, as shown in FIG. 33(b), the movable electrode terminal 62 is attracted toward the stationary electrode terminal 64 and the movable electrode terminal 63 is attracted toward the stationary electrode terminal 65, whereby the mirror 76 turns into a flat state without flexure. When the voltages applied by the variable voltage sources 72, 73 are further increased, as shown in FIG. 33(c), the movable electrode terminal 62 is further attracted toward the stationary electrode terminal 64 and the movable electrode terminal 63 is further attracted toward the stationary electrode terminal 65, whereby the mirror 76 is bent into a convex shape with respect to the front surface 76a thereof. Namely, in the movable mirror device 75, with increase in the amplitude of applied voltages, the front surface 76a of the mirror 76 is deformed from the concave surface into the flat surface and further deformed from the flat surface into the convex surface.

The present embodiment as described above adopts the simple structure wherein the stationary electrode terminals 64, 65 are placed on only one side of the movable electrode terminals 62, 63, and even in the simple structure the mirror 76 can be deformed into the concave shape and into the convex shape. In this case, the mirror 76 is moved in only one direction, and the control can be made simple in the application of the voltages to the stationary electrode terminals 64, 65.

Figure 34:
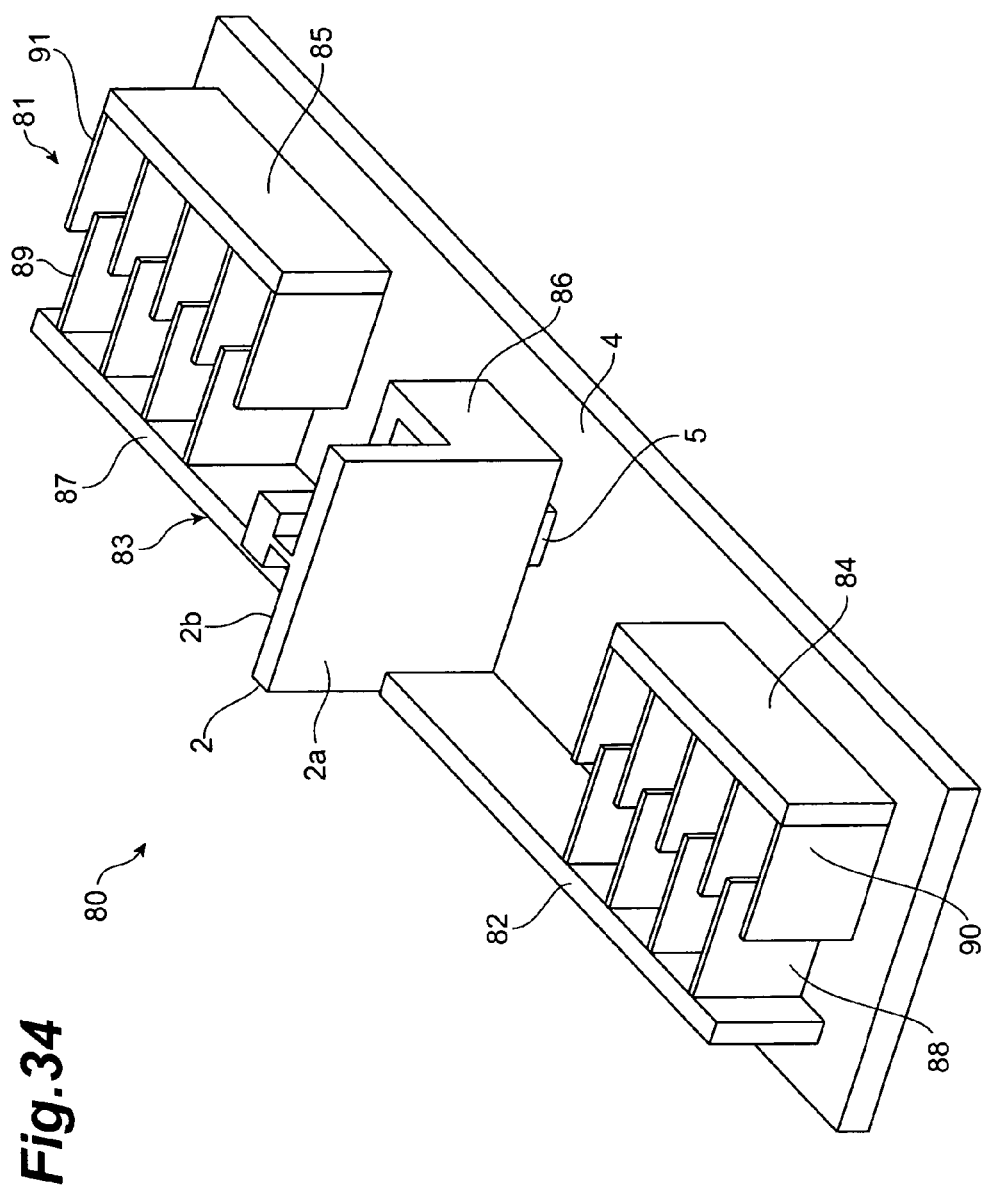
FIG. 34 is a perspective view showing an embodiment of the movable mirror device according to the present invention.
Figure 35:
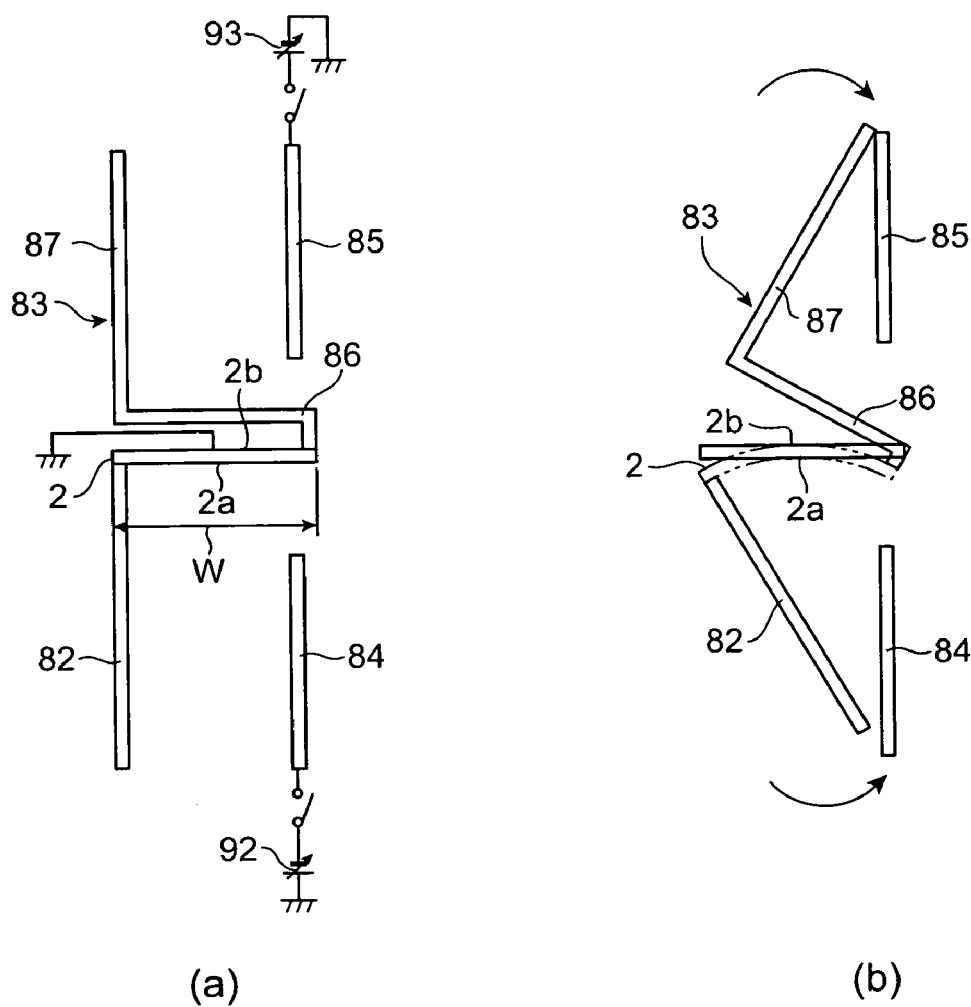
FIG. 35 is an illustration showing the operation of the movable mirror device shown in FIG. 34.

Furthermore, still another embodiment of the movable mirror device according to the present invention will be described below. FIG. 34 is a perspective view showing an embodiment of the movable mirror device according to the present invention. FIG. 35 is an illustration showing the operation of the movable mirror device shown in FIG. 34. In FIGS. 34 and 35, identical or equivalent members to those in the embodiment shown in FIG. 22 are denoted by the same reference symbols. The description of the identical or equivalent members to those in the above embodiment will be omitted below.

The movable mirror device 80 of the present embodiment shown in FIG. 34 is provided with a drive section 81 for deforming the mirror 2 into a curved shape. The drive section 81 has a movable electrode terminal 82 coupled to the front surface 2a of the mirror 2, a movable electrode terminal 83 coupled to the back surface 2b of the mirror 2, a stationary electrode terminal 84 fixed to the upper surface of the substrate 4 so as to face the movable electrode terminal 82 on the front surface 2a side of the mirror 2, and a stationary electrode terminal 85 fixed to the upper surface of the substrate 4 so as to face the movable electrode terminal 83 on the back surface 2b side of the mirror 2. Namely, the movable electrode terminal 82 and the stationary electrode terminal 84 are provided in the region on the front surface 2a side out of the two regions defined by the mirror 2 in the first direction intersecting with the reflecting surface 2a of the mirror 2. The movable electrode terminal 83 and the stationary electrode terminal 85 are provided in the region behind the front surface 2a (in the region on the back surface 2b side) out of the two regions.

The movable electrode terminal 82 is coupled to the left end of the mirror 2 on the view from the front surface 2a side, in the front surface 2a of the mirror 2, and extends forward from the mirror 2. Namely, the movable electrode terminal 82 has a joint part coupled to the front surface 2a in one side portion in the width direction (second direction) of the mirror 2, and extends in the first direction along one side portion out of the two side portions in the region on the front surface 2a side in the second direction.

The movable electrode terminal 83 has a joint part 86 having a bent structure in which it is coupled to the right end of the mirror 2 on the view from the front surface 2a side, in the back surface 2b of the mirror 2 and in which it is bent toward the left end of the mirror 2, and an electrode part 87 integrated with the joint part 86 and extending backward from the mirror 2. Namely, the movable electrode terminal 83 has the joint part 86 and the electrode part 87, and the joint part 86 is coupled to the back surface 2b in the other side portion in the width direction (second direction) of the mirror 2. The joint part 86 extends toward one side portion out of the two side portions in the region on the back surface 2b side in the second direction. The electrode part 87 is connected to the joint part 86 and extends in the first direction along one side portion in the region on the back surface 2b side. Therefore, the movable electrode terminal 82 and the electrode part 87 of the movable electrode terminal 83 are arranged to extend substantially on a straight line.

The stationary electrode terminals 84, 85 are placed on the right end side of the mirror 2 on the view from the front surface 2a side, relative to the movable electrode terminals 82, 83. Namely, the stationary electrode terminal 84 extends in the first direction along the other side portion out of the two side portions in the second direction in the region on the front surface 2a side. The stationary electrode terminal 85 extends in the first direction along the other side portion out of the two side portions in the second direction in the region on the back surface 2b side. Therefore, the stationary electrode terminals 84, 85 are arranged to extend substantially on a straight line.

The movable electrode terminal 82 is provided with fingers 88 on the side facing the stationary electrode terminal 84, and the electrode part 87 of the movable electrode terminal 83 is provided with fingers 89 on the side facing the stationary electrode terminal 85. The stationary electrode terminal 84 is provided with fingers 90 on the side facing the movable electrode terminal 82, and the stationary electrode terminal 85 is provided with fingers 91 on the side facing the electrode part 87.

As shown in FIG. 35(a), the movable electrode terminals 82, 83 are grounded through the mirror 2 and anchor part 5. A variable voltage source 92 for generating an electrostatic force between the movable electrode terminal 82 and the stationary electrode terminal 84 is connected to the stationary electrode terminal 84, and a variable voltage source 93 for generating an electrostatic force between the movable electrode terminal 83 and the stationary electrode terminal 85 is connected to the stationary electrode terminal 85.

The operation of the movable mirror device 80 shown in FIG. 34 will be described below. In the initial state in which the variable voltage sources 92, 93 apply the voltage of zero, as shown in FIG. 35(a), the mirror 2 is in a flat state without flexure. Namely, the front surface 2a of the mirror 2 is a flat surface in the initial state.

When the variable voltage source 92 applies a voltage to the stationary electrode terminal 84 and when the variable voltage source 93 applies a voltage to the stationary electrode terminal 85, as shown in FIG. 35(b), the movable electrode terminal 82 is attracted toward the stationary electrode terminal 84 by an electrostatic force occurring between the movable electrode terminal 82 and the stationary electrode terminal 84 and the movable electrode terminal 83 is attracted toward the stationary electrode terminal 85 by an electrostatic force occurring between the movable electrode terminal 83 and the stationary electrode terminal 85. This results in bending the mirror 2 into a concave shape with respect to the front surface (reflecting surface) 2a thereof. Namely, when the movable electrode terminal 82 is subject to the electrostatic attraction from the stationary electrode terminal 84, one side portion of the mirror 2 coupled to the movable electrode terminal 82 undergoes a force directed toward the other side portion in the region on the front surface 2a side (toward the stationary electrode terminal 84). When the movable electrode terminal 83 is subject to the electrostatic attraction from the stationary electrode terminal 85, the other side portion of the mirror 2 coupled to the movable electrode terminal 83 undergoes a force directed to one side portion in the region on the front surface 2a side (in the opposite direction to the direction where the stationary electrode terminal 85 is located with respect to the center axis). As a result, the front surface 2a of the mirror 2 is deformed into a concave surface around the center axis of the mirror 2.

Since the present embodiment adopts the configuration as described above, the mirror 2 can be largely deformed from the flat state into the concave shape while keeping the width W of the movable mirror device 80 (drive section 81) small. Therefore, in a case where the present movable mirror device 80 is applied to the dispersion compensator as shown in FIG. 25, it is feasible to compensate for large negative dispersion.

Figure 36:
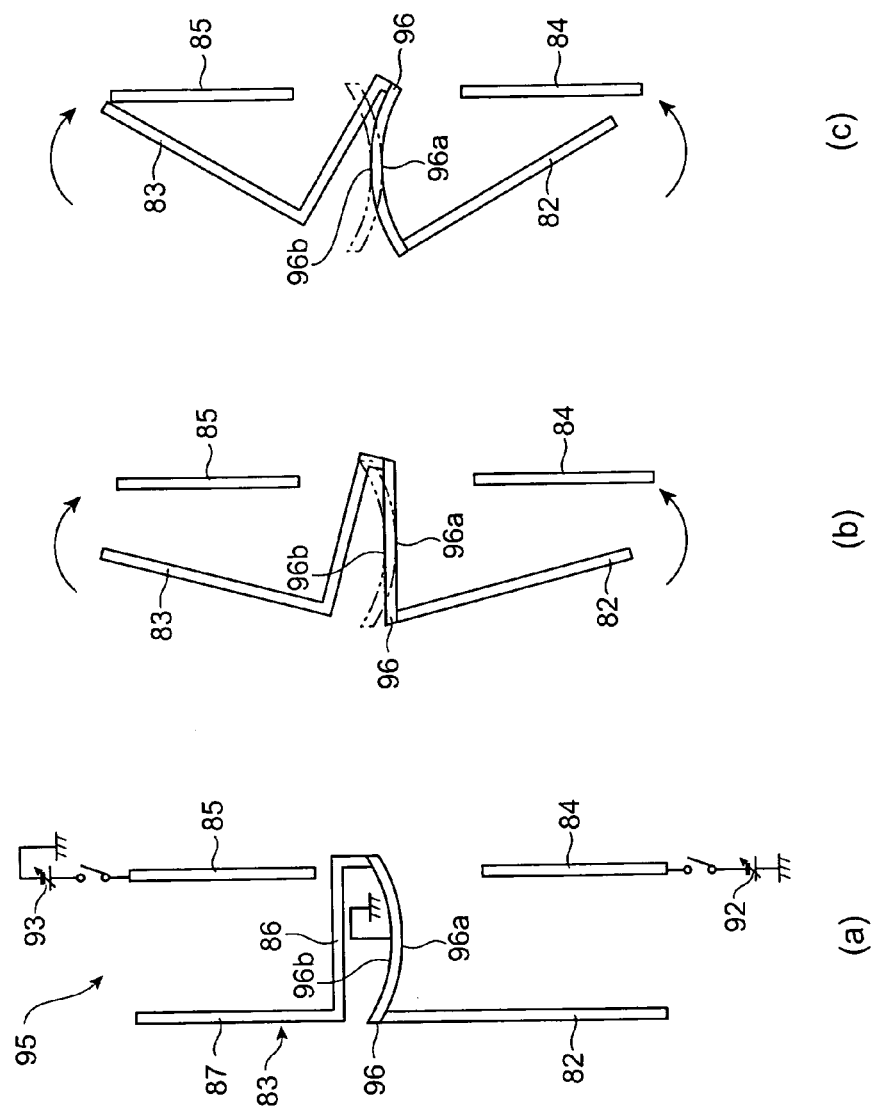
FIG. 36 is an illustration showing a schematic configuration and operation of an embodiment of the movable mirror device according to the present invention.

Furthermore, still another embodiment of the movable mirror device according to the present invention will be described below. FIG. 36 is a schematic configuration diagram showing an embodiment of the movable mirror device according to the present invention. In FIG. 36, identical or equivalent members to those in the embodiment shown in FIG. 34 are denoted by the same reference symbols. The description of the identical or equivalent members to those in the above embodiment will be omitted below.

The movable mirror device 95 of the present embodiment shown in FIG. 36 is different from the movable mirror device of the embodiment shown in FIG. 34, in that a mirror 96 replaces the mirror 2. The mirror 96 is preliminarily bent in a convex shape with respect to the front surface (reflecting surface) 96a side, as shown in FIG. 36(a). Namely, the front surface 96a of the mirror 96 is formed as a convex surface in the initial state.

When the variable voltage source 92 applies a voltage to the stationary electrode terminal 84 and when the variable voltage source 93 applies a voltage to the stationary electrode terminal 85, as shown in FIG. 36(b), the movable electrode terminal 82 is attracted toward the stationary electrode terminal 84 and the movable electrode terminal 83 is attracted toward the stationary electrode terminal 85, whereby the mirror 96 turns into a flat state without flexure. When the voltages applied by the variable voltage sources 92, 93 are further increased, as shown in FIG. 36(c), the movable electrode terminal 82 is further attracted toward the stationary electrode terminal 84 and the movable electrode terminal 83 is further attracted toward the stationary electrode terminal 85, whereby the mirror 96 is bent into a concave shape with respect to the front surface 96a side thereof. Namely, in the movable mirror device 95 shown in FIG. 36, with increase in the amplitude of applied voltages, the front surface 96a of the mirror 96 is deformed from the convex surface into the flat surface and further deformed from the flat surface into the concave surface.

The present embodiment as described above adopts the simple structure wherein the stationary electrode terminals 84, 85 are placed on only one side of the movable electrode terminals 82, 83 and even in the simple structure the mirror 96 can be deformed into the concave shape and into the convex shape.

Figure 37:
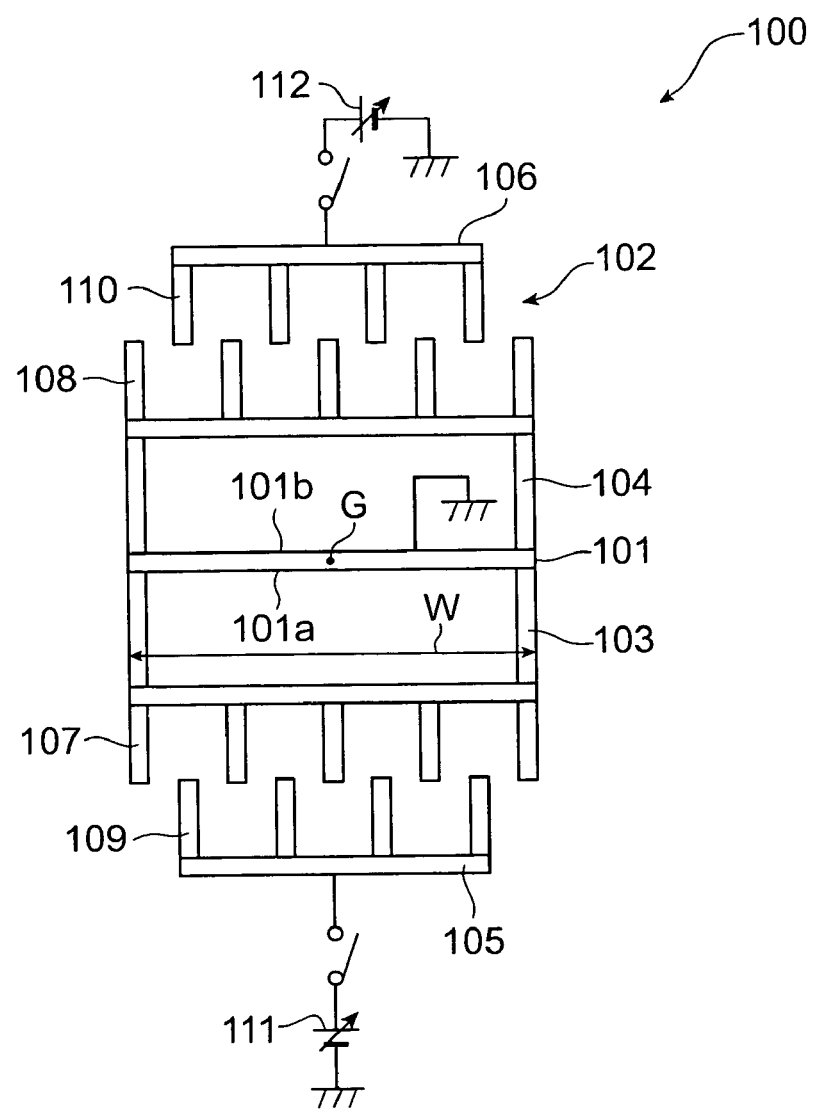
FIG. 37 is an illustration showing a schematic configuration and operation of an embodiment of the movable mirror device according to the present invention.

Furthermore, still another embodiment of the movable mirror device according to the present invention will be described below. FIG. 37 is a schematic configuration diagram showing an embodiment of the movable mirror device according to the present invention. In FIG. 37, identical or equivalent members to those in the embodiment shown in FIG. 22 are denoted by the same reference symbols. The description of the identical or equivalent members to those in the embodiment shown in FIG. 22 will be omitted below.

The movable mirror device 100 of the present embodiment shown in FIG. 37 is provided with a mirror 101, and a drive section 102 for deforming this mirror 101 into a curved shape. An anchor part (not shown) fixed to a substrate (not shown) is provided in the central part in the width direction of the mirror 101 in the lower surface of the mirror 101. This permits the mirror 101 to be deformable into a curved shape with the central part G in the width direction as a fixed point.

The drive section 102 has a U-shaped movable electrode terminal 103 coupled to the left end and the right end of the mirror 101 in the front surface 101a of the mirror 101, a U-shaped movable electrode terminal 104 coupled to the left end and the right end of the mirror 101 in the back surface 101b of the mirror 101, a stationary electrode terminal 105 fixed to the substrate (not shown) so as to face the movable electrode terminal 103, and a stationary electrode terminal 106 fixed to the substrate (not shown) so as to face the movable electrode terminal 104.

Namely, the movable electrode terminal 103 and the stationary electrode terminal 105 are provided in the region on the front surface 101a side out of the two regions defined by the mirror 101 in the first direction intersecting with the reflecting surface 101a of the mirror 101. The movable electrode terminal 104 and the stationary electrode terminal 106 are provided in the region behind the front surface 101a (in the region on the back surface 102b side) out of the two regions.

The movable electrode terminal 103 is coupled to the front surface 101a of the mirror 101 in the both side portions in the width direction (second direction) of the mirror 101. The movable electrode terminal 103 and the stationary electrode terminal 105 extend in the second direction in the region on the front surface 101a side. The movable electrode terminal 103 is provided between the mirror 101 and the stationary electrode terminal 105.

The movable electrode terminal 104 is coupled to the back surface 101b of the mirror 101 in the both side portions in the width direction (second direction) of the mirror 101. The movable electrode terminal 104 and the stationary electrode terminal 106 extend in the second direction in the region on the back surface 101b side. The movable electrode terminal 104 is provided between the mirror 101 and the stationary electrode terminal 106.

In order to secure the light reflecting region in the front surface 101a of the mirror 101, the movable electrode terminal 103 is coupled, for example, to the lower part of the front surface 101a of the mirror 101, and the movable electrode terminal 104 to the lower part of the back surface 101b of the mirror 101 corresponding thereto. The stationary electrode terminal 105 faces the mirror 101 with the movable electrode terminal 103 in between, and the stationary electrode terminal 106 faces the mirror 101 with the movable electrode terminal 104 in between. Namely, the mirror 101 has two regions located in order in the third direction intersecting with the first direction and with the second direction, and the movable electrode terminal 103 and the movable electrode terminal 104 are coupled to the mirror in one of the two regions. The other region out of the two regions projects with respect to the drive section 102 in the third direction and serves as a light reflecting region for reflecting light.

The movable electrode terminal 103 is provided with fingers 107 on the side facing the stationary electrode terminal 105, and the movable electrode terminal 104 with fingers 108 on the surface facing the stationary electrode terminal 106. The stationary electrode terminal 105 is provided with fingers 109 on the surface facing the movable electrode terminal 103, and the stationary electrode terminal 106 with fingers 110 on the surface facing the movable electrode terminal 104.

The movable electrode terminals 103, 104 are grounded through the mirror 101 and the anchor part (not shown). A variable voltage source 111 for generating an electrostatic force between the movable electrode terminal 103 and the stationary electrode terminal 105 is connected to the stationary electrode terminal 105, and a variable voltage source 112 for generating an electrostatic force between the movable electrode terminal 104 and the stationary electrode terminal 106 is connected to the stationary electrode terminal 106.

The operation of the movable mirror device 100 shown in FIG. 37 will be described below. When the variable voltage source 111 applies a voltage to the stationary electrode terminal 105, the movable electrode terminal 103 is attracted toward the stationary electrode terminal 105 by an electrostatic force occurring between the movable electrode terminal 103 and the stationary electrode terminal 105. This results in deforming the flat mirror 101 without flexure, into a concave shape with respect to the front surface 101a side thereof. Namely, when the movable electrode terminal 103 is attracted toward the stationary electrode terminal 105, the two side portions of the mirror 101 coupled to the movable electrode terminal 103 in the front surface 101a are attracted toward the stationary electrode terminal 105. In this state, since the portion along the center axis passing the center in the second direction of the mirror 101 is fixed, the front surface 101a of the mirror 101 is deformed into a concave surface.

On the other hand, when the variable voltage source 112 applies a voltage to the stationary electrode terminal 106, the movable electrode terminal 104 is attracted toward the stationary electrode terminal 106 by an electrostatic force occurring between the movable electrode terminal 104 and the stationary electrode terminal 106. This results in deforming the flat mirror 101 without flexure, into a convex shape with respect to the front surface 101a side thereof. Namely, when the movable electrode terminal 104 is attracted toward the stationary electrode terminal 106, the two side portions of the mirror 101 coupled to the movable electrode terminal 104 in the back surface 101b are attracted toward the stationary electrode terminal 106. In this state, since the portion along the center axis of the mirror 101 is fixed, the front surface 101a of the mirror 101 is deformed into a convex surface.

In the present embodiment as described above, since the movable electrode terminals 103, 104 are coupled to the front surface 101a and to the back surface 101b, respectively, of the mirror 101, no so large space is necessary in the width direction of the mirror 101 even if the desired space is secured between the movable electrode terminal 103 and the stationary electrode terminal 105 and between the movable electrode terminal 104 and the stationary electrode terminal 106 in order to increase the movable range of the movable electrode terminals 103, 104. This permits the mirror 101 to be deformed from the flat state in the two ways into the concave shape and into the convex shape while keeping the width W of the movable mirror device 100 (drive section 102) small. Therefore, where the present movable mirror device 100 is applied to the dispersion compensator as shown in FIG. 25, it is feasible to compensate for both positive dispersion and negative dispersion.

Figure 38:
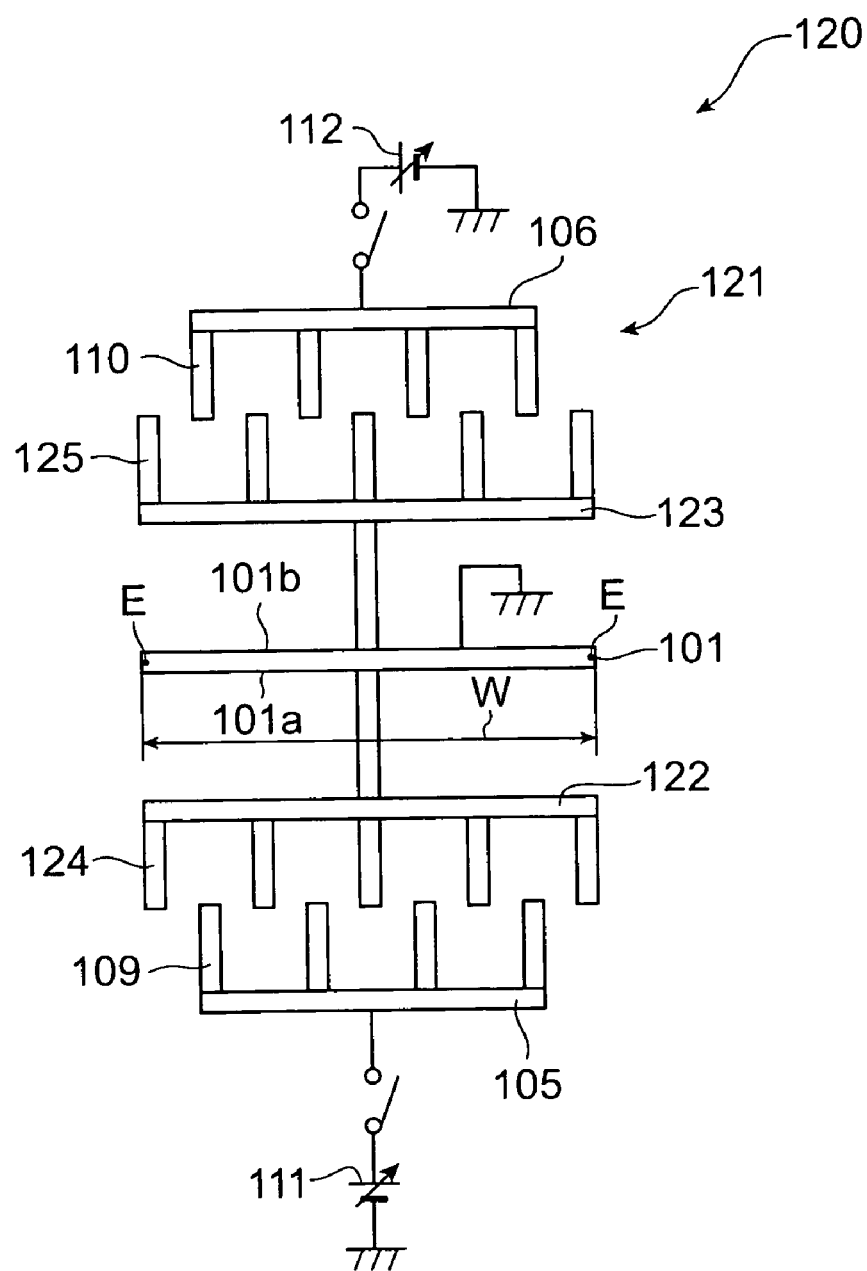
FIG. 38 is an illustration showing a schematic configuration and operation of an embodiment of the movable mirror device according to the present invention.

Furthermore, still another embodiment of the movable mirror device according to the present invention will be described below. FIG. 38 is a schematic configuration diagram showing an embodiment of the movable mirror device according to the present invention. In FIG. 38, identical or equivalent members to those in the embodiment shown in FIG. 37 are denoted by the same reference symbols. The description of the identical or equivalent members to those in the embodiment shown in FIG. 37 will be omitted below.

The movable mirror device 120 of the present embodiment shown in FIG. 38 is provided with a drive section 121 for deforming the mirror 101. An anchor part (not shown) fixed to a substrate (not shown) is provided at each of the two end portions in the width direction of the mirror 101 in the lower surface of the mirror 101. This permits the mirror 101 to be deformable into a curved shape with the both ends (both side portions) E in the width direction as fixed points.

The drive section 121 has movable electrode terminals 122, 123 and stationary electrode terminals 105, 106. The movable electrode terminal 122 and the stationary electrode terminal 105 are provided in the region on the front surface 101a side out of the two regions defined by the mirror 101 in the first direction intersecting with the reflecting surface 101a of the mirror 101. The movable electrode terminal 123 and the stationary electrode terminal 106 are provided in the region behind the front surface 101a (the region on the back surface 102b side) out of the two regions.

The movable electrode terminals 122, 123 are of T shape. The movable electrode terminal 122 is coupled to the central part in the width direction of the mirror 101 in the front surface 101a of the mirror 101, and the movable electrode terminal 123 is coupled to the central part in the width direction of the mirror 101 in the back surface 101b of the mirror 101. The movable electrode terminal 122 is provided with fingers 124 on the surface facing the stationary electrode terminal 105, and the movable electrode terminal 123 with fingers 125 on the surface facing the stationary electrode terminal 106. The movable electrode terminals 122, 123 are grounded through the mirror 101 and anchor parts (not shown).

Namely, the movable electrode terminal 122 is coupled to the front surface 101a in the central part in the width direction (second direction) of the mirror 101. The movable electrode terminal 122 and the stationary electrode terminal 105 extend in the second direction in the region on the front surface 101a side. The movable electrode terminal 122 is provided between the mirror 101 and the stationary electrode terminal 105. The movable electrode terminal 123 is coupled to the back surface 101b in the central part in the width direction (second direction) of the mirror 101. The movable electrode terminal 123 and the stationary electrode terminal 106 extend in the second direction in the region on the back surface 101b side. The movable electrode terminal 123 is disposed between the mirror 101 and the stationary electrode terminal 106.

The operation of the movable mirror device 120 shown in FIG. 38 will be described below. When the variable voltage source 111 applies a voltage to the stationary electrode terminal 105, the movable electrode terminal 122 is attracted toward the stationary electrode terminal 105 by an electrostatic force occurring between the movable electrode terminal 122 and the stationary electrode terminal 105. This results in deforming the flat mirror 101 without flexure, into a convex shape with respect to the front surface 101a side thereof. Namely, when the movable electrode terminal 122 is attracted toward the stationary electrode terminal 105, the central part of the mirror 101 coupled to the movable electrode terminal 122 in the front surface 101a is attracted toward the stationary electrode terminal 105. In this state, since the mirror 101 is fixed at the both side portions in the second direction, the front surface 101a of the mirror 101 is deformed into a convex surface.

On the other hand, when the variable voltage source 112 applies a voltage to the stationary electrode terminal 106, the movable electrode terminal 123 is attracted to the stationary electrode terminal 106 by an electrostatic force occurring between the movable electrode terminal 123 and the stationary electrode terminal 106. This results in deforming the flat mirror 101 without flexure, into a concave shape with respect to the front surface 101a side thereof. Namely, when the movable electrode terminal 123 is attracted toward the stationary electrode terminal 106, the central part of the mirror 101 coupled to the movable electrode terminal 123 in the back surface 101b is attracted toward the stationary electrode terminal 106. In this state, since the mirror 101 is fixed at the both side portions in the second direction, the front surface 101a of the mirror 101 is deformed into a concave surface.

In the present embodiment, the mirror 101 can also be deformed from the flat state in the two ways into the concave shape and into the convex shape while keeping the width W of the movable mirror device 120 (drive section 121) small.

The preferred embodiments of the present invention were described above, but it is noted that the present invention is by no means intended to be limited to the above embodiments. For example, the movable mirror device according to the present invention can also be applied to optical devices other than the dispersion compensators.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A movable mirror device comprising:
a substrate;
a deformable mirror supported at a central part thereof on the substrate; and
a drive section for deforming the mirror into a concave shape and into a convex shape, wherein:
the drive section comprises a movable electrode terminal, another movable electrode terminal, a first stationary electrode terminal, and two second stationary electrode terminals each of which has an interdigital structure;
the two movable electrode terminals are coupled to two side portions of the mirror;
the first stationary electrode terminal is disposed between the movable electrode terminals, and is arranged to face the movable electrode terminals;
the two second stationary electrode terminals faces the first stationary electrode terminal with each movable electrode terminal in between;
the first stationary electrode terminal and the two stationary electrode terminals are fixed to the substrate;
an electrostatic force is generated between the two movable electrode terminals and the first stationary electrode terminal to move the movable electrode terminals, thereby deforming the mirror in convex shape; and
an electrostatic force is generated between the two movable electrode terminals and the two secondary stationary electrode terminals to move the movable electrode terminals, thereby deforming the mirror in concave shape.

2. The movable mirror device according to claim 1, wherein a rigidity of joint parts between the mirror and the movable electrode terminals is larger than a rigidity of a central part of the mirror.

3. The movable mirror device according to claim 1, wherein the movable electrode terminals are folded toward a center side of the mirror.

4. The movable mirror device according to claim 1, wherein the movable electrode terminals extend obliquely relative to the mirror toward a center side of the mirror.

5. The movable mirror device according to claim 1, wherein two supporting means for supporting the two movable electrode terminals movably relative to the first stationary electrode terminal are provided on the substrate.

6. The movable mirror device according to claim 5, wherein each of the supporting means comprises a fixed portion fixed to the substrate, and an elastic member connecting the movable electrode terminal and the fixed portion.

7. The movable mirror device according to claim 1, wherein the first stationary electrode terminal comprises two first stationary electrode terminals facing one of the two movable electrode terminals, and the two second stationary electrode terminals facing each other with the other of the two movable electrode terminals in between.

8. The movable mirror device according to claim 7, wherein a rigidity of joint parts between the mirror and the movable electrode terminals is larger than a rigidity of a central part of the mirror.

9. The movable mirror device according to claim 7, wherein the movable electrode terminals are folded toward a center side of the mirror.

10. The movable mirror device according to claim 7, wherein the movable electrode terminals extend obliquely relative to the mirror toward a center side of the mirror.

11. The movable mirror device according to claim 7, wherein two supporting means for supporting the two movable electrode terminals movably relative to the first stationary electrode terminal are provided on the substrate.

12. The movable mirror device according to claim 11, wherein each of the supporting means comprises a fixed portion fixed to the substrate, and an elastic member connecting the movable electrode terminals and the fixed portion.

13. The movable mirror device according to claim 1, wherein the mirror has a reflecting surface for reflecting light,
the reflecting surface is one of a convex surface and a concave surface in an initial state.

14. The movable mirror device according to claim 13, wherein the reflecting surface of the mirror is preliminarily formed as the concave surface,
the two movable electrode terminals being disposed in a region behind the reflecting surface out of two regions defined by the mirror in a first direction intersecting with the reflecting surface, one of the two movable electrode terminals is coupled to one of two side portions of the mirror in a second direction intersecting with the first direction, and extends in the first direction, and the other of the two movable electrode terminals is coupled to the other of the two side portions of the mirror and extends in the first direction.

15. The movable mirror device according to claim 14, wherein a rigidity of the two side portions of the mirror is larger than a rigidity of the other portion of the mirror in the second direction.

16. The movable mirror device according to claim 14, said mirror extending in a third direction intersecting with the first direction and with the second direction.

17. The movable mirror device according to a claim 14, wherein two supporting means for supporting the two movable electrode terminals movably relative to the first stationary electrode terminal are provided on the substrate.

18. The movable mirror device according to claim 17, wherein each of the supporting means comprises a fixed portion fixed to the substrate, and an elastic member connecting the movable electrode terminals and the fixed portion, and
wherein the elastic member has an elastic modulus smaller than that of the movable electrode terminals.

19. The movable mirror device according to claim 13, wherein the reflecting surface of the mirror is preliminarily formed as the convex surface,
the movable electrode terminals and the stationary electrode terminals being disposed in a region behind the reflecting surface out of two regions defined by the mirror in a first direction intersecting with the reflecting surface, the two stationary electrode terminals extend in the first direction, the two movable electrode terminals extend in the first direction between the two stationary electrode terminals, and one of the two movable electrode terminals is coupled to one of two side portions of the mirror in a second direction intersecting with the first direction, and the other of the two movable electrode terminals is coupled to the other of the two side portions of the mirror.

20. The movable mirror device according to claim 19, wherein a rigidity of the two side portions of the mirror is larger than a rigidity of the other portion of the mirror in the second direction.

21. The movable mirror device according to claim 19, said mirror extending in a third direction intersecting with the first direction and with the second direction.

22. The movable mirror device according to claim 19, wherein two supporting means for supporting the two movable electrode terminals movably relative to the first stationary electrode terminal are provided on the substrate.

23. The movable mirror device according to claim 22, wherein each of the supporting means comprises a fixed portion fixed to the substrate, and an elastic member connecting the movable electrode terminals and the fixed portion, and wherein the elastic member has an elastic modulus smaller than that of the movable electrode terminals.

24. The movable mirror device according to claim 13, wherein the reflecting surface is preliminarily formed as the concave surface, the drive section is provided in a region behind the reflecting surface out of two regions defined by the mirror in a first direction intersecting with the reflecting surface, the stationary electrode terminals extending in a second direction intersecting with the first direction, one of the two movable electrode terminals is coupled to one of two side portions of the mirror in a second direction intersecting with the first direction, and the other of the two movable electrode terminals is coupled to the other of the two side portions of the mirror.

25. The movable mirror device according to claim 13, wherein the reflecting surface is preliminarily formed as the convex surface, the drive section is provided in a region behind the reflecting surface out of two regions defined by the mirror in a first direction intersecting with the reflecting surface, the stationary electrode terminals extending in a second direction intersecting with the first direction, the movable electrode terminals coupled to a central portion of the mirror in the second direction and extend in the second direction between the mirror and the stationary electrode terminals, and the mirror is fixed at two side portions thereof in the second direction.

26. A dispersion compensator for giving signal light a phase shift to effect a compensation for dispersion of the signal light, the dispersion compensator comprising:

light separating means for separating signal light into wavelength components; and a plurality of movable mirror devices as set forth in claim 1, to which the respective signal light components separated by the light separating means are incident.

27. A movable mirror device comprising:

a substrate;

a deformable mirror supported by the substrate; and a drive section for deforming the mirror into a concave shape and into a convex shape, wherein:

the drive section comprises a movable electrode terminal, another movable electrode terminal, a first stationary electrode terminal, and two second stationary electrode terminals each of which has an interdigital structure;

the two movable electrode terminals are disposed in a region behind the reflecting surface out of two regions defined by the mirror in a first direction intersecting with the reflecting surface;

one of the two movable electrode terminals is coupled to one of two side portions of the mirror in a second direction intersecting with the first direction, and extends in the first direction, and the other of the two movable electrode terminals is coupled to the other of the two side portions of the mirror and extends in the first direction;

the first stationary electrode terminal is disposed between the two movable electrode terminals;

the two movable electrode terminals are disposed between the two second stationary electrode terminals;

the first stationary electrode terminal and the two stationary electrode terminals are fixed to the substrate;

the mirror comprises a reflecting surface for reflecting light, and the mirror is fixed at a portion along a center axis of the mirror extending in a third direction intersecting with the first direction and with the second direction, by the substrate;

an electrostatic force is generated between the two movable electrode terminals and the first stationary electrode terminal to move the movable electrode terminal, thereby deforming the mirror in convex shape and deforming the reflecting surface into a convex shape; and an electrostatic force is generated between the two movable electrode terminals and the two second stationary electrode terminals to move the movable electrode terminal, thereby deforming the mirror in concave shape and deforming the reflecting surface into a concave surface.

28. The movable mirror device according to claim 27, wherein each of the movable electrode terminals has a portion extending from a joint part to the mirror, in the second direction toward a plane intersecting with a center of the mirror in the second direction, and extends from an end of the portion in the first direction.

29. The movable mirror device according to claim 27, wherein each of the movable electrode terminals extends obliquely from a joint part to the mirror, toward a plane intersecting with a center of the mirror in the second direction.

30. The movable mirror device according to claim 27, wherein a rigidity of the two side portions of the mirror is larger than a rigidity of the other portion of the mirror in the second direction.

31. The movable mirror device according to claim 27, wherein two supporting means for supporting the two movable electrode terminals movably relative to the first stationary electrode terminal are provided on the substrate.

32. The movable mirror device according to claim 31, wherein each of the supporting means comprises a fixed portion fixed to the substrate, and an elastic member connecting the movable electrode terminal and the fixed portion, and wherein the elastic member has an elastic modulus smaller than that of the movable electrode terminals.

33. The movable mirror device according to claim 27, wherein the one of the movable electrode terminals and the two first stationary electrode terminals are disposed in one of a first region and a second region located in order in a direction intersecting with the first direction and with the second direction in the region behind the reflecting surface, and the other of the movable electrode terminals and the two second stationary electrode terminals are disposed in the other of the first region and the second region.

34. The movable mirror device according to claim 33, wherein each of the movable electrode terminals has a portion extending from a joint part to the mirror, in the second direction toward a plane intersecting with a center of the mirror in the second direction, and extends from an end of the portion in the first direction.

35. The movable mirror device according to claim 33, wherein each of the movable electrode terminals extends obliquely from a joint part to the mirror, toward a plane intersecting with a center of the mirror in the second direction.

36. The movable mirror device according to claim 33, wherein a rigidity of the two side portions of the mirror is larger than a rigidity of the other portion of the mirror in the second direction.

37. The movable mirror device according to claim 33, wherein two supporting means for supporting the two movable electrode terminals movably relative to the first stationary electrode terminal are provided on the substrate.

38. The movable mirror device according to claim 37, wherein each of the supporting means comprises a fixed portion fixed to the substrate, and an elastic member connecting the movable electrode terminals and the fixed portion, and wherein the elastic member has an elastic modulus smaller than that of the movable electrode terminals.

* * * * *